US011141698B2

(12) United States Patent
Shimura et al.

(10) Patent No.: US 11,141,698 B2
(45) Date of Patent: *Oct. 12, 2021

(54) HOLLOW FIBER MEMBRANE MODULE AND METHOD FOR OPERATING SAME

(71) Applicant: TORAY INDUSTRIES, INC., Tokyo (JP)

(72) Inventors: Shun Shimura, Shiga (JP); Kenta Iwai, Shiga (JP); Masayuki Hanakawa, Shiga (JP); Tamotsu Kitade, Shiga (JP); Masahiro Kimura, Shiga (JP); Atsushi Kobayashi, Shiga (JP); Aya Nishio, Shiga (JP)

(73) Assignee: TORAY INDUSTRIES, INC., Tokyo (JP)

(*) Notice: Subject to any disclaimer, the term of this patent is extended or adjusted under 35 U.S.C. 154(b) by 149 days.

This patent is subject to a terminal disclaimer.

(21) Appl. No.: 16/066,564

(22) PCT Filed: Dec. 26, 2016

(86) PCT No.: PCT/JP2016/088800
§ 371 (c)(1),
(2) Date: Jun. 27, 2018

(87) PCT Pub. No.: WO2017/115769
PCT Pub. Date: Jul. 6, 2017

(65) Prior Publication Data
US 2019/0015786 A1    Jan. 17, 2019

(30) Foreign Application Priority Data

Dec. 28, 2015 (JP) ............................. JP2015-257122
May 31, 2016 (JP) ............................. JP2016-108320

(51) Int. Cl.
*B01D 63/02* (2006.01)
*B01D 65/02* (2006.01)
(Continued)

(52) U.S. Cl.
CPC ............. *B01D 63/02* (2013.01); *B01D 65/02* (2013.01); *B01D 65/08* (2013.01);
(Continued)

(58) Field of Classification Search
USPC ..... 210/85, 96.2, 117, 252, 253, 257.2, 232, 210/321.6, 321.72, 321.8, 3, 21.88,
(Continued)

(56) References Cited

U.S. PATENT DOCUMENTS 9,211,503 B2    12/2015  Xiao et al.
9,901,883 B2 *  2/2018  Hanakawa ......... B01D 67/0018
(Continued)

FOREIGN PATENT DOCUMENTS

CN    104043344 A    9/2014
CN    104437136 A    3/2015
(Continued)

OTHER PUBLICATIONS

JP2014008426 A Makoto et al.—Hollow fiber membrane module [Abstract & MT; Jan. 20, 2014; 23 pages]. (Year: 2014).*
(Continued)

*Primary Examiner* — Hayden Brewster
(74) *Attorney, Agent, or Firm* — Birch, Stewart, Kolasch & Birch, LLP

(57) ABSTRACT

The present invention provides a hollow fiber membrane module that can effectively resolve the accumulation of suspended solids within the membrane module, lower running costs, and also operate stably. The present invention relates to a hollow fiber membrane molecule provided with: a cylindrical case having a first end and a second end in the
(Continued)

direction of height; a plurality of hollow fiber membranes accommodated within the cylindrical case; and a first potting part accommodated within the cylindrical case and attaching the plurality of hollow fiber membranes together such that the end parts of the plurality of hollow membrane fibers at a first end side of the cylindrical case are open. The hollow fiber membranes are porous hollow fiber membranes having a breaking strength of 23 MPa, and the hollow membrane module has a membrane area per unit volume of 800-3700 $m^2/m^3$. The filling fraction for the hollow fiber membranes in a cross-section orthogonal to the direction of height of the cylindrical case is 25-38%.

12 Claims, 8 Drawing Sheets

(51) Int. Cl.
  *B01D 69/02* (2006.01)
  *B01D 71/34* (2006.01)
  *B01D 65/08* (2006.01)
  *C02F 1/44* (2006.01)
  *B01D 67/00* (2006.01)
  *B01D 69/08* (2006.01)

(52) U.S. Cl.
  CPC ......... *B01D 67/0027* (2013.01); *B01D 69/02* (2013.01); *B01D 69/08* (2013.01); *B01D 71/34* (2013.01); *C02F 1/44* (2013.01); *C02F 1/444* (2013.01); *B01D 2321/04* (2013.01); *B01D 2321/10* (2013.01); *B01D 2321/12* (2013.01); *B01D 2325/24* (2013.01); *C02F 2303/16* (2013.01)

(58) Field of Classification Search
  USPC .......... 210/321.89, 321.9, 323.1, 323.2, 340, 210/454, 497.01, 500.23, 645, 650, 653, 210/806
  See application file for complete search history.

(56) References Cited

U.S. PATENT DOCUMENTS

| | | | |
|---|---|---|---|
| 2002/0046970 | A1 | 4/2002 | Murase et al. |
| 2003/0094409 | A1 | 5/2003 | Minegishi et al. |
| 2005/0258101 | A1 | 11/2005 | Minegishi et al. |
| 2007/0090051 | A1 | 4/2007 | Minegishi et al. |
| 2009/0050555 | A1 | 2/2009 | Baba et al. |
| 2015/0059576 | A1 | 3/2015 | Shibata |
| 2017/0232403 | A1* | 8/2017 | Tanaka ................... B01D 63/02 210/483 |
| 2017/0274325 | A1 | 9/2017 | Maeda et al. |
| 2017/0348649 | A1 | 12/2017 | Hanakawa et al. |

FOREIGN PATENT DOCUMENTS

| | | | |
|---|---|---|---|
| EP | 1 787 711 | A1 | 5/2007 |
| EP | 3 466 526 | A1 | 4/2019 |
| JP | 11-342320 | A | 12/1999 |
| JP | 2005-13805 | A | 1/2005 |
| JP | 2006-281202 | A | 10/2006 |
| JP | 2006-297383 | A | 11/2006 |
| JP | 2007-181813 | A | 5/2007 |
| JP | 2010-5615 | A | 1/2010 |
| JP | 2011-36780 | A | 2/2011 |
| JP | 2014/8426 | A | 1/2014 |
| JP | 2014-180589 | A | 9/2014 |
| JP | 2015-226884 | A | 12/2015 |
| WO | WO 03/031038 | A | 4/2003 |
| WO | WO 2013/147187 | A1 | 10/2013 |
| WO | WO 2015/083717 | A1 | 6/2015 |
| WO | WO 2016/104743 | A1 | 6/2016 |

OTHER PUBLICATIONS

JP2011036780 A Naoshi et al.—Hollow fiber porous membrane module [Abstract & MT; 2-24-11; 19 pages]. (Year: 2011).*
JP2005013805 A Kumami—Internal pressure type hollow yarn membrane module [Abstract & MT; Jun. 20, 2005; 11 pages]. (Year: 2005).*
Accepta: "A Guide to Cost-Effective Membrane Technologies for Minimising Wastes and Effluents," Jun. 18, 2003.
Extended European Search Report dated May 21, 2019, in European Patent Application No. 16881744.3.
International Search Report for PCT/JP2016/088800 (PCT/ISA/210) dated Feb. 2017.
Written Opinion of the International Searching Authority for PCT/JP2016/088800 (PCT/ISA/237) dated Feb. 28, 2017.
Communication Pursuant to Article 94(3) EPC dated Jun. 3, 2020, in European Patent Application No. 16 881 744.3-1104.
Guanwen et al., "New Development and Engineering Application for Membrane Technology," National Defense Industry Press (Aug. 2013), p. 25.
Lin et al., "Preparation and Application of Membrane Material," Northeastern University Press (Dec. 2011). p. 1.
Office Action dated Jul. 29, 2020, in Chinese Patent Application No. 201680076563.6.
Communication Pursuant to Article 94(3) EPC dated Apr. 9, 2021, in European Patent Application No. 16 881 744.3.

* cited by examiner

HOLLOW FIBER MEMBRANE MODULE AND METHOD FOR OPERATING SAME

TECHNICAL FIELD

The present invention relates to a hollow-fiber membrane module for membrane separation of, particularly, raw water containing a high concentration of suspended substances, and an operation method thereof.

BACKGROUND ART

In recent years, a separation membrane such as microfiltration membrane or ultrafiltration membrane is utilized for a process in various areas including food industry and medical fields, water production and wastewater treatment fields, etc., because it has features of energy saving and space saving and in view of separation capacity, has characteristics of providing power saving, product quality enhancement, etc.

On the other hand, when membrane separation is applied to raw water, a membrane-impermeable substance such as suspended substances (hereinafter sometimes referred to as "suspended solids") and organic matters contained in the raw water gradually sticks and deposits on the membrane surface or in a membrane pore to cause clogging of the separation membrane. As a result, the liquid flow resistance of the separation membrane is increased, and it eventually becomes impossible to perform membrane separation.

In order to eliminate clogging and restore the membrane separation performance, chemical cleaning of a separation membrane is generally conducted, but when suspended solids remain accumulated, the cleaning effect of the chemical solution is reduced. Alternatively, there is a case where the membrane separation performance can be restored by repeating cleaning with a chemical solution, but the amount of chemical solution used and the cleaning time are increased, resulting in a problem of suffering from a disadvantage in view of treatment cost.

Accordingly, with an attempt to continuously maintain the membrane separation performance over a long period of time while eliminating clogging of the separation membrane, various membrane separation operating techniques have been developed. Examples thereof include backwashing of passing permeated liquid, water, etc. from the permeation side to the raw water side to push out a substance stuck in a membrane pore or on the membrane surface; air washing of feeding a gas from the lower part of a hollow-fiber membrane module and physically cleaning the hollow-fiber membrane (i.e., a separation membrane in hollow fiber form) by shaking the membrane (see, for example, Patent Document 1); and a flushing method of flowing raw water or a chemical solution at a high linear velocity to a membrane surface on the raw water side of a hollow-fiber membrane (see, for example, Patent Document 2).

Patent Document 3 discloses a method for producing a hollow-fiber membrane by discharging and solidifying a polyvinylidene fluoride-based resin solution containing a polyvinylidene-based resin and a poor solvent for the resin, of which temperature is not less than the phase separation temperature, into a cooling bath at not more than the phase separation temperature. In Patent Document 3, it is stated that a hollow-fiber membrane having a spherical structure is obtained by the method above and the hollow-fiber membrane has high strength.

BACKGROUND ART DOCUMENTS

Patent Documents

Patent Document 1: JP-A-11-342320
Patent Document 2: JP-A-2010-005615
Patent Document 3: WO 2003/031038

SUMMARY OF THE INVENTION

Problems that the Invention is to Solve

Accumulation of many suspended solids between membranes makes it difficult to remove the suspended solids even by a gas or washing water. In addition, when the flow rate of air or the linear velocity of washing water is increased in order to attain high cleaning effect, the hollow-fiber membrane may be broken.

An object of the present invention is to provide a hollow-fiber membrane module facilitating discharge of suspended solids.

Means for Solving the Problems

1. A hollow-fiber membrane module including:
   a cylindrical case having a first end and a second end in a height direction,
   a plurality of hollow-fiber membranes housed in the cylindrical case, and
   a first potting part which bonds end parts of the plurality of hollow-fiber membranes located on the first end side of the cylindrical case while the end parts being open, in which
   the hollow-fiber membrane is a porous hollow-fiber membrane and has a breaking strength of 23 MPa or more,
   a membrane area per unit volume of the hollow-fiber membrane module is from 800 to 3,700 $m^2/m^3$, and
   in a cross-section which perpendicularly intersects the height direction of the cylindrical case, a filling ratio of the hollow-fiber membranes is from 25% to 38%.
2. The hollow-fiber membrane module according to 1, in which
   the hollow-fiber membrane contains a fluororesin-based polymer,
   the hollow-fiber membrane has a columnar texture oriented in a longitudinal direction thereof,
   the columnar texture has a short-side length of from 0.5 μm to 3 μM, and
   an aspect ratio of the columnar texture is 3 or more.
3. The hollow-fiber membrane module according to 2, in which
   a molecular chain in the columnar texture is oriented in the longitudinal direction of the porous hollow-fiber membrane, and
   in the hollow-fiber membrane, an orientation degree π of the molecular chain of the fluororesin-based polymer in the longitudinal direction of the porous hollow-fiber membrane, calculated based on the following formula (1), is 0.4 or more and less than 1.0:

$$\text{Orientation degree } \pi = (180° - H)/180° \quad (1)$$

(in which H is a half-width (°) of a diffraction intensity distribution in a circumferential direction of a wide-angle X-ray diffraction image).
4. The hollow-fiber membrane module according to 2 or 3, in which
   the fluororesin-based polymer is polyvinylidene fluoride, and an average value ν of Raman orientation parameters of the molecular chain of the polyvinylidene fluoride, calculated based on the following formula (2), is 3.0 or more:

Raman orientation parameter=(I1270/I840)parallel/
(I1270/I840)perpendicular    (2)

(in which:
parallel condition: the longitudinal direction of the porous hollow-fiber membrane is parallel to a polarization direction; perpendicular condition: the longitudinal direction of the porous hollow-fiber membrane is orthogonal to the polarization direction; I1270 parallel: the intensity of Raman band at 1,270 cm$^{-1}$ under parallel condition; I1270 perpendicular: the intensity of Raman band at 1,270 cm$^{-1}$ under perpendicular condition; I840 parallel: the intensity of Raman band at 840 cm$^{-1}$ under parallel condition; and I840 perpendicular: the intensity of Raman band at 840 cm$^{-1}$ under perpendicular condition).

5. The hollow-fiber membrane module according to 2, in which
the molecular chain in the columnar texture is oriented in the longitudinal direction of the porous hollow-fiber membrane,
the average value ν of Raman orientation parameters of the molecular chain, calculated based on the following formula (2), is from 1.5 to 4.0, and
in the hollow-fiber membrane, the orientation degree π of the molecular chain of the fluororesin-based polymer in the longitudinal direction of the porous hollow-fiber membrane, calculated based on the following formula (1), is less than 0.4, or
the molecular chain of the fluororesin-based polymer is non-oriented:

Raman orientation parameter=(I1270/I840)parallel/
(I1270/I840)perpendicular    (2)

(in which parallel condition: the longitudinal direction of the porous hollow-fiber membrane is parallel to the polarization direction; perpendicular condition: the longitudinal direction of the porous hollow-fiber membrane is orthogonal to the polarization direction; I1270 parallel: the intensity of Raman band at 1,270 cm$^{-1}$ under parallel condition; I1270 perpendicular: the intensity of Raman band at 1,270 cm$^{-1}$ under perpendicular condition; I840 parallel: the intensity of Raman band at 840 cm$^{-1}$ under parallel condition; and I840 perpendicular: the intensity of Raman band at 840 cm$^{-1}$ under perpendicular condition), and Orientation degree π=(180°−H)/180°    (1)

(in which H is a half-width (°) of a diffraction intensity distribution in the circumferential direction of a wide-angle X-ray diffraction image).

6. The hollow-fiber membrane module according to any one of 2 to 5, in which a thickness uniformity of the columnar texture is 0.50 or more.

7. The hollow-fiber membrane module according to any one of 3 to 6, in which
the half-width H in formula (1) is a half-width of an intensity distribution obtained by circumferentially scanning a crystal peak (2θ=20.4°) derived from a (110) plane of polyvinylidene fluoride in the wide-angle X-ray diffraction measurement.

8. A method for operating the hollow-fiber membrane module according to any one of 1 to 7, including:
(1) a membrane separation step of feeding raw water containing suspended substances to the hollow-fiber membrane module to separate suspended substances from a liquid, and (2) a cleaning step of cleaning suspended substances accumulated on a membrane surface of the hollow-fiber membrane or between membrane bundles while stopping the step (1), in which
in the cleaning step (2),
(A) a backwashing step of passing water from a permeation side of the hollow-fiber membrane to a raw water side of the hollow-fiber membrane, and
(B) a washing step of flowing the raw water or water having at least a lower suspended substance concentration than in the raw water to the raw water side of the hollow-fiber membrane at a flow rate corresponding to a membrane surface linear velocity of from 0.3 to 5.0 m/s,
are combined.

9. The method for operating a hollow-fiber membrane module according to 8, in which
an operation cycle including one step for each of the step (1) and the step (2) is repeated,
in an operation cycle group composed by repeating the operation cycle, the membrane surface linear velocity of the washing step (B) is variably set for each operation cycle, and
the membrane surface linear velocity of from 1 to 50% of the washing step (B) relative to the total number of washing steps (B) included in the operation cycle group is 1.0 m/s or more.

10. The method for operating a hollow-fiber membrane module according to 9, in which
in the operation cycle group, the step (1) in at least some operation cycles are operated while conducting a cross-flow on the raw water side of the hollow-fiber membrane at a flow rate corresponding to a membrane surface linear velocity of from 0.3 to 5.0 m/s.

11. The method for operating a hollow-fiber membrane module according to 9 or 10, in which
in the operation cycle group, the step (2) in at least some operation cycles do not include the washing step (B).

Advantages of the Invention

According to the present invention, the breaking strength of the hollow fiber membrane is 23 MPa or more, so that the cleaning power applicable to the membrane module can be increased. Furthermore, the proportion of the hollow-fiber membrane in a cross-section perpendicular to the height direction of the tubular case is from 25 to 38%, and the membrane area per unit volume of the hollow-fiber membrane module is from 800 to 3,700 m$^2$/m$^3$, so that the channel between hollow-fiber membranes can be secured without largely reducing the membrane area and it can therefore be easy to prevent accumulation of suspended solids and discharge suspended solids.

BRIEF DESCRIPTION OF THE STRETCHINGS

MODE FOR CARRYING OUT THE INVENTION

Figure 1:
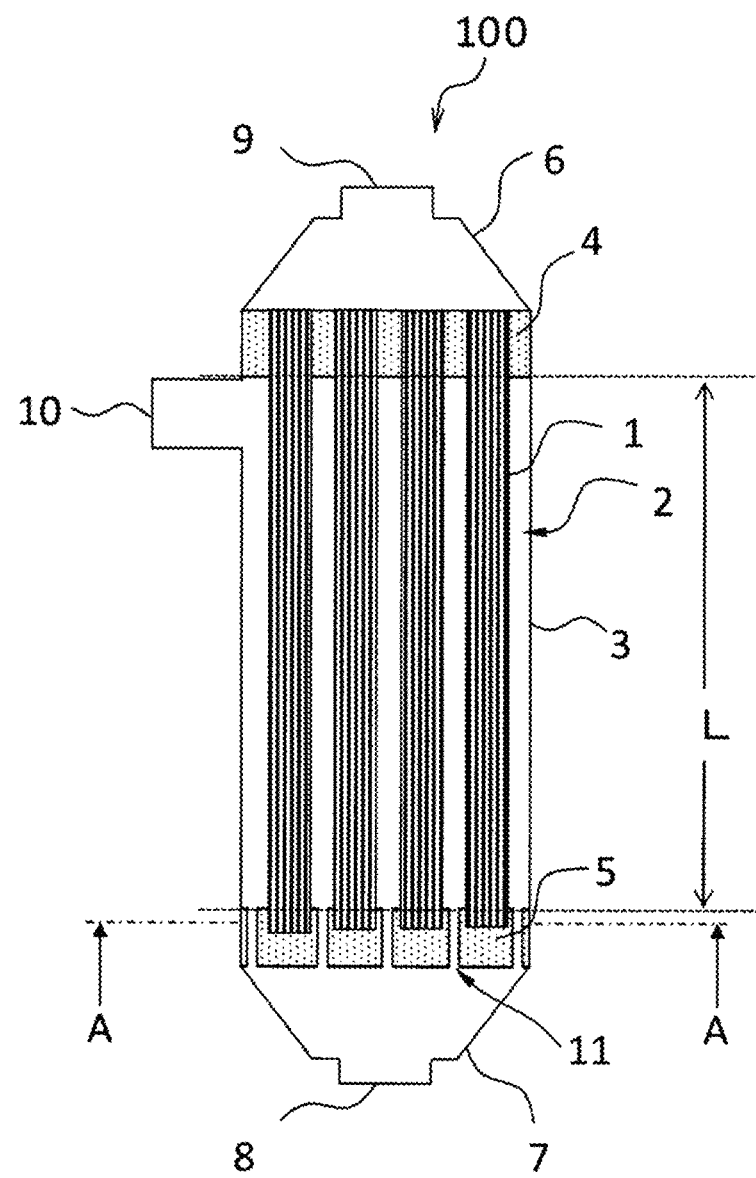
FIG. 1 is a schematic vertical cross-sectional view of the hollow-fiber membrane module according to the first embodiment of the present invention.

The embodiment of the present invention is described in more detail below by referring to specific configurations. However, the present invention is not limited by this embodiment.

1. Hollow-Fiber Membrane Module (1) Configuration of Hollow-Fiber Membrane Module The hollow-fiber membrane module (hereinafter, sometimes referred to as "membrane module") is sufficient if it can separate a permeated liquid from the separation target liquid (i.e., raw water). The system of membrane separation (i.e., filtration) includes dead-end filtration and cross-flow filtration, and in the cross-flow filtration, a permeated liquid (filtered liquid) and a concentrated liquid are obtained from the separation target liquid.

Specifically, in the dead-end filtration, the hollow-fiber membrane module includes a cylindrical case; and a separation membrane housed in the cylindrical case for separating a filtered liquid (permeated liquid) from a separation target liquid (raw water). In the hollow-fiber membrane module, for example, an additional outlet for discharging a membrane cleaning liquid, etc. may be provided.

On the other hand, in the case of cross-flow filtration, the hollow-fiber membrane module includes a cylindrical case; a separation membrane housed in the cylindrical case for separating a separation target liquid (raw water) into a filtered liquid (permeated liquid) and a concentrated liquid; a separation target liquid inlet for feeding the separation target liquid to the primary side of the separation membrane from the outer side of the cylindrical case; a permeated liquid outlet for discharging the filtered liquid to the outside of the cylindrical case; and a concentrated liquid outlet for discharging the concentrated liquid to the outside of the cylindrical case. The separation target liquid inlet and the concentrated liquid outlet are preferably provided respectively near both ends in the longitudinal direction of the cylindrical case.

Here, the "primary side" is, among the spaces partitioned by the separation membrane, the side to which a separation target liquid (raw water) is fed, and the "secondary side" is an opposite side of the membrane from the "primary side". That is, the primary side indicates the outer side of the membrane in an external pressure-type hollow-fiber membrane module. The "primary side" and "secondary side" may be interchanged with "feed side" and "permeation side", respectively.

The specific configuration of the hollow-fiber membrane module is described, for example, with an external pressure-type hollow-fiber membrane module by referring to the drawings.

The hollow-fiber membrane module 100 of FIG. 1 includes a cylindrical case 3 being open at upper and lower ends, a plurality of hollow-fiber membranes 1 housed in the cylindrical case 3, an upper cap 6, and a lower cap 7. In the cylindrical case 3, the upper cap 6 is fixed, in the height direction, to the upper end (first end) and the lower cap 7 is fixed to the lower end (second end). Furthermore, the hollow-fiber membrane module 100 includes a first potting part 4 and a second potting part 5. Here, the "upper" and "lower" indicate top and bottom in a posture when using the hollow-fiber membrane module 100 and correspond to top and bottom of FIG. 1.

The plurality (multiple number) of hollow-fiber membranes 1 are bundled to form a hollow-fiber membrane bundle 2. The filling ratio of the hollow-fiber membrane 1 in the cylindrical case 3 is from 25 to 38%. Details of the filling ratio are described later. In addition, it is preferred that the hollow-fiber membranes 1 are disposed evenly in the membrane module. Accordingly, a crimp, etc. may be attached to the hollow-fiber membrane for the purpose of preventing adhesion between a fiber and a fiber In this embodiment, upper ends and lower ends of the hollow-fiber membranes 1 are bundled by the first potting part 4 and the second potting part 5, respectively. The first potting part 4 is located on the first end side of the cylindrical case 3, and the second potting part 5 is located on the second end side of the cylindrical case 3. In this embodiment, the end face at the upper end of the hollow-fiber membrane bundle 2 is bundled by the first potting part 4 while it being open, and the end face at the lower end of the hollow-fiber membrane bundle 2 is bundled by the second potting part 5 while it being sealed (i.e., in the closed state).

In FIG. 1, both potting parts (first potting part 4 and second potting part 5) are fixed inside of the cylindrical case 3, and the hollow-fiber membrane bundle 2 is thereby fixed in the cylindrical case 3. That is, the second potting part 5 is disposed to face the first potting part 4.

The first potting part 4 and second potting part 5 are formed of a so-called potting agent. In addition, the first potting part 4 and the second potting part 5 may be bonded and fixed in a container such as cylindrical container, if necessary, and the container is liquid-tightly and air-tightly fixed inside of the cylindrical case 3 with use of a sealing material such as O ring or packing, thereby forming a cartridge containing the hollow-fiber membrane 1, the first potting part 4, and the second potting part 5 to fix the hollow-fiber membrane bundle 2 in the cylindrical case 3.

The second potting part 5 has a large number of through holes 11 continuing from the surface facing the first potting part 4 to the reverse surface. The through hole 11 functions as a raw water inflow channel introducing raw water into the cylindrical case 3.

The raw water flows into the hollow-fiber membrane module 100 through a raw water inflow port 8 of the lower cap 7, and raw water not passed through the hollow-fiber membrane 1 is discharged through a concentrated liquid outlet 10 to the outside of the hollow-fiber membrane module 100.

The permeated liquid having passed through the hollow-fiber membrane 1 is discharged through a permeated liquid outlet 9 of the upper cap 6 to the outside of the hollow-fiber membrane module 100. In this way, the cross-flow filtration method of filtering water can be conducted while allowing raw water to generate a flow (cross-flow) parallel to the membrane surface.

In addition, when the concentrated outlet 10 is closed, dead-end filtration of filtering the entire volume of raw water can be conducted. Here, the raw water inflow port may be present in the lower part of the module as in FIG. 1, or one or more nozzles may be provided on the side surface to serve as a raw water inflow port.

More specific configurations of the members described above and members that the hollow-fiber membrane module can further include are described.

(2) Hollow-Fiber Membrane

The hollow-fiber membrane module includes a separation membrane in hollow fiber form (hollow-fiber membrane). The hollow-fiber membrane may be either a microfiltration membrane or an ultrafiltration membrane. In the present invention, the hollow-fiber membrane is a porous hollow-fiber membrane.

The pore size of the hollow-fiber membrane is not particularly limited, and in order to successfully separate suspended solids and dissolved components in raw water, the pore size can be appropriately selected within the range of the average pore size of 0.001 μm or more and less than 10 μm. The average pore size of the hollow-fiber membrane is determined according to the method described in ASTM: F316-86 (also known as the half-dry method). The half-dry method determines an average pore size of a minimum pore size layer of the hollow-fiber membrane.

As to the standard measurement conditions for the measurement of average pore size by the half-dry method, the liquid used is ethanol, the measurement temperature is 25° C., and the pressure rise rate is 1 kPa/sec. The average pore size [μm] is determined according to the following formula:

Average pore size [μm]=(2860×surface tension [mN/m])/half-dry air pressure [Pa]

The surface tension of ethanol at 25° C. is 21.97 mN/m (The Chemical Society of Japan (compiler), *Handbook of Chemistry: Pure Chemistry*, 3rd ed., page II-82, Maruzen, 1984) and therefore, under the standard measurement conditions, the average pore diameter can be determined according to the following formula:

Average pore size [μm]=62834.2/(half-dry air pressure [Pa])

The hollow-fiber membrane includes an external pressure type of filtering water from outer side toward inner side of the hollow fiber and an internal pressure type of filtering water from inner side toward outer side, and an external pressure-type hollow-fiber membrane unsusceptible to occurrence of clogging by suspended solids is more preferable. In addition, a membrane having strong breaking tenacity is preferable so as to prevent the membrane from being broken by the stress due to physical cleaning during operation of the module or by the weight of deposits. The lower limit of the breaking tenacity is preferably 600 g or more per single yarn of the hollow-fiber membrane.

In the present invention, the filling ratio of the hollow-fiber membrane in the cylindrical case is from 25 to 38% and is relatively low, so that even a liquid containing a high concentration of suspended solids can be caused to flow while preventing clogging within the module. The lower limit value of the filling ratio of the hollow-fiber membrane is more preferably 30% or more, and the upper value of the filling ratio of the hollow-fiber membrane is more preferably 38% or less.

In order to reduce the filling ratio of the hollow-fiber membrane, the number of hollow-fiber membranes per module may be decreased. However, when the number of hollow-fiber membranes is decreased, the membrane surface of one hollow-fiber membrane module decreases and therefore, for obtaining a permeated liquid flow rate at the same level as in a module having a large membrane area, the permeated liquid flow rate per unit membrane area or the number of modules must be increased. When the permeated liquid flow rate per unit membrane area is increased, clogging of the membrane is expedited. In addition, when the number of modules is increased, the equipment cost and running cost rise. The "membrane area" as used herein means the surface area of a hollow-fiber membrane at a site used for separation and is the surface area of the outer circumference of a hollow-fiber membrane in a portion where the outer circumference is not covered by a potting part, etc. but is exposed.

In the hollow-fiber membrane module of the present invention, the membrane area per unit volume is from 800 to 3,700 $m^2/m^3$.

With a membrane area in this range, even when the filling ratio is relatively low, reduction in the membrane area can be prevented. As a result, rapid clogging of the membrane is prevented and at the same time, accumulation of suspended solids in the module is reduced, enabling a stable operation over a long period of time. The membrane area per unit volume is more preferably from 800 to 2,300 $m^2/m^3$.

Here, defining V as the volume of space utilized for filtration within a hollow-fiber membrane module and A as the membrane surface, the membrane area per unit volume can be expressed by the following formula:

Membrane area per unit volume [$m^2/m^3$]=$A/V$

Here, the volume of space utilized for filtration within a hollow-fiber membrane module is the volume of space in the cylindrical case of a portion where the hollow-fiber membrane is present without being covered by a potting part, etc. and thus being exposed. For example, in FIG. 1, when the distance from the bottom surface of the first potting part 4 to the top surface of the second potting part 5 is denoted as the module length L and the cross-sectional area of the hollow-fiber membrane existing region is denoted by S1, the volume of space V utilized for filtration within the hollow-fiber membrane module can be expressed by the following formula:

Volume of space $V$ [$m^3$]=$L \times S1$

Here, as to the module length L, for example, in a module not including a second potting part, a portion having a longest distance in an area where the hollow-fiber membrane is present without being covered by a potting part, etc. and thus being exposed is employed.

For example, in the case of a module described in JP-A-11-342320 where a plurality of hollow-fiber membranes are bundled in a U-shape and inserted into a cylindrical case and both ends of the hollow-fiber membrane are potted in a first potting part and kept open, the distance from the contact part of the U-shape of the hollow-fiber membranes to the bottom of the first potting part is defined as L. In addition, the hollow-fiber membrane existing region is a region surrounding a hollow-fiber membrane on the outermost side in a transverse cross-section of the hollow-fiber membrane module. Details of the existing region are described later.

In order to make the membrane area per unit volume to fall within the range above, a method of reducing the outside diameter of the hollow-fiber membrane can be adopted. When the cylindrical case is filled with a hollow-fiber membrane having a small outside diameter, the filling ratio can be decreased while preventing the reduction in the membrane area.

However, in the follow-fiber membrane having a small outside diameter of the conventional technique, the transverse cross-sectional area of the membrane decreases and since the area of the tensile load application part is consequently small, the force capable of withstanding the tensile is low, giving rise to a problem that the membrane is broken by the stress due to physical cleaning during operation of the module or by the weight of deposits and in turn, raw water leaks to the permeated liquid side to make the separation difficult.

Accordingly, in the hollow-fiber membrane of the present invention, the breaking strength is 23 MPa or more, so that membrane breakage during operation can be avoided and the operation can be stably performed even with a liquid containing a high concentration of suspended solids. The method for measuring the breaking strength is not particularly limited, but the breaking strength can be measured, for example, using a tensile tester by performing a tensile test of a sample having a measurement length of 50 mm five or more times at a tensile speed of 50 mm/min while changing the sample, and determining an average value of the breaking strength. The breaking strength of the hollow-fiber membrane is preferably from 23 to 70 MPa, more preferably from 30 to 60 MPa.

In the present invention, from the viewpoint of securing the membrane area of the hollow-fiber membrane module and preventing the change of shape of the hollow-fiber membrane due to fluid pressure during operation of the module, the outside diameter of the hollow-fiber membrane is preferably 1.2 mm or less. Furthermore, the outside diameter of the hollow-fiber membrane is preferably from 0.5 to 1.2 mm, more preferably from 0.8 to 1.2 mm.

The inside diameter of the hollow-fiber membrane is preferably 0.2 mm or more. When the inside diameter is 0.2 mm or more, the resistance of permeated liquid flowing in a hollow part of the hollow-fiber membrane can be kept small. The preferred range of the inside diameter of the hollow-fiber membrane is determined by the ratio of inside diameter/membrane thickness and the length of the outside diameter. The inside diameter/membrane thickness ratio of the hollow-fiber membrane is preferably from 0.85 to 8, because the change of shape of the hollow-fiber membrane due to fluid pressure during operation of the module can be prevented.

In the present invention, the filling ratio of the hollow-fiber membrane in the cylindrical case is from 25 to 38% and is relatively low, so that even a liquid containing a high concentration of suspended solids can be caused to flow while preventing clogging within the module. The filling ratio of the hollow-fiber membrane can be reduced by decreasing the number of hollow-fiber membranes, which, however, as described above, leads to a problem that the module life is shortened due to decrease in the membrane area or the cost increases.

Then the cylindrical case is filled with a hollow-fiber membrane having a small outside diameter, and the filling ratio can be decreased while preventing the reduction in the membrane area. By setting the outside diameter to be 1.2 mm or less, the filling ratio can thereby be sufficiently reduced to a level capable of eliminating the accumulation of suspended solids.

As the hollow-fiber membrane of the present invention, a hollow-fiber membrane of various membrane materials can be used. Examples thereof include membranes made of polyvinylidene fluoride, polysulfone, polyethersulfone, polytetrafluoroethylene, polyethylene, polypropylene, etc. Above all, a separation membrane containing a fluororesin-based polymer being resistant to contamination by an organic material, easy of cleaning and excellent in durability is preferred.

The specific configuration of the hollow-fiber membrane module of the present invention is described, for example, with a porous hollow-fiber membrane containing a fluororesin-based polymer by referring to the following two porous hollow-fiber membranes A and B.

First, a porous hollow-fiber membrane A is described below.

(2-1A) Porous Hollow-Fiber Membrane A (a) Fluororesin-Based Polymer

The porous hollow-fiber membrane of the present invention preferably contains a fluororesin-based polymer.

The fluororesin-based polymer as used in the present description means a resin containing at least one of a vinylidene fluoride homopolymer and a vinylidene fluoride copolymer. The fluororesin-based polymer may contain a plurality of kinds of vinylidene fluoride copolymers.

The vinylidene fluoride copolymer is a polymer having a vinylidene fluoride residue structure and is typically a copolymer of a vinylidene fluoride monomer and other fluorine-based monomer, etc. Such a copolymer includes, for example, a copolymer of vinylidene fluoride and one or more kinds of monomers selected from vinyl fluoride, tetrafluoroethylene, hexafluoropropylene and chlorotrifluoroethylene.

In addition, a monomer other than the above-described fluorine-based monomer, for example, ethylene, may be copolymerized to the extent not impairing the effects of the present invention.

The weight average molecular weight of the fluororesin-based polymer may be appropriately selected according to the strength and water permeation performance required for the polymer separation membrane, but as the weight average molecular weight is larger, the water permeation performance is reduced, and as the weight average molecular weight is smaller, the strength is reduced. For this reason, the weight average molecular weight is preferably from 50,000 to 1,000,000. In the case of a water treatment application where the polymer separation membrane is subject to chemical cleaning, the weight average molecular weight is preferably from 100,000 to 700,000, more preferably from 150,000 to 600,000.

The porous hollow-fiber membrane preferably contains the fluororesin-based polymer as a main component. Containing the fluororesin-based polymer as a main component indicates that the proportion of the fluororesin-based polymer in the porous hollow-fiber membrane is 50 wt % or more. The proportion of the fluororesin-based polymer in the porous hollow-fiber membrane is more preferably 80 wt % or more, still more preferably 90 wt % or more, yet still more preferably 95 wt % or more. The porous hollow-fiber membrane may be composed of only the fluororesin-based polymer.

Here, the "porous hollow-fiber membrane containing the fluororesin-based polymer as a main component" can be interchanged with "porous hollow-fiber membrane based on the fluororesin-based polymer". In the present description, other elements are also described by the phrase "X includes Y as a main component", and with respect to X, this can similarly be interchanged with "based on Y".

(b) Orientation of Molecular Chain

In the porous hollow-fiber membrane of the present invention, the molecular chain of the fluororesin-based polymer is oriented in the longitudinal direction of the porous hollow-fiber membrane. The orientation degree π of the molecular chain is preferably 0.4 or more and less than 1.0. The orientation degree π is calculated from a half-width H (°) obtained by wide-angle X-ray diffraction determination, based on the following formula (1):

$$\text{Orientation degree } \pi = (180° - H)/180° \quad (1)$$

(in which H is a half-width (°) of the diffraction intensity distribution in the circumferential direction of a wide-angle X-ray diffraction image).

The orientation of the molecular chain in the longitudinal direction of the porous hollow-fiber membrane and the method for measuring the orientation degree π thereof are specifically described below.

In order to calculate the orientation degree π, the porous hollow-fiber membrane is fixed to a fiber sample stage by arranging its longitudinal direction to run vertically. Here, the short-side direction of the porous hollow-fiber membrane is a direction parallel to the diameter direction of the hollow fiber, and the longitudinal direction is a direction perpendicular to the short-side direction. The short-side direction can be interchanged with a direction parallel to the hollow plane, i.e., an in-plane direction of the hollow plane, and the longitudinal direction can be interchanged with a direction perpendicular to the hollow plane.

When X-ray diffraction is performed, an annular diffraction image called a Debye-Scherrer ring is obtained. In the case of a non-oriented sample, a great change is not observed in the diffraction intensity along the Debye-Scherrer ring, but in the case of an oriented sample, the intensity distribution is biased on the Debye-Scherrer ring. Accordingly, the orientation degree can be calculated from this intensity distribution based on formula (1).

More specifically, in the case where the molecular chain is non-oriented, when 2θ/θ scanning is performed in the short-side direction (i.e., when a diffraction pattern showing a diffraction intensity distribution in the diameter direction of Debye-Scherrer ring is obtained), a peak is observed at a position around the diffraction angle 2θ=20°. The abscissa axis of the diffraction pattern obtained here is the diffraction angle 2θ of X-ray, and the ordinate axis is the diffraction intensity. Furthermore, the sample is scanned in the azimuth angle β direction by fixing the diffraction angle 2θ to the peak position above, i.e., around 20°, and a diffraction pattern in which the abscissa axis shows the azimuth angle β and the ordinate axis shows the diffraction intensity (i.e., a diffraction intensity distribution along the circumferential direction of Debye-Scherrer ring at the position of diffraction angle 2θ=20°) is thereby obtained. In the case of a non-oriented sample, the diffraction intensity is substantially constant throughout 360° in the circumferential direction of Debye-Scherrer ring.

On the other hand, in the case where the molecular chain is oriented in the longitudinal direction of the porous hollow-fiber membrane, a strong diffraction intensity is observed on the azimuth angle corresponding to the short-side direction of the hollow-fiber membrane (i.e., on the equatorial line) on the Debye-Scherrer ring around 2θ=20°, and a small diffraction intensity is obtained in other portions. More specifically, in the case of an oriented sample, the diffraction intensity distribution in the diameter direction of Debye-Scherrer ring shows a diffraction peak around 2θ=20°, similarly to a non-oriented sample, and the distribution in the circumferential direction shows, unlike a non-oriented sample, a diffraction peak on the azimuth angle corresponding to the short-side direction of the hollow-fiber membrane.

In the description above, the position of diffraction peak in the diameter direction of Debye-Scherrer ring (i.e., the value of 2θ corresponding to the diffraction peak) is "around 20°". However, the value of 2θ differs depending on the structure or blending of a polymer and may range from 15 to 25°. For example, when X-ray diffraction is performed for a polyvinylidene fluoride homopolymer having an α crystal or β crystal, a diffraction peak derived from a (110) plane of α crystal or β crystal, i.e., a plane parallel to molecular chain, is observed around 2θ=20.4°.

As described above, the intensity distribution in the azimuth angle direction is obtained by fixing the value of diffraction angle 2θ and furthermore, measuring the intensity from 0° to 360° in the azimuth angle direction (circumferential direction). This intensity distribution may also be said to be an intensity distribution obtained by scanning a crystal peak in a diffraction image in the circumferential direction. Here, when the ratio between the intensity at an azimuth angle of 180° (longitudinal direction) and the intensity at an azimuth angle of 90° (short-side direction) is 0.80 or less or 1.25 or more, it is regarded that a peak is present, and using the intensity distribution in this azimuth angle direction, the width at a position of half the peak height (half-width H) is determined.

The orientation degree π is calculated by substituting the half-width H into formula (1).

In the porous hollow-fiber membrane of the present invention, the orientation degree π of the molecular chain in the longitudinal direction of the porous hollow-fiber membrane is 0.4 or more and less than 1.0, preferably 0.5 or more and less than 1.0, more preferably 0.6 or more and less than 1.0.

When the orientation degree π is 0.4 or more, the mechanical strength of the porous hollow-fiber membrane is increased. In addition, when wide-angle X-ray diffraction measurement is performed at measurement points at 1 cm intervals in the longitudinal direction of the porous hollow-fiber membrane, the orientation degree π is preferably 0.4 or more and less than 1.0 at 80% or more of the measurement points.

In the intensity distribution obtained by scanning a crystal peak in the circumferential direction, when the ratio between the intensity at an azimuth angle of 180° and the intensity at an azimuth angle of 90° is more than 0.80 and less than 1.25, it is regarded that a peak is absent. That is, in this case, the fluororesin-based polymer is determined to be non-oriented.

In the case where the hollow-fiber membrane contains an α crystal or β crystal of polyvinylidene fluoride, the half-width H is preferably determined from an intensity distribution obtained by circumferentially scanning a crystal peak (2θ=20.4°) derived from a (110) plane of the α crystal or β crystal of polyvinylidene fluoride in wide-angle X-ray diffraction measurement.

The orientation of the molecular chain of the present invention can be determined by an orientation analysis according to Raman spectroscopy.

First, a porous hollow-fiber membrane is sliced by cutting with a microtome from a cross-section along the longitudinal direction of the porous hollow-fiber membrane. The thus-obtained section is observed under an optical microscope, and laser Raman measurement is thereby performed at 1 μm intervals along the longitudinal direction of a columnar texture while confirming the columnar texture.

For example, in the case where the fluororesin-based polymer is a polyvinylidene fluoride homopolymer, the Raman band around 1,270 cm$^{-1}$ is assigned to a coupling mode of $CF_2$ (fluorocarbon) stretching vibration and CC (carbon-carbon) stretching vibration. The vibration direction of these vibrations is in a mode parallel to molecular chain. On the other hand, the vibration direction of the Raman band around 840 cm$^{-1}$ is perpendicular to molecular chain. Since strong Raman scattering is obtained when the vibration direction of molecular chain coincides with the polarization direction of incident light, the scattering intensity ratio between these vibration modes is changed in correlation with the orientation degree.

The orientation parameter can therefore be calculated according to the following formula (2). The orientation parameter shows a larger value as the orientation in the longitudinal direction of the porous hollow-fiber membrane is higher, shows a value of 1 in the case of non-orientation, and shows a value smaller than 1 when the orientation in the short-side direction is high.

$$\text{Orientation parameter} = (I1270/I840)\text{parallel}/(I1270/I840)\text{perpendicular} \quad (2)$$

In formula (2), parallel condition: the longitudinal direction of the porous hollow-fiber membrane is parallel to the polarization direction, perpendicular condition: the longitudinal direction of the porous hollow-fiber membrane is orthogonal to the polarization direction, I1270 parallel: the intensity of Raman band at 1,270 cm$^{-1}$ under parallel condition, I1270 perpendicular: the intensity of Raman band at 1,270 cm$^{-1}$ under perpendicular condition, I840 parallel: the intensity of Raman band at 840 cm$^{-1}$ under parallel condition, and I840 perpendicular: the intensity of Raman band at 840 cm$^{-1}$ under perpendicular condition.

In the present invention, with respect to one porous hollow-fiber membrane, the measurement is performed at 3 points on each of 10 columnar textures different from one another, orientation parameters of respective points are calculated according to formula (2), and an average value of respective orientation parameters is defined as the Raman orientation parameter ν. In addition, with respect to a largest orientation parameter and a smallest orientation parameter among three measurement points on each of 10 columnar textures different from one another, respective average values are determined, and M/m is calculated by denoting M as the maximum Raman orientation parameter and m as the minimum Raman orientation parameter.

In order to accurately determine the Raman orientation parameter ν, maximum Raman orientation parameter M, minimum Raman orientation parameter m, and M/m, the measurement is preferably performed at 10 points, more preferably at 20 points, on each of 10 columnar textures different from one another.

In the porous hollow-fiber membrane of the present invention, the Raman orientation parameter ν of molecular chain in the longitudinal direction of the porous hollow-fiber membrane is preferably 3.0 or more, more preferably 3.4 or more, still more preferably 3.7 or more. With an orientation parameter ν of 3.0 or more, the strength of the porous hollow-fiber membrane is increased.

The maximum Raman orientation parameter M and the minimum Raman orientation parameter m indicate a main orientation site in the columnar texture and a point of effort during stretching, respectively. Although M and m may be set to appropriate ranges by taking into account a balance of performances such as strength, elongation and water permeability of the obtained porous hollow-fiber membrane, M/m is preferably larger because of a tendency that orientation of molecular chain proceeds and the strength of the porous hollow-fiber membrane increases. For this reason, in the present invention, M/m is preferably 3 or more, more preferably 4 or more, still more preferably 5 or more.

The orientation degree π determined by wide-angle X-ray diffraction measurement represents the orientation of molecular chain of the entire porous hollow-fiber membrane. In addition, the Raman orientation parameter ν determined by Raman spectroscopy tends to represent the orientation of molecular chain when focus is directed onto the columnar texture of the porous hollow-fiber membrane, i.e., the orientation of the local molecular chain.

When both the molecular chain of the entire porous hollow-fiber membrane and the local molecular chain are strongly oriented, the strength of the porous hollow-fiber membrane increases. Accordingly, it is preferred that the orientation degree π is 0.6 or more and less than 1.0 and the Raman orientation parameter ν is 3.4 or more, and it is more preferred that the orientation degree π is 0.7 or more and less than 1.0 and the Raman orientation parameter ν is 3.7 or more.

(c) Columnar Texture (i) Dimension

The porous hollow-fiber membrane has a columnar texture oriented in the longitudinal direction of the porous hollow-fiber membrane. The "columnar texture" is a solid material having a shape long in one direction. The aspect ratio (longitudinal length/short-side length) of the columnar texture is preferably 3 or more.

Here, the "longitudinal length" indicates the length in the longitudinal direction of the columnar texture. The "short-side length" is an average length in the short-side direction of the columnar texture.

The longitudinal length and short-side length can be measured as follows. A hollow-fiber membrane is cut along the longitudinal direction of the hollow-fiber membrane, and the obtained cross-section is observed using a scanning electron microscope (SEM). The magnification is variable according to the length of the columnar texture and is set to a level allowing a visual field to include the entire figure of each of 5, preferably 10, columnar textures over its longitudinal direction. In the case where the length in the longitudinal direction length varies in one columnar texture, a maximum length in the longitudinal direction may be measured as the longitudinal length.

The short-side length is determined by measuring the length in each short-side direction at a predetermined number of arbitrary measurement points in one columnar texture and calculating an average value thereof. The number of measurement points is a value obtained by dividing the longitudinal length (μm) by 1 μm (rounded down to the nearest integer). For example, when the longitudinal length of the columnar texture is 20.5 μm, the number of measurement points is 20. In this connection, when the value becomes 21 or more, the length may be measured at arbitrary 20 points.

The longitudinal length of the columnar texture is not particularly limited but is preferably 7 μm or more, more preferably 10 μm or more, still more preferably 15 μm or more. The longitudinal length of the columnar texture is, for example, preferably 50 µm or less, more preferably 40 µm or less.

In the present invention, the short-side length of the columnar texture is preferably from 0.5 to 3 µm. The short-side length is preferably in the range above, because high strength performance and high pure-water permeation performance are obtained.

When the short-side length of the columnar texture is 0.5 µm or more, physical strength of the columnar texture itself is increased and therefore, high strength is obtained. When the short-side length of the columnar texture is 3 µm or less, the void among columnar textures becomes large and in turn, good pure-water permeation performance is obtained. The short-side length of the columnar texture is more preferably from 0.7 to 2.5 µm, still more preferably from 1 to 2 µm.

In the porous hollow-fiber membrane of the present invention, preferable ranges of representative values of the longitudinal length and short-side length of the columnar texture are respectively the same as the above-described preferable ranges of the longitudinal length and short-side length of each individual columnar texture. In addition, as for the effects due to each representative value in that range, description of effects when individual columnar textures have a dimension in that range is applied.

The representative value of the longitudinal length is measured as follows. Similar to the measurement of longitudinal length, the longitudinal length is measured at the positions of 3 sites, preferably 5 sites, in the hollow-fiber membrane for 5, preferably 10, columnar textures per site. With respect to the obtained values of the longitudinal length, an average value is determined, and the value obtained can be used as the representative value of the longitudinal length of the columnar texture.

The representative value of the short-side length is determined by measuring the short-side length (calculated as an average value) as described above for columnar textures which were subject to measurement of the representative value of the longitudinal length, and calculating an average value thereof.

In the porous hollow-fiber membrane of the present invention, the representative value of the aspect ratio of the columnar texture calculated from the representative value of the longitudinal length and the representative value of the short-side length is preferably 3 or more, more preferably 5 or more, still more preferably 10 or more, yet still more preferably 20 or more.

In the present invention, it is preferred that the short-side length of the columnar texture is from 0.5 to 3 µm and the aspect ratio of the columnar texture is 3 or more.

(ii) Thickness Uniformity

As described later, the porous hollow-fiber membrane of the present invention can be produced by forming a hollow fiber from a membrane-forming solution containing a polymer and stretching the hollow fiber. For the sake of convenience, the state before stretching is referred to as "hollow fiber", and the state after stretching is referred to as "hollow-fiber membrane".

The thickness uniformity (the later-described average value D) of the columnar texture in the hollow-fiber membrane after stretching is preferably 0.60 or more, more preferably 0.70 or more, still more preferably 0.80 or more, yet still more preferably 0.90 or more. Although the thickness uniformity is 1.0 at most, the columnar texture may have a thickness uniformity of less than 1.0.

In the hollow-fiber membrane, the columnar texture has a high thickness uniformity in this way, i.e., a narrowed portion is little formed in the columnar texture, and the hollow-fiber membrane thereby exhibits high elongation.

When the porous hollow-fiber membrane after stretching keeps high elongation, this is advantageous in that fiber breakage is less likely to occur even at the time of an abrupt application of load. The elongation at break of the porous hollow-fiber membrane is preferably 50% or more, more preferably 80% or more.

The thickness uniformity is described below. As the length variation in each short-side direction of the columnar texture is smaller, a narrowed portion is less formed in the columnar texture, resulting in high thickness uniformity, and the columnar texture comes close to a perfect column.

The thickness uniformity of the columnar texture is determined by comparing a first cross-section and a second cross-section each running in parallel to the short-side direction of the porous hollow-fiber membrane. This is specifically described below.

Firstly, a first cross-section and a second cross-section running in parallel to each other are selected. The distance between the first cross-section and the second cross-section is set to be 5 µm. In each cross-section, a portion composed of resin and a void portion are first distinguished, and the area of resin portion and the area of void portion are measured.

Next, the area of a portion where when the first cross-section is projected onto the second cross-section, the portion composed of resin in the first cross-section and the portion composed of resin in the second cross-section are overlapped, namely, the overlap area, is determined. With respect to arbitrary 20 pairs of first cross-section and second cross-section in one hollow-fiber membrane, thickness uniformities A and B are determined based on the following formulae (3) and (4), respectively:

$$\text{Thickness uniformity } A = (\text{overlap area})/(\text{area of resin portion of second cross-section}) \quad (3)$$

$$\text{Thickness uniformity } B = (\text{overlap area})/(\text{area of resin portion of first cross-section}) \quad (4)$$

That is, 20 pairs of thickness uniformities A and B are obtained for one hollow-fiber membrane. A larger value means that the thickness of the columnar texture is more uniform. Then, with respect to each pair, an average value C of thickness uniformities A and B is calculated. That is, 20 average values C are obtained for one hollow-fiber membrane. With respect to these average values C, an average value D is further calculated. The average value D is the thickness uniformity of this hollow-fiber membrane.

In the case where 80% or more of 20 average values C calculated for one hollow-fiber membrane have a value of 0.60 or more, the hollow-fiber membrane can be said to have a columnar texture.

In measuring the thickness uniformity, in order to clearly distinguish the resin portion and the void portion, it is preferable to previously perform resin-embedding of the porous hollow-fiber membrane in an epoxy resin, etc. and dyeing treatment of the epoxy resin, etc. with osmium or the like. By such resin embedding/dyeing treatment, the void portion is filled with an epoxy resin, etc., and at the time of cross-sectional processing with a focused ion beam described later, the portion composed of a fluororesin-based polymer and the void portion (i.e., the epoxy resin portion) can be clearly distinguished, as a result, high observation accuracy is obtained.

Furthermore, in order to obtain the above-described first cross-section and second cross-section each running in parallel to the short-side direction of the porous hollow-fiber membrane, a scanning electron microscope (SEM) equipped with a focused ion beam (FIB) is preferably used. A face parallel to the short-side direction of the porous hollow-fiber membrane is cut out using FIB, and FIB cutting and SEM observation are repeatedly conducted 200 times at 50 nm intervals toward the longitudinal direction of the porous hollow-fiber membrane. By such continuous cross-section observation, information at a depth of 10 µm can be obtained.

Arbitrary first and second cross-sections working out to the faces running in parallel to each other and being spaced 5 µm apart are selected therefrom, and the thickness uniformities can be determined using formulae (3) and (4). The observation magnification may be sufficient if it is a magnification enabling clear identification of a columnar texture and a spherical texture, and, for example, a magnification of 1,000 to 5,000 times may be used.

(iii) Composition

The columnar texture contains a fluororesin-based polymer. The columnar texture preferably contains the fluororesin-based polymer as a main component. Containing the fluororesin-based polymer as a main component indicates that the proportion of the fluororesin-based polymer in the columnar texture is 50 wt % or more. The proportion of the fluororesin-based polymer in the columnar texture is preferably 80 wt % or more, more preferably 90 wt % or more, still more preferably 95 wt % or more. The columnar texture may be composed of only the fluororesin-based polymer.

In other words, the porous hollow-fiber membrane has a solid matter containing a fluororesin-based polymer, and at least part of the solid matter constitutes a columnar texture. All of solid matters containing a fluororesin-based polymer may constitute a columnar texture, or part thereof may have a shape not falling under a columnar texture. In the porous hollow-fiber membrane, out of solid matters containing a fluororesin-based polymer, the proportion of the solid matter constituting a columnar texture is preferably 80 wt % or more, more preferably 90 wt % or more, still more preferably 95 wt % or more.

(iv) Columnar Texture in Hollow-Fiber Membrane

In the porous hollow-fiber membrane, the principal structure is preferably a columnar texture. The principal structure being a columnar texture means that the proportion of the columnar texture in the porous hollow-fiber membrane is 50 wt % or more. In the porous hollow-fiber membrane, the proportion of the columnar texture is more preferably 80 wt % or more, still more preferably 90 wt % or more, yet still more preferably 95 wt % or more. The porous hollow-fiber membrane may be composed of only a columnar texture.

More specifically, the porous hollow-fiber membrane preferably has, as the principal structure, a columnar texture containing a fluororesin-based polymer as a main component.

The porous hollow-fiber membrane can also be phrased as an aggregate of columnar textures.

The "oriented in the longitudinal direction" as used herein means that out of angles between the longitudinal direction of the columnar texture and the longitudinal direction of the porous hollow-fiber membrane, the acute angle is within 20°.

(d) Others

The porous hollow-fiber membrane of the present invention may contain a texture other than the above-described columnar texture, to the extent not deviating from the object of the present invention. The structure other than the columnar texture includes, for example, a spherical texture having an aspect ratio (longitudinal length/short-side length) of less than 3. The short-side length and longitudinal length of the spherical texture are preferably from 0.5 µm to 3 µm. In the case of using a spherical texture, when the short-side length and longitudinal length thereof are in the range above, reduction in the strength of the porous hollow-fiber membrane can be prevented, and good pure-water permeation performance can be maintained.

However, if the proportion of such a spherical texture having an aspect ratio of less than 3 in the porous hollow-fiber membrane is increased, it is likely that spherical textures are increasingly coupled with each other to increase the narrowed portion, making it difficult to perform high-ratio stretching or keep the elongation after stretching. For this reason, a smaller proportion of the spherical texture in the porous hollow-fiber membrane is more preferred, and the proportion is preferably less than 20%, more preferably less than 10%, still more preferably less than 1% (almost no spherical texture), and it is most preferred that the spherical texture is not present at all.

Here, the occupancy (%) of each texture is determined according to the following formula (5) by taking a photograph of a cross-section in the longitudinal direction of the porous hollow-fiber membrane by means of SEM, etc. at a magnification enabling clear identification of a columnar texture and a spherical texture, preferably at a magnification of 1,000 to 5,000 times. In order to increase the accuracy, it is preferable to determine the occupancy for arbitrary 20 or more, preferably 30 or more, cross-sections and calculate an average value thereof.

$$\text{Occupancy (\%)} = \{(\text{area occupied by each texture})/(\text{area of entire photograph})\} \times 100 \qquad (5)$$

Incidentally, the area of the entire photograph and the area occupied by a texture can be determined preferably by employing a method of converting the area into a weight corresponding to each texture photographed. That is, after the photograph taken is printed on paper, the weight of paper corresponding to the entire photograph and the weight of paper corresponding to a texture portion cut out therefrom may be measured. In addition, before taking a photograph by SEM, etc., the above-described resin embedding/dyeing treatment and FIB cutting are preferably applied, because the observation accuracy increases.

The porous hollow-fiber membrane of the present invention may be a matter in which a layer having the above-described columnar texture and a layer having other structure are stacked to the extent not departing from the object of the present invention. However, if the thickness of the layer having other structure is large compared with the layer having a columnar texture, the object and effects of the present invention can hardly be exerted and therefore, the ratio of the thickness of the layer having other structure to the thickness of the layer having a columnar texture is preferably 0.3 or less, more preferably 0.2 or less.

In the porous hollow-fiber membrane of the present invention, it is preferred that the pure-water permeation performance at 50 kPa and 25° C. is 0.7 $m^3/m^2/hr$ or more and the breaking strength is 25 MPa or more, and it is more preferred that the pure-water permeation performance at 50 kPa and 25° C. is 0.7 $m^3/m^2/hr$ or more and the breaking strength is 30 MPa or more.

Above all, from the viewpoint of providing a high-performance hollow-fiber membrane satisfying both high pure-water permeation performance and high strength performance, it is preferred that the pure-water permeation performance at 50 kPa and 25° C. is from 0.7 to 5.0 m³/m²/hr and the breaking strength is from 25 to 70 MPa, and it is more preferred that the pure-water permeation performance at 50 kPa and 25° C. is from 0.7 to 5.0 m³/m²/hr and the breaking strength is from 30 to 70 MPa.

(2-2A) Production Method of Porous Hollow-Fiber Membrane A

The method for producing the porous hollow-fiber membrane A of the present invention is described below by way of example. The method for producing a porous hollow-fiber membrane includes at least:

1) a step of forming a hollow fiber having a columnar texture from a membrane-forming solution containing a fluororesin-based polymer by thermally induced phase separation, in which the columnar texture is oriented in the longitudinal direction and has a thickness uniformity of 0.60 or more and less than 1.00; and 2) a step of stretching the porous hollow fiber obtained in 1) above to 2.0 to 5.0 times in the longitudinal direction.

(a) Preparation of Membrane-Forming Solution

The production method of the porous hollow-fiber membrane A in the present invention further includes a step of preparing a fluororesin-based polymer solution. A fluororesin-based polymer solution (i.e., a membrane-forming solution containing a fluororesin-based polymer) is prepared by dissolving a fluororesin-based polymer in a poor or good solvent for the fluororesin-based polymer at a relatively high temperature of not less than the crystallization temperature.

When the polymer concentration in the membrane-forming solution is high, a porous hollow-fiber membrane having high strength is obtained. On the other hand, when the polymer concentration is low, the porosity of the porous hollow-fiber membrane is increased, and the pure-water permeation performance is enhanced. Accordingly, the concentration of the fluororesin-based polymer is preferably from 20 to 60 wt %, more preferably from 30 to 50 wt %.

In the present description, the poor solvent is a solvent in which the fluororesin-based polymer cannot be dissolved to a concentration of 5 wt % or more at a low temperature of 60° C. or less but can be dissolved to a concentration of 5 wt % or more in a high-temperature region between 60° C. or more and not more than the melting point of the fluororesin-based polymer (for example, when the polymer is composed of a vinylidene fluoride homopolymer alone, about 178° C.). The good solvent is a solvent in which the fluororesin-based polymer can be dissolved to a concentration of 5 wt % or more even in a low-temperature region of 60° C. or less. The non-solvent is defined as a solvent in which the fluororesin-based polymer is neither dissolved nor swollen at a temperature up to the melting point of the fluororesin-based polymer or the boiling point of the solvent.

The poor solvent for the fluororesin-based polymer includes, for example, cyclohexanone, isophorone, γ-butyrolactone, methyl isoamyl ketone, propylene carbonate, dimethyl sulfoxide, etc., and a mixed solvent thereof.

The good solvent includes, for example, N-methyl-2-pyrrolidone, dimethylacetamide, dimethylformamide, methyl ethyl ketone, acetone, tetrahydrofuran, tetramethylurea, trimethyl phosphate, etc., and a mixed solvent thereof.

The non-solvent includes, for example, water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, an aliphatic hydrocarbon such as low-molecular-weight polyethylene glycol, an aromatic hydrocarbon, an aliphatic polyhydric alcohol, an aromatic polyhydric alcohol, a chlorinated hydrocarbon, other chlorinated organic liquids, and a mixed solvent thereof.

(b) Formation of Hollow Fiber

In the hollow fiber forming step, a hollow fiber is obtained from a membrane-forming solution containing a fluororesin-based polymer by utilizing a thermally induced phase separation method of inducing phase separation by temperature change. In order to perform the later-described high-ratio stretching of 2.0 times or more, it is preferred that the hollow fiber has a columnar texture oriented in its longitudinal direction and the thickness uniformity of the columnar texture is 0.6 or more.

The lower limit of the thickness uniformity of the columnar texture is more preferably 0.70 or more, still more preferably 0.80 or more, yet still more preferably 0.90 or more. The upper limit of the thickness uniformity of the columnar texture is preferably less than 1.0.

In the thermally induced phase separation method, two kinds of phase separation mechanisms are mainly utilized. One is a liquid-liquid phase separation method in which a polymer solution dissolved uniformly at a high temperature is separated into a polymer rich phase and a polymer poor phase due to reduction in the dissolving ability of the solution during a temperature drop and the structure is thereafter fixed by crystallization. Another is a solid-liquid phase separation method in which a polymer solution dissolved uniformly at a high temperature is phase-separated into a polymer solid phase and a solvent phase due to occurrence of crystallization of the polymer during a temperature drop.

A three-dimensional network structure is mainly formed in the former method, and a spherical structure constituted by a spherical texture is mainly formed in the latter method. In the production of the hollow-fiber membrane of the present invention, the latter phase separation mechanism is preferably utilized. Accordingly, a polymer concentration and a solvent, inducing solid-liquid phase separation, are selected. In the former phase separation mechanism, it is difficult to develop the above-described columnar texture oriented in the longitudinal direction of the hollow fiber. This is because, the polymer rich phase forms a very fine phase by phase separation before the structure is fixed, and cannot be made columnar.

As a specific method, a hollow part-forming liquid is discharged through an inner tube of a double tube-type spinneret for spinning of a porous hollow-fiber membrane while discharging the above-described membrane-forming solution through an outer tube of the double tube-type spinneret. The thus-discharged membrane-forming solution is cooled and solidified in a cooling bath to obtain a porous hollow fiber.

The fluororesin-based polymer solution is, before being discharged through the spinneret, held under a specific temperature condition for a predetermined time while being subjected to pressure. The pressure is preferably 0.5 MPa or more, more preferably 1.0 MPa or more.

The temperature T of the polymer solution preferably satisfies Tc+35° C.≤T≤Tc+60° C., more preferably satisfies Tc+40° C.≤T≤Tc+55° C. Tc is the crystallization temperature of the fluororesin-based polymer solution. The time for which the polymer solution is held under these pressure and temperature is preferably 10 seconds or more, more preferably 20 second or more.

Specifically, a retention part for allowing the polymer solution to stay is provided at any site of a solution feeding line for delivering the polymer solution to the spinneret, and a pressurizing unit for applying a pressure to the retained polymer solution and a temperature-adjusting unit for adjusting the temperature of the retained polymer solution (for example, a heating unit) are provided.

The pressurizing unit is not particularly limited, but by disposing two or more pumps in the solution feeding line, a pressure can be applied at any site therebetween. The pump includes, for example, a piston pump, a plunger pump, a diaphragm pump, a wing pump, a gear pump, a rotary pump, and a screw pump, and two or more kinds of pumps may be used.

Through this step, a pressure is applied under the conditions, in which crystallization easily takes place, it is presumed that crystal growth has anisotropy and in turn, not an isotropic spherical structure but a texture oriented in the longitudinal direction of the porous hollow fiber is developed, as a result, a columnar structure is obtained.

Here, the crystallization temperature Tc of the fluororesin-based polymer solution is defined as follows. In an apparatus for differential scanning calorimetry (DSC measurement), a mixture having the same composition as the membrane-forming polymer solution composition containing a fluororesin-based polymer, a solvent, etc. is sealed in a sealing type DSC container. A temperature of the mixture is raised to a melting temperature at a temperature rise rate of 10° C./min and kept for 30 minutes to melt the mixture uniformly. Then the temperature is lowered at a temperature drop rate of 10° C./min. Tc is a temperature at an onset of α crystallization peak observed in the temperature lowering process.

The cooling bath for cooling the fluororesin-based polymer solution discharged through the spinneret is described below. In the cooling bath, a mixed liquid including a poor or good solvent in a concentration of 50 to 95 wt % and a non-solvent in a concentration of 5 to 50 wt % is preferably used. As the poor solvent, the same poor solvent as that for the polymer solution is preferably used.

For the hollow part-forming liquid, as with the cooling bath, a mixed liquid including a poor or good solvent in a concentration of 50 to 95 wt % and a non-solvent in a concentration of 5 to 50 wt % is preferably used. As the poor solvent, the same poor solvent as that for the polymer solution is preferably employed.

Here, in order to develop not a fibrous texture having a large number of narrowed portions but a columnar texture having a uniform thickness, it is preferable to promote polymer uptake/growth into the narrowed portion. The present inventors have found that the polymer uptake/growth into the narrowed portion leads to disappearance of a narrowed portion having high interface energy and can energetically stabilize the columnar texture and therefore the polymer uptake/growth is caused to preferentially occur over the growth in portions other than the narrowed portion, and have made intensive studies on the method for enhancing the thickness uniformity.

As a result, it has been found that as the method for promoting the polymer uptake/growth into the narrowed portion, the thermally induced phase separation preferably includes at least one of the following cooling steps a) and b):

a) a step of soaking the membrane-forming solution in a cooling bath at a temperature Tb satisfying $Tc-30°$ C.$<Tb\leq Tc$; and b) a step of soaking the membrane-forming solution in a cooling bath at a temperature Tb1 satisfying $Tb1\leq Tc-30°$ C., followed by soaking in a cooling bath at a temperature Tb2 satisfying $Tc-30°$ C.$<Tb2\leq Tc$, (in which Tc is the crystallization temperature of the membrane-forming solution containing a fluororesin-based polymer).

In the present invention, it has been found that as the method a), when cooling/solidification in a cooling bath is performed near the crystallization temperature of the polymer solution, the cooling/solidification slowly proceeds. In this case, denoting Tc as the crystallization temperature of the fluororesin-based polymer solution, the temperature Tb of the cooling bath is caused to satisfy $Tc-30°$ C.$<Tb\leq Tc$, and $Tc-20°$ C.$<Tb\leq Tc$ is more preferred.

The passing time of the cooling bath (i.e., soaking time in the cooling bath) is not particularly limited as long as enough time to complete the thermally induced phase separation including the polymer uptake/growth into the narrowed portion can be ensured, and the passing time may be experimentally determined by taking into account the number of hollow-fiber membranes, the spinning speed, the bath ratio, the cooling capacity, etc.

However, in order to achieve thickness uniformity, the passing time is preferably set to be as long as possible in the above-described temperature range of the cooling bath and may be, for example, 10 seconds or more, preferably 20 seconds or more, more preferably 30 seconds or more.

In addition, as the method b), two or more stages of cooling may be performed. Specifically, the cooling step may include a step of cooling the solution by using a first cooling bath for promoting generation/growth of a crystal nucleus by increasing the supercooling degree, and a step of thereafter cooling the solution by using a second cooling bath for promoting polymer uptake/growth into the narrowed portion. The cooling step by the second cooling bath utilizes a phenomenon that the polymer uptake/growth into the narrowed portion preferentially occurs mainly in the structure coarsening process of the phase separation.

In this case, when the temperature Tb1 of the first cooling bath for cooling the fluororesin polymer solution discharged through the spinneret satisfies $Tb1\leq Tc-30°$ C., the generation and growth of a crystal nucleus can be promoted by increasing the supercooling degree, and when the temperature Tb2 of the second cooling bath is set near the crystallization temperature (specifically, set to satisfy $Tc-30°$ C.$<Tb2\leq Tc$, preferably $Tc-20°$ C.$<Tb2\leq Tc$), the polymer uptake/growth into the narrowed portion can be promoted. Tc is the crystallization temperature of the polymer solution.

The passing time of each cooling bath can be varied, but it is preferable to set, for example, the passing time of the first cooling bath to be from 1 to 20 seconds, preferably from 3 to 15 seconds, more preferably from 5 to 10 seconds, and set the passing time of the second cooling bath to be 10 seconds or more, preferably 20 seconds or more, more preferably 30 seconds or more.

When a texture having a thickness uniformity of less than 0.60 is referred to as "fibrous texture" so as to distinguish it from the columnar texture, the hollow-fiber membrane disclosed in JP-A-2006-297383 is a hollow-fiber membrane having a fibrous texture. Such a porous hollow-fiber membrane having a fibrous texture is relatively excellent in strength and pure-water permeation performance, and the present inventors have therefore attempted to increase the strength by stretching this membrane. However, it has been found that the membrane cannot be uniformly stretched and the strength cannot be increased.

In general, a porous membrane used for water treatment has a large number of void parts for passing water and since destruction of the texture proceeds starting from a void part at the time of stretching, the stretching itself is very difficult.

This tendency is prominent when, in particular, the porous hollow-fiber membrane has a phase-separation porous structure obtained by dry-wet spinning utilizing a principle of non-solvent induced phase separation or thermally induced phase separation, because a large number of fine voids are present and the porosity is high.

In the case of the porous membrane having a fibrous texture described in JP-A-2006-297383, it is considered that stress during stretching is dispersed by the fibrous texture oriented in the longitudinal direction and stretching can be performed, although the stretch ratio is as low as less than 2.0 times. However, it is still difficult to uniformly carry out high-ratio stretching of 2.0 times or more, and intensive studies on the cause thereof have revealed that a fibrous texture has many narrowed portions and because a stress is concentrated at the narrowed portion during stretching and the narrowed portion is preferentially stretched, the entire fibrous texture cannot be uniformly stretched, and thus stretch ratio cannot be increased.

In contrast, the present inventors have found that as long as it is not a fibrous texture having a large number of narrowed portions described in JP-A-2006-297383, not a network structure described in Japanese Patent 4,885,539, and not a spherical structure described in International Publication No. 2003/031038 but is a hollow fiber having a columnar texture with uniform thickness, the entire columnar texture can be uniformly stretched and consequently, high-ratio stretching of 2.0 times or more is made possible. Such uniform and high-ratio stretching has yielded success in stretching and orienting the molecular chain of the fluororesin-based polymer in the longitudinal direction of the porous hollow-fiber membrane and success in increasing the strength while maintaining high pure-water permeation performance.

(c) Stretching

Finally, in the present invention, the porous hollow fiber including a fluororesin-based polymer having a columnar texture, obtained by the method above, is stretched at a high ratio whereby the molecular chain of the polymer is oriented in the longitudinal direction of the hollow-fiber membrane.

The stretch ratio is from 2.0 to 5.0 times, more preferably from 2.5 to 4.0 times, still more preferably from 2.5 to 3.5 times. If the stretch ratio is less than 2.0 times, orientation of the molecular chain by stretching is insufficient, and if the stretch ratio exceeds 5.0 times, reduction of the elongation becomes large.

The stretching temperature is preferably from 60 to 140° C., more preferably from 70 to 120° C., still more preferably from 80 to 100° C., and if the membrane is stretched in a low-temperature atmosphere of less than 60° C., it is difficult to stably and homogeneously stretch the membrane. If the membrane is stretched at a temperature exceeding 140° C., since the temperature is close to the melting point of the fluororesin-based polymer, the structure texture may be melted to reduce the pure-water permeation performance.

Stretching in a liquid is preferred, because the temperature control is easy, but the stretching may be performed in a gas such as steam. As the liquid, water is simple and preferred, but in the case of stretching the membrane at about 90° C. or more, use of a low-molecular-weight polyethylene glycol, etc. may also be preferably employed.

Next, a porous hollow-fiber membrane B is described below.

(2-1B) Porous Hollow-Fiber Membrane B (a) Fluororesin-Based Polymer

The porous hollow-fiber membrane B of the present invention preferably contains a fluororesin-based polymer.

The fluororesin-based polymer as used in the present description means a resin containing at least one of a vinylidene fluoride homopolymer and a vinylidene fluoride copolymer. The fluororesin-based polymer may contain a plurality of kinds of vinylidene fluoride copolymers.

The vinylidene fluoride copolymer is a polymer having a vinylidene fluoride residue structure and is typically a copolymer of a vinylidene fluoride monomer and other fluorine-based monomer, etc. Such a copolymer includes, for example, a copolymer of vinylidene fluoride and one or more kinds of monomers selected from vinyl fluoride, tetrafluoroethylene, hexafluoropropylene and chlorotrifluoroethylene.

In addition, a monomer other than the above-described fluorine-based monomer, for example, ethylene, may be copolymerized to the extent not impairing the effects of the present invention.

The weight average molecular weight of the fluororesin-based polymer may be appropriately selected according to the strength and water permeation performance required for the polymer separation membrane, but as the weight average molecular weight is larger, the water permeation performance is reduced, and as the weight average molecular weight is smaller, the strength is reduced.

For this reason, the weight average molecular weight is preferably from 50,000 to 1,000,000. In the case of a water treatment application where the polymer separation membrane is subject to chemical cleaning, the weight average molecular weight is preferably from 100,000 to 700,000, more preferably from 150,000 to 600,000.

The porous hollow-fiber membrane preferably contains the fluororesin-based polymer as a main component. Containing the fluororesin-based polymer as a main component indicates that the proportion of the fluororesin-based polymer in the porous hollow-fiber membrane is 50 wt % or more. The proportion of the fluororesin-based polymer in the porous hollow-fiber membrane is more preferably 80 wt % or more, still more preferably 90 wt % or more, yet still more preferably 95 wt % or more. The porous hollow-fiber membrane may be composed of only the fluororesin-based polymer.

Here, the "porous hollow-fiber membrane containing the fluororesin-based polymer as a main component" can be interchanged with "porous hollow-fiber membrane based on the fluororesin-based polymer". In the present description, other elements are also described by the phrase "X includes Y as a main component", and with respect to X, this can similarly be interchanged with "based on Y".

(b) Orientation of Molecular Chain (b-1) Raman Orientation

The orientation of the molecular chain of the present invention can be determined by an orientation analysis according to Raman spectroscopy. First, a porous hollow-fiber membrane is sliced by cutting with a microtome from a cross-section along the longitudinal direction of the porous hollow-fiber membrane. The thus-obtained section is observed under an optical microscope, and laser Raman measurement is thereby performed at 1 μm intervals along the longitudinal direction of a columnar texture while confirming the columnar texture. The number of measurement points in one columnar texture is a value obtained by dividing the longitudinal length (μm) of the later-described columnar texture by 1 μm (rounded down to the nearest integer). For example, when the longitudinal length of the columnar texture is 20.5 μm, the number of measurement points is 20.

Since strong Raman scattering is obtained when the vibration direction of molecular chain coincides with the polarization direction of incident light, the orientation degree can be calculated by appropriately selecting a vibration mode showing a vibration direction parallel to molecular chain and a vibration mode showing a vibration direction perpendicular to molecular chain, and determining the scattering intensity ratio therebetween.

For example, in the case where the fluororesin-based polymer is a polyvinylidene fluoride homopolymer, the Raman band around 1,270 cm$^{-1}$ is assigned to a coupling mode of $CF_2$ (fluorocarbon) stretching vibration and CC (carbon-carbon) stretching vibration. The vibration direction of these vibration modes is parallel to molecular chain. On the other hand, the vibration direction of the Raman band around 840 cm$^{-1}$ is perpendicular to molecular chain.

The orientation parameter can therefore be calculated according to the following formula (2). The orientation parameter shows a larger value as the orientation in the longitudinal direction of the porous hollow-fiber membrane is higher, shows a value of 1 in the case of non-orientation, and shows a value smaller than 1 when the orientation in the short-side direction is high.

$$\text{Raman orientation parameter} = (I1270/I840)\text{parallel}/(I1270/I840)\text{perpendicular} \quad (2)$$

In formula (2), parallel condition: the longitudinal direction of the porous hollow-fiber membrane is parallel to the polarization direction, perpendicular condition: the longitudinal direction of the porous hollow-fiber membrane is orthogonal to the polarization direction, I1270 parallel: the intensity of Raman band at 1,270 cm$^{-1}$ under parallel condition, I1270 perpendicular: the intensity of Raman band at 1,270 cm$^{-1}$ under perpendicular condition, I840 parallel: the intensity of Raman band at 840 cm$^{-1}$ under parallel condition, and I840 perpendicular: the intensity of Raman band at 840 cm$^{-1}$ under perpendicular condition.

With respect to one porous hollow-fiber membrane, 10 columnar textures different from each other are selected in the range of from 0.5 to 1.5 times the representative value of longitudinal length of the later-described columnar texture, laser Raman measurement is performed on each texture, orientation parameters of respective measurement points are calculated according to formula (2), and an average value thereof is defined as the Raman orientation parameter ν.

In addition, an operation of selecting a largest orientation parameter and a smallest orientation parameter among the measurement points of one columnar texture is performed for 10 columnar textures different from each other. With respect to selected 10 largest orientation parameters and 10 smallest parameters, respective average values are determined and defined as a maximum Raman orientation parameter M and a minimum Raman orientation parameter m. In order to accurately obtain the Raman orientation parameter ν, maximum Raman orientation parameter M, minimum Raman orientation parameter m and the later-described M/m, the measurement is preferably performed for 20 columnar textures different from each other.

In the porous hollow-fiber membrane of the present invention, the Raman orientation parameter ν of molecular chain in the longitudinal direction of the porous hollow-fiber membrane is preferably 1.5 or more, more preferably 2.0 or more, still more preferably 2.5 or more. With an orientation parameter ν of 1.5 or more, the strength of the porous hollow-fiber membrane is increased.

It is considered that the maximum Raman orientation parameter M and the minimum Raman orientation parameter m indicate the orientation degree at a main orientation site in the columnar texture and the orientation degree in a portion working out to a point of effort during stretching, respectively.

Accordingly, M and m may be set to appropriate ranges by taking into account a balance of performances such as strength, elongation and water permeability. In order to provide high toughness to the porous hollow-fiber membrane, M and m are preferably 4.0 or less, more preferably 3.5 or less, still more preferably 3.0 or less.

It is likely that as the Raman orientation parameter ν, M and m are larger, the orientation of molecular chain proceeds and the strength of the porous hollow-fiber membrane increases. On the other hand, if M/m that is a ratio of the maximum Raman orientation parameter M and the minimum Raman parameter m is too large, i.e., if the difference in the orientation degree between a portion where orientation has proceeded and a portion where orientation has not proceeded is too large, a stress is concentrated on a portion where orientation has not proceeded, and the porous hollow-fiber membrane is readily buckled and loses toughness. For this reason, in the present invention, M/m is preferably from 1.5 to 4.0, more preferably from 2.0 to 3.5, still more preferably from 2.5 to 3.0.

(b-2) Orientation Degree in X-Ray Diffraction Measurement

In the porous hollow-fiber membrane of the present invention, the molecular chain of the fluororesin-based polymer is oriented in the longitudinal direction of the porous hollow-fiber membrane, and the orientation degree π of the molecular chain in X-ray diffraction measurement is less than 0.4 or the molecular chain is non-oriented. The orientation degree π is calculated from a half-width H (°) obtained by wide-angle X-ray diffraction measurement, based on the following formula (1):

$$\text{Orientation degree } \pi = (180° - H)/180° \quad (1)$$

(provided that H is a half-width (°) of the diffraction intensity distribution in the circumferential direction of a wide-angle X-ray diffraction image).

The method for measuring the orientation degree π of the molecular chain in the longitudinal direction of the porous hollow-fiber membrane is specifically described below.

In order to calculate the orientation degree π, the porous hollow-fiber membrane is fixed to a fiber sample stage by arranging its longitudinal direction to run vertically. Here, the short-side direction of the porous hollow-fiber membrane is a direction parallel to the diameter direction of the hollow fiber, and the longitudinal direction is a direction perpendicular to the short-side direction. The short-side direction can be interchanged with a direction parallel to the hollow plane, i.e., an in-plane direction of the hollow plane, and the longitudinal direction can be interchanged with a direction perpendicular to the hollow plane.

When X-ray diffraction is performed, an annular diffraction image called a Debye-Scherrer ring is obtained. In the case of a non-oriented sample, a great change is not observed in the diffraction intensity along the Debye-Scherrer ring, but in the case of an oriented sample, the intensity distribution is biased on the Debye-Scherrer ring. Accordingly, the orientation degree can be calculated from this intensity distribution based on formula (1).

More specifically, in the case where the molecular chain is non-oriented, when 2θ/θ scanning is performed in the short-side direction (i.e., when a diffraction pattern showing a diffraction intensity distribution in the diameter direction of Debye-Scherrer ring is obtained), a peak is observed at a position around the diffraction angle 2θ=20°. The abscissa axis of the diffraction pattern obtained here is the diffraction angle 2θ of X-ray, and the ordinate axis is the diffraction intensity. Furthermore, the sample is scanned in the azimuth angle β direction by fixing the diffraction angle 2θ to the peak position above, i.e., around 20°, and a diffraction pattern in which the abscissa axis shows the azimuth angle β and the ordinate axis shows the diffraction intensity (i.e., a diffraction intensity distribution along the circumferential direction of Debye-Scherrer ring at the position of diffraction angle 2θ=20°) is thereby obtained. In the case of a non-oriented sample, the diffraction intensity is substantially constant throughout 360° in the circumferential direction of Debye-Scherrer ring.

On the other hand, in the case where the molecular chain is oriented in the longitudinal direction of the porous hollow-fiber membrane, a strong diffraction intensity is observed on the azimuth angle corresponding to the short-side direction of the hollow-fiber membrane (i.e., on the equatorial line) on the Debye-Scherrer ring around 2θ=20°, and a small diffraction intensity is obtained in other portions. More specifically, in the case of an oriented sample, the diffraction intensity distribution in the diameter direction of Debye-Scherrer ring shows a diffraction peak around 2θ=20°, similarly to a non-oriented sample, and the distribution in the circumferential direction shows, unlike a non-oriented sample, a diffraction peak on the azimuth angle corresponding to the short-side direction of the hollow-fiber membrane.

In the description above, the position of diffraction peak in the diameter direction of Debye-Scherrer ring (i.e., the value of 2θ corresponding to the diffraction peak) is "around 20°". However, the value of 2θ differs depending on the structure or blending of a polymer and may range from 15 to 25°. For example, when X-ray diffraction is performed for a polyvinylidene fluoride homopolymer having an α crystal or β crystal, a diffraction peak derived from a (110) plane of α crystal or β crystal, i.e., a plane parallel to molecular chain, is observed around 2θ=20.4°.

As described above, the intensity distribution in the azimuth angle direction is obtained by fixing the value of diffraction angle 2θ and furthermore, measuring the intensity from 0° to 360° in the azimuth angle direction (circumferential direction). This intensity distribution may also be said to be an intensity distribution obtained by scanning a crystal peak in a diffraction image in the circumferential direction. Here, when the ratio between the intensity at an azimuth angle of 180° (longitudinal direction) and the intensity at an azimuth angle of 90° (short-side direction) is 0.80 or less or 1.25 or more, it is regarded that a peak is present, and using the intensity distribution in this azimuth angle direction, the width at a position of half the peak height (half-width H) is determined.

In the intensity distribution obtained by scanning α crystal peak in the circumferential direction, when the ratio between the intensity at an azimuth angle of 180° and the intensity at an azimuth angle of 90° is more than 0.80 and less than 1.25, it is regarded that a peak is absent. That is, in this case, the fluororesin-based polymer is determined to be non-oriented.

The orientation degree π is calculated is calculated by substituting the half-width H into formula (1).

In the porous hollow-fiber membrane of the present invention, the orientation degree π of the molecular chain of the fluororesin-based polymer in the longitudinal direction of the porous hollow-fiber membrane is less than 0.4. Incidentally, the molecular chain of the fluororesin-based polymer may be non-oriented relative to the longitudinal direction of the porous hollow-fiber membrane.

In the case where the hollow-fiber membrane contains an α crystal or β crystal of polyvinylidene fluoride, the half-width H is preferably determined from an intensity distribution obtained by circumferentially scanning a crystal peak (2θ=20.4°) derived from a (110) plane of the α crystal or β crystal of polyvinylidene fluoride in wide-angle X-ray diffraction measurement.

The orientation degree π determined by wide-angle X-ray diffraction measurement represents the orientation of molecular chain of the entire porous hollow-fiber membrane, and the Raman orientation parameter ν determined by Raman spectroscopy tends to represent the orientation of molecular chain when focus is directed onto the columnar texture of the porous hollow-fiber membrane, i.e., the orientation of the local molecular chain. In the porous hollow-fiber membrane of the present invention, crystal orientation of the entire porous hollow-fiber membrane in wide-angle X-ray diffraction is not observed, but the local molecular chain in Raman spectroscopy is in the oriented state, so that both high strength and high toughness can be achieved.

In the case where the orientation degree π by wide-angle X-ray diffraction is less than 0.4 or the molecular chain is non-oriented, the Raman orientation parameter ν by Raman spectroscopy is preferably 1.5 or more, furthermore, the Raman parameter ν is preferably 2.0 or more.

(c) Columnar Texture
(i) Dimension

Figure 11:
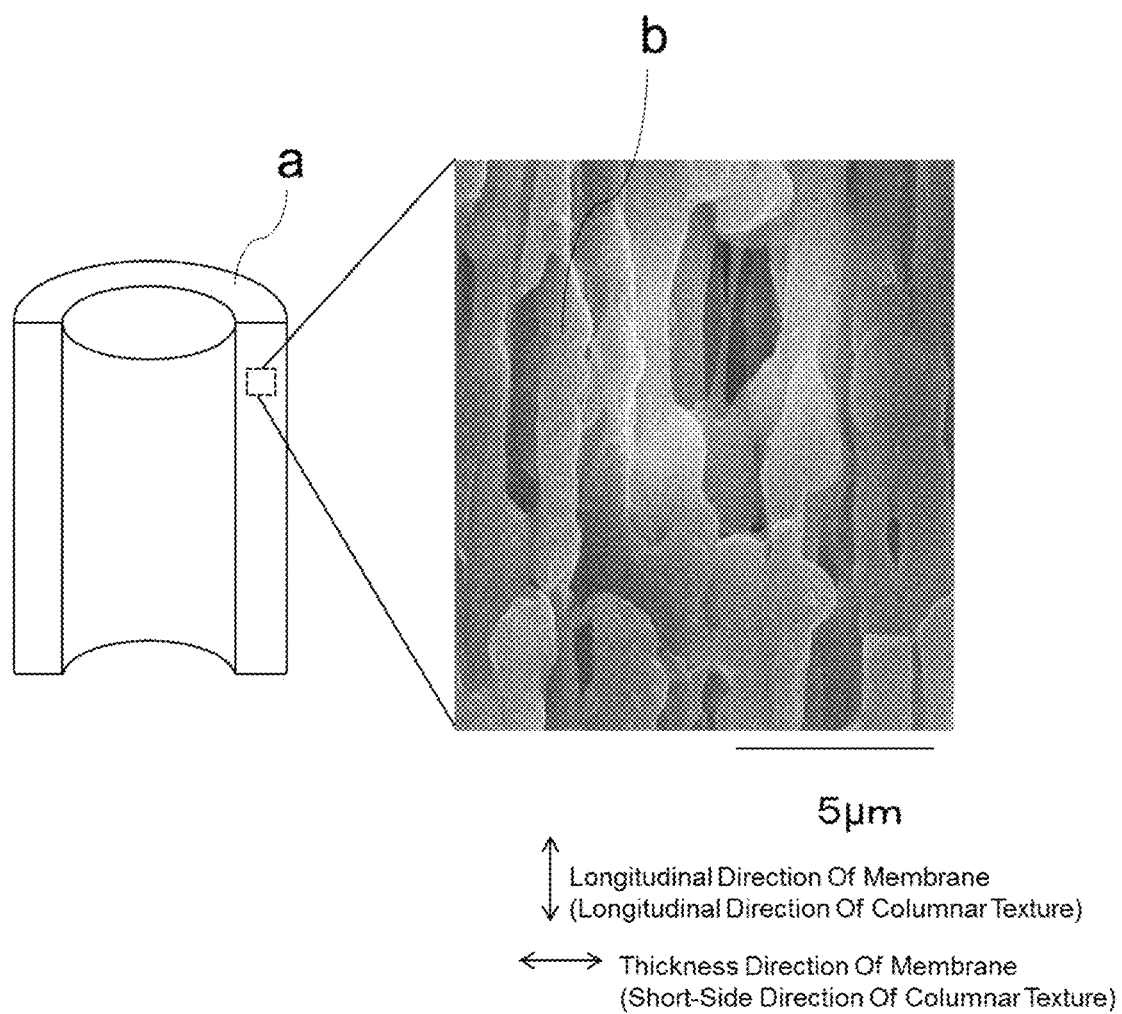
FIG. 11 are a columnar texture in the hollow-fiber membrane module according to the first embodiment of the present invention.

As illustrated in FIG. 11, the porous hollow-fiber membrane a has a columnar texture b oriented in the longitudinal direction of the porous hollow-fiber membrane a. The "columnar texture" is a solid material having a shape long in one direction. The aspect ratio (longitudinal length/short-side length) of the columnar texture is preferably 3 or more.

Here, the "longitudinal length" indicates the length in the longitudinal direction of the columnar texture. The "short-side length" is an average length in the short-side direction of the columnar texture.

The longitudinal length and short-side length can be measured as follows. A hollow-fiber membrane is cut along the longitudinal direction of the hollow-fiber membrane, and the obtained cross-section is observed using a scanning electron microscope (SEM). The magnification is variable according to the length of the columnar texture and is set to a level allowing a visual field to include the entire figure of each of 5, preferably 10, columnar textures over its longitudinal direction. In the case where the length in the longitudinal direction length varies in one columnar texture, a maximum length in the longitudinal direction may be measured as the longitudinal length.

The short-side length is determined by measuring the length in each short-side direction at a predetermined number of arbitrary measurement points in one columnar texture and calculating an average value thereof. The number of measurement points is a value obtained by dividing the longitudinal length (μm) by 1 μm (rounded down to the nearest integer). For example, when the longitudinal length of the columnar texture is 20.5 μm, the number of measurement points is 20. In this connection, when the value becomes 21 or more, the length may be measured at arbitrary 20 points.

The longitudinal length of the columnar texture is not particularly limited but is preferably 7 μm or more, more preferably 10 μm or more, still more preferably 15 μm or more. The longitudinal length of the columnar texture is, for example, preferably 50 µm or less, more preferably 40 µm or less.

In the present invention, the short-side length of the columnar texture is preferably from 0.5 µm to 3 µm. The short-side length is preferably in the range above, because high strength performance and high pure-water permeation performance are obtained.

When the short-side length of the columnar texture is 0.5 µm or more, physical strength of the columnar texture itself is increased and therefore, high strength is obtained. When the short-side length of the columnar texture is 3 µm or less, the void among columnar textures becomes large and in turn, good pure-water permeation performance is obtained. The short-side length of the columnar texture is more preferably from 0.7 to 2.5 µm, still more preferably from 1 to 2 µm.

In the porous hollow-fiber membrane of the present invention, preferable ranges of representative values of the longitudinal length and short-side length of the columnar texture are respectively the same as the above-described preferable ranges of the longitudinal length and short-side length of each individual columnar texture. In addition, as for the effects due to each representative value in that range, description of effects when individual columnar textures have a dimension in that range is applied.

The representative value of the longitudinal length is measured as follows. Similar to the measurement of longitudinal length, the longitudinal length is measured at the positions of 3 sites, preferably 5 sites, in the hollow-fiber membrane for 5, preferably 10, columnar textures per site. With respect to the obtained values of the longitudinal length, an average value is determined, and the value obtained can be used as the representative value of the longitudinal length of the columnar texture.

The representative value of the short-side length is determined by measuring the short-side length (calculated as an average value) as described above for columnar textures which were subject to measurement of the representative value of the longitudinal length, and calculating an average value thereof.

In the porous hollow-fiber membrane of the present invention, the representative value of the aspect ratio of the columnar texture calculated from the representative value of the longitudinal length and the representative value of the short-side length is preferably 3 or more, more preferably 5 or more, still more preferably 10 or more, yet still more preferably 20 or more.

In the present invention, it is preferred that the short-side length of the columnar texture is from 0.5 to 3 µm and the aspect ratio of the columnar texture is 3 or more.

(ii) Thickness Uniformity

As described later, the porous hollow-fiber membrane of the present invention can be produced by forming a hollow fiber from a membrane-forming solution containing a polymer and stretching the hollow fiber. For the sake of convenience, the state before stretching is referred to as "hollow fiber", and the state after stretching is referred to as "hollow-fiber membrane".

The thickness uniformity (the later-described average value D) of the columnar texture in the hollow-fiber membrane after stretching is preferably 0.50 or more, more preferably 0.60 or more, still more preferably 0.70 or more, yet still more preferably 0.80 or more. Although the thickness uniformity is 1.0 at most, the columnar texture may have a thickness uniformity of less than 1.0.

In the hollow-fiber membrane, the columnar texture has a high thickness uniformity in this way, i.e., a narrowed portion is little formed in the columnar texture, and the hollow-fiber membrane thereby exhibits high elongation.

When the porous hollow-fiber membrane after stretching keeps high elongation, this is advantageous in that fiber breakage is less likely to occur even at the time of an abrupt application of load. The elongation at break of the porous hollow-fiber membrane is preferably 50% or more, more preferably 80% or more.

The thickness uniformity is described below. As the length variation in each short-side direction of the columnar texture is smaller, a narrowed portion is less formed in the columnar texture, resulting in high thickness uniformity, and the columnar texture comes close to a perfect column.

The thickness uniformity of the columnar texture is determined by comparing a first cross-section and a second cross-section each running in parallel to the short-side direction of the porous hollow-fiber membrane. This is specifically described below.

Firstly, a first cross-section and a second cross-section running in parallel to each other are selected. The distance between the first cross-section and the second cross section is set to be 5 µm. In each cross-section, a portion composed of resin and a void portion are first distinguished, and the area of resin portion and the area of void portion are measured.

Next, the area of a portion where when the first cross-section is projected onto the second cross-section, the portion composed of resin in the first cross-section and the portion composed of resin in the second cross-section are overlapped, namely, the overlap area, is determined. With respect to arbitrary 20 pairs of first cross-section and second cross-section in one hollow-fiber membrane, thickness uniformities A and B are determined based on the following formulae (3) and (4), respectively:

$$\text{Thickness uniformity } A = (\text{overlap area})/(\text{area of resin portion of second cross-section}) \quad (3)$$

$$\text{Thickness uniformity } B = (\text{overlap area})/(\text{area of resin portion of first cross-section}) \quad (4)$$

That is, 20 pairs of thickness uniformities A and B are obtained for one hollow-fiber membrane. A larger value means that the thickness of the columnar texture is more uniform. Then, with respect to each pair, an average value C of thickness uniformities A and B is calculated. That is, 20 average values C are obtained for one hollow-fiber membrane. With respect to these average values C, an average value D is further calculated. The average value D is the thickness uniformity of this hollow-fiber membrane.

In the case where 80% or more of 20 average values C calculated for one hollow-fiber membrane have a value of 0.60 or more, the hollow-fiber membrane can be said to have a columnar texture.

In measuring the thickness uniformity, in order to clearly distinguish the resin portion and the void portion, it is preferable to previously perform resin-embedding of the porous hollow-fiber membrane in an epoxy resin, etc. and dyeing treatment of the epoxy resin, etc. with osmium or the like. By such resin embedding/dyeing treatment, the void portion is filled with an epoxy resin, etc., and at the time of cross-sectional processing with a focused ion beam described later, the portion composed of a fluororesin-based polymer and the void portion (i.e., the epoxy resin portion) can be clearly distinguished, as a result, high observation accuracy is obtained.

Furthermore, in order to obtain the above-described first cross-section and second cross-section each running in parallel to the short-side direction of the porous hollow-fiber membrane, a scanning electron microscope (SEM) equipped with a focused ion beam (FIB) is preferably used. A face parallel to the short-side direction of the porous hollow-fiber membrane is cut out using FIB, and FIB cutting and SEM observation are repeatedly conducted 200 times at 50 nm intervals toward the longitudinal direction of the porous hollow-fiber membrane. By such continuous cross-section observation, information at a depth of 10 μm can be obtained.

Arbitrary first and second cross-sections working out to the faces running in parallel to each other and being spaced 5 μm apart are selected therefrom, and the thickness uniformities can be determined using formulae (3) and (4). The observation magnification may be sufficient if it is a magnification enabling clear identification of a columnar texture and a spherical texture, and, for example, a magnification of 1,000 to 5,000 times may be used.

(iii) Composition

The columnar texture contains a fluororesin-based polymer. The columnar texture preferably contains the fluororesin-based polymer as a main component. Containing the fluororesin-based polymer as a main component indicates that the proportion of the fluororesin-based polymer in the columnar texture is 50 wt % or more. The proportion of the fluororesin-based polymer in the columnar texture is preferably 80 wt % or more, more preferably 90 wt % or more, still more preferably 95 wt % or more. The columnar texture may be composed of only the fluororesin-based polymer.

In other words, the porous hollow-fiber membrane has a solid matter containing a fluororesin-based polymer, and at least part of the solid matter constitutes a columnar texture. All of solid matters containing a fluororesin-based polymer may constitute a columnar texture, or part thereof may have a shape not falling under a columnar texture. In the porous hollow-fiber membrane, out of solid matters containing a fluororesin-based polymer, the proportion of the solid matter constituting a columnar texture is preferably 80 wt % or more, more preferably 90 wt % or more, still more preferably 95 wt % or more.

(iv) Columnar Texture in Hollow-Fiber Membrane

In the porous hollow-fiber membrane, the principal structure is preferably a columnar texture. The principal structure being a columnar texture means that the proportion of the columnar texture in the porous hollow-fiber membrane is 50 wt % or more. In the porous hollow-fiber membrane, the proportion of the columnar texture is more preferably 80 wt % or more, still more preferably 90 wt % or more, yet still more preferably 95 wt % or more. The porous hollow-fiber membrane may be composed of only a columnar texture.

More specifically, the porous hollow-fiber membrane preferably has, as the principal structure, a columnar texture containing a fluororesin-based polymer as a main component.

The porous hollow-fiber membrane can also be phrased as an aggregate of columnar textures.

The "oriented in the longitudinal direction" as used herein means that out of angles between the longitudinal direction of the columnar texture and the longitudinal direction of the porous hollow-fiber membrane, the acute angle is within 20°.

(d) Porosity

In the porous hollow-fiber membrane of the present invention, in order to satisfy both high pure-water permeation performance and high strength, the porosity is preferably from 40 to 80%, more preferably from 45 to 75%, still more preferably from 50 to 70%. If the porosity is less than 40%, the pure-water permeation performance is impaired, whereas if it exceeds 80%, the strength significantly decreases and in turn, the membrane lacks suitability as a porous hollow-fiber membrane for water treatment.

The porosity of the porous hollow-fiber membrane B is determined according to the following formula (5) by using the area of resin portion and the area of void portion in the above-described cross-section. In order to increase the accuracy, it is preferable to determine the porosity for arbitrary 20 or more, preferably 30 or more, cross-sections and use an average value thereof.

$$\text{Porosity (\%)} = \{100 \times (\text{area of void portion})\} / \{(\text{area of resin portion}) + (\text{area of void portion})\} \quad (5)$$

(e) Young's Modulus

The porous hollow-fiber membrane B of the present invention preferably has high toughness suitable for practical use, and the toughness can be denoted by the Young's modulus of a tensile test. The Young's modulus of the porous hollow-fiber membrane may be selected according to use of the porous hollow-fiber membrane but is preferably 0.20 GPa or more and less than 0.40 GPa. The Young's modulus is more preferably 0.22 GPa or more and less than 0.38 GPa. Within this range, the hollow-fiber membrane is shaken in a cleaning step, etc., and the suspended solids are likely to be separated from the membrane surface.

The Young's modulus is still more preferably 0.24 GPa or more and less than 0.36 GPa. Within this range, the hollow-fiber membrane is further shaken in a cleaning step, etc., and the suspended solids are likely to be effectively separated from the membrane surface. If the Young's modulus is less than 0.15 GPa, the hollow-fiber membrane is readily deformed by stress loading during practical use. If the Young's modulus is 0.40 GPa or more, the hollow-fiber membrane is susceptible to occurrence of fiber breakage, for example, at the time of fiber shaking such as scrubbing washing that is frequently carried out in the water treatment application.

(f) Others

The porous hollow-fiber membrane of the present invention may contain a texture other than the above-described columnar texture, to the extent not deviating from the object of the present invention. The structure other than the columnar texture includes, for example, a spherical texture having an aspect ratio (longitudinal length/short-side length) of less than 3. The short-side length and longitudinal length of the spherical texture are preferably from 0.5 to 3 μm. In the case of using a spherical texture, when the short-side length and longitudinal length thereof are in the range above, reduction in the strength of the porous hollow-fiber membrane can be prevented, and good pure-water permeation performance can be maintained.

However, if the proportion of such a spherical texture having an aspect ratio of less than 3 in the porous hollow-fiber membrane is increased, it is likely that spherical textures are increasingly coupled with each other to increase the narrowed portion, making it difficult to perform high-ratio stretching or keep the elongation after stretching. For this reason, a smaller proportion of the spherical texture in the porous hollow-fiber membrane is more preferred, and the proportion is preferably less than 20%, more preferably less than 10%, still more preferably less than 1% (almost no spherical texture), and it is most preferred that the spherical texture is not present at all.

Here, the occupancy (%) of each texture is determined according to the following formula (5) by taking a photograph of a cross-section in the longitudinal direction of the porous hollow-fiber membrane by means of SEM, etc. at a magnification enabling clear identification of a columnar texture and a spherical texture, preferably at a magnification of 1,000 to 5,000 times. In order to increase the accuracy, it is preferable to determine the occupancy for arbitrary 20 or more, preferably 30 or more, cross-sections and calculate an average value thereof.

$$\text{Occupancy (\%)} = \{(\text{area occupied by each texture}) / (\text{area of entire photograph})\} \times 100 \quad (5)$$

Incidentally, the area of the entire photograph and the area occupied by a texture can be determined preferably by employing a method of converting the area into a weight corresponding to each texture photographed. That is, after the photograph taken is printed on paper, the weight of paper corresponding to the entire photograph and the weight of paper corresponding to a texture portion cut out therefrom may be measured. In addition, before taking a photograph by SEM, etc., the above-described resin embedding/dyeing treatment and FIB cutting are preferably applied, because the observation accuracy increases.

The porous hollow-fiber membrane of the present invention may be a matter in which a layer having the above-described columnar texture and a layer having other structure are stacked to the extent not departing from the object of the present invention. However, if the thickness of the layer having other structure is large compared with the layer having a columnar texture, the object and effects of the present invention can hardly be exerted and therefore, the ratio of the thickness of the layer having other structure to the thickness of the layer having a columnar texture is preferably 0.3 or less, more preferably 0.2 or less.

In the porous hollow-fiber membrane of the present invention, it is preferred that the pure-water permeation performance at 50 kPa and 25° C. is 0.7 $m^3/m^2$/hr or more and the breaking strength is 23 MPa or more, and it is more preferred that the pure-water permeation performance at 50 kPa and 25° C. is 0.7 $m^3/m^2$/hr or more and the breaking strength is 25 MPa or more.

Above all, from the viewpoint of providing a high-performance hollow-fiber membrane satisfying both high pure-water permeation performance and high strength performance, it is preferred that the pure-water permeation performance at 50 kPa and 25° C. is from 0.7 to 5.0 $m^3/m^2$/hr and the breaking strength is from 23 to 70 MPa, and it is more preferred that the pure-water permeation performance at 50 kPa and 25° C. is from 0.7 to 5.0 $m^3/m^2$/hr and the breaking strength is from 30 to 60 MPa.

The measurement of pure-water permeation performance is performed by manufacturing a miniature module of 200 mm in length including 4 porous hollow-fiber membranes. External pressure dead-end filtration of reverse osmosis membrane filtrate is performed for 10 minutes under the conditions of a temperature of 25° C. and a filtration pressure difference of 16 kPa, and the permeation amount ($m^3$) is determined. The permeation amount ($m^3$) is converted into a value per unit time (hr) and effective membrane area ($m^2$), further multiplied by (50/16), thereby being converted into a value at a pressure of 50 kPa, to determine the pure-water permeation performance.

The methods for measuring the breaking strength and the elongation at break are not particularly limited but, for example, using a tensile tester, a tensile test of a sample having a measurement length of 50 mm is performed 5 or more times at a tensile speed of 50 mm/min by changing the sample, and the breaking strength and the elongation at break can be measured by determining average values thereof.

The porous hollow-fiber membrane described above has sufficient pure-water permeation performance, strength and elongation for various water treatments such as drinking water production, industrial water production, water purification treatment, wastewater treatment, and seawater desalination.

(2-2B) Production Method of Porous Hollow-Fiber Membrane B

The method for producing the porous hollow-fiber membrane B of the present invention is described below by way of example. The method for producing a porous hollow-fiber membrane includes at least:

1) a step of forming a hollow fiber having a columnar texture from a membrane-forming solution containing a fluororesin-based polymer by thermally induced phase separation, in which the columnar texture is oriented in the longitudinal direction and has a thickness uniformity of 0.50 or more and less than 1.00; and 2) a step of stretching the porous hollow fiber obtained in 1) above to 1.8 to 2.7 times in the longitudinal direction at a stretching speed of 1 to 150%/sec.

(a) Preparation of Membrane-Forming Solution

The production method of the porous hollow-fiber membrane B in the present invention further includes a step of preparing a fluororesin-based polymer solution. A fluororesin-based polymer solution (i.e., a membrane-forming solution containing a fluororesin-based polymer) is prepared by dissolving a fluororesin-based polymer in a poor or good solvent for the fluororesin-based polymer at a relatively high temperature of not less than the crystallization temperature.

When the polymer concentration in the membrane-forming solution is high, a porous hollow-fiber membrane having high strength is obtained. On the other hand, when the polymer concentration is low, the porosity of the porous hollow-fiber membrane is increased, and the pure-water permeation performance is enhanced. Accordingly, the concentration of the fluororesin-based polymer is preferably from 20 to 60 wt %, more preferably from 30 to 50 wt %.

In the present description, the poor solvent is a solvent in which the fluororesin-based polymer cannot be dissolved to a concentration of 5 wt % or more at a low temperature of 60° C. or less but can be dissolved to a concentration of 5 wt % or more in a high-temperature region between 60° C. or more and not more than the melting point of the fluororesin-based polymer (for example, when the polymer is composed of a vinylidene fluoride homopolymer alone, about 178° C.). The good solvent is a solvent in which the fluororesin-based polymer can be dissolved to a concentration of 5 wt % or more even in a low-temperature region of 60° C. or less. The non-solvent is defined as a solvent in which the fluororesin-based polymer is neither dissolved nor swollen at a temperature up to the melting point of the fluororesin-based polymer or the boiling point of the solvent.

The poor solvent for the fluororesin-based polymer includes, for example, cyclohexanone, isophorone, γ-butyrolactone, methyl isoamyl ketone, propylene carbonate, dimethyl sulfoxide, etc., and a mixed solvent thereof.

The good solvent includes, for example, N-methyl-2-pyrrolidone, dimethylacetamide, dimethylformamide, methyl ethyl ketone, acetone, tetrahydrofuran, tetramethylurea, trimethyl phosphate, etc., and a mixed solvent thereof.

The non-solvent includes, for example, water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, an aliphatic hydrocarbon such as low-molecular-weight polyethylene glycol, an aromatic hydrocarbon, an aliphatic polyhydric alcohol, an aromatic polyhydric alcohol, a chlorinated hydrocarbon, other chlorinated organic liquids, and a mixed solvent thereof.

(b) Formation of Hollow Fiber

In the hollow fiber forming step, a hollow fiber is obtained from a membrane-forming solution containing a fluororesin-based polymer by utilizing a thermally induced phase separation method of inducing phase separation by temperature change. In order to perform the later-described high-ratio stretching of 1.8 times or more, it is preferred that the hollow fiber has a columnar texture oriented in its longitudinal direction and the thickness uniformity of the columnar texture is 0.50 or more and less than 1.00.

The lower limit of the thickness uniformity of the columnar texture is more preferably 0.60 or more, still more preferably 0.70 or more, yet still more preferably 0.80 or more.

In the thermally induced phase separation method, two kinds of phase separation mechanisms are mainly utilized. One is a liquid-liquid phase separation method in which a polymer solution dissolved uniformly at a high temperature is separated into a polymer rich phase and a polymer poor phase due to reduction in the dissolving ability of the solution during a temperature drop and the structure is thereafter fixed by crystallization. Another is a solid-liquid phase separation method in which a polymer solution dissolved uniformly at a high temperature is phase-separated into a polymer solid phase and a solvent phase due to occurrence of crystallization of the polymer during a temperature drop.

A three-dimensional network structure is mainly formed in the former method, and a spherical structure constituted by a spherical texture is mainly formed in the latter method. In the production of the hollow-fiber membrane of the present invention, the latter phase separation mechanism is preferably utilized. Accordingly, a polymer concentration and a solvent, inducing solid-liquid phase separation, are selected. In the former phase separation mechanism, it is difficult to develop the above-described columnar texture oriented in the longitudinal direction of the hollow fiber. This is because, the polymer rich phase forms a very fine phase by phase separation before the structure is fixed, and cannot be made columnar.

As a specific method, a hollow part-forming liquid is discharged through an inner tube of a double tube-type spinneret for spinning of a porous hollow-fiber membrane while discharging the above-described membrane-forming solution through an outer tube of the double tube-type spinneret. The thus-discharged membrane-forming solution is cooled and solidified in a cooling bath to obtain a porous hollow fiber.

The fluororesin-based polymer solution is, before being discharged through the spinneret, held under a specific temperature condition for a predetermined time while being subjected to pressure. The pressure is preferably 0.5 MPa or more, more preferably 1.0 MPa or more.

The temperature T of the polymer solution preferably satisfies $Tc+35°$ C.$\leq T \leq Tc+60°$ C., more preferably satisfies $Tc+40°$ C.$\leq T \leq Tc+55°$ C. Tc is the crystallization temperature of the fluororesin-based polymer solution. The time for which the polymer solution is held under these pressure and temperature is preferably 10 seconds or more, more preferably 20 second or more.

Specifically, a retention part for allowing the polymer solution to stay is provided at any site of a solution feeding line for delivering the polymer solution to the spinneret, and a pressurizing unit for applying a pressure to the retained polymer solution and a temperature-adjusting unit for adjusting the temperature of the retained polymer solution (for example, a heating unit) are provided.

The pressurizing unit is not particularly limited, but by disposing two or more pumps in the solution feeding line, a pressure can be applied to any site therebetween. The pump includes, for example, a piston pump, a plunger pump, a diaphragm pump, a wing pump, a gear pump, a rotary pump, and a screw pump, and two or more kinds of pumps may be used.

Through this step, a pressure is applied under the conditions, in which crystallization easily takes place, it is presumed that crystal growth has anisotropy and in turn, not an isotropic spherical structure but a texture oriented in the longitudinal direction of the porous hollow fiber is developed, as a result, a columnar structure is obtained.

Here, the crystallization temperature Tc of the fluororesin-based polymer solution is defined as follows. In an apparatus for differential scanning calorimetry (DSC measurement), a mixture having the same composition as the membrane-forming polymer solution composition containing a fluororesin-based polymer, a solvent, etc. is sealed in a sealing type DSC container. A temperature of the mixture is raised to a melting temperature at a temperature rise rate of 10° C./min and kept for 30 minutes to melt the mixture uniformly. Then the temperature is lowered at a temperature drop rate of 10° C./min. Tc is a temperature at an onset of α crystallization peak observed in the temperature lowering process.

The cooling bath for cooling the fluororesin-based polymer solution discharged through the spinneret is described below. In the cooling bath, a mixed liquid including a poor or good solvent in a concentration of 50 to 95 wt % and a non-solvent in a concentration of 5 to 50 wt % is preferably used. As the poor solvent, the same poor solvent as that for the polymer solution is preferably used. For the hollow part-forming liquid, as with the cooling bath, a mixed liquid including a poor or good solvent in a concentration of 50 to 95 wt % and a non-solvent in a concentration of 5 to 50 wt % is preferably used. As the poor solvent, the same poor solvent as that for the polymer solution is preferably employed.

Here, in order to develop not a fibrous texture having a large number of narrowed portions but a columnar texture having a uniform thickness, it is preferable to promote polymer uptake/growth into the narrowed portion. The present inventors have found that the polymer uptake/growth into the narrowed portion leads to disappearance of a narrowed portion having high interface energy and can energetically stabilize the columnar texture and therefore the polymer uptake/growth is caused to preferentially occur over the growth in portions other than the narrowed portion, and have made intensive studies on the method for enhancing the thickness uniformity.

As a result, it has been found that as the method for promoting the polymer uptake/growth into the narrowed portion, the thermally induced phase separation preferably includes at least one of the following cooling steps a) and b):

a) a step of soaking the membrane-forming solution in a cooling bath at a temperature Tb satisfying Tc−30° C.<Tb≤Tc; and b) a step of soaking the membrane-forming solution in a cooling bath at a temperature Tb1 satisfying Tb1≤Tc−30° C., followed by soaking in a cooling bath at a temperature Tb2 satisfying Tc−30° C.<Tb2≤Tc, (provided that Tc is the crystallization temperature of the membrane-forming solution containing a fluororesin-based polymer).

In the present invention, it has been found that as the method a), when cooling/solidification in a cooling bath is performed near the crystallization temperature of the polymer solution, the cooling/solidification slowly proceeds. In this case, denoting Tc as the crystallization temperature of the fluororesin-based polymer solution, the temperature Tb of the cooling bath is caused to satisfy Tc−30° C.<Tb≤Tc, and Tc−20° C.<Tb≤Tc is more preferred.

The passing time of the cooling bath (i.e., soaking time in the cooling bath) is not particularly limited as long as enough time to complete the thermally induced phase separation including the polymer uptake/growth into the narrowed portion can be ensured, and the passing time may be experimentally determined by taking into account the number of hollow-fiber membranes, the spinning speed, the bath ratio, the cooling capacity, etc.

However, in order to achieve thickness uniformity, the passing time is preferably set to be as long as possible in the above-described temperature range of the cooling bath and may be, for example, 10 seconds or more, preferably 20 seconds or more, more preferably 30 seconds or more.

In addition, as the method b), two or more stages of cooling may be performed. Specifically, the cooling step may include a step of cooling the solution by using a first cooling bath for promoting generation/growth of a crystal nucleus by increasing the supercooling degree, and a step of thereafter cooling the solution by using a second cooling bath for promoting polymer uptake/growth into the narrowed portion. The cooling step by the second cooling bath utilizes a phenomenon that the polymer uptake/growth into the narrowed portion preferentially occurs mainly in the structure coarsening process of the phase separation.

In this case, when the temperature Tb1 of the first cooling bath for cooling the fluororesin polymer solution discharged through the spinneret satisfies Tb1≤Tc−30° C., the generation and growth of a crystal nucleus can be promoted by increasing the supercooling degree, and when the temperature Tb2 of the second cooling bath is set near the crystallization temperature (specifically, set to satisfy Tc−30° C.<Tb2≤Tc, preferably Tc−20° C.<Tb2≤Tc), the polymer uptake/growth into the narrowed portion can be promoted. Tc is the crystallization temperature of the polymer solution.

The passing time of each cooling bath can be varied, but it is preferred that, for example, the passing time of the first cooling bath is set to be from 1 to 20 seconds, preferably from 3 to 15 seconds, more preferably from 5 to 10 seconds, and the passing time of the second cooling bath is set to be 10 seconds or more, preferably 20 seconds or more, more preferably 30 seconds or more.

When a texture having a thickness uniformity of less than 0.50 is referred to as "fibrous texture" so as to distinguish it from the columnar texture, the hollow-fiber membrane disclosed in JP-A-2006-297383 is a hollow-fiber membrane having a fibrous texture. Such a porous hollow-fiber membrane having a fibrous texture is relatively excellent in strength and pure-water permeation performance, and the present inventors have therefore attempted to increase the strength by stretching this membrane. However, it has been found that the membrane cannot be uniformly stretched and the strength cannot be increased.

In general, a porous membrane used for water treatment has a large number of void parts for passing water and since destruction of the texture proceeds starting from a void part at the time of stretching, the stretching itself is very difficult. This tendency is prominent when, in particular, the porous hollow-fiber membrane has a phase-separation porous structure obtained by dry-wet spinning utilizing a principle of non-solvent induced phase separation or thermally induced phase separation, because a large number of fine voids are present and the porosity is high.

In the case of the porous membrane having a fibrous texture described in JP-A-2006-297383, it is considered that stress during stretching is dispersed by the fibrous texture oriented in the longitudinal direction and stretching can be performed. However, a great enhancement was not achieved in the breaking strength, and intensive studies on the cause thereof have revealed that a fibrous texture has many narrowed portions and because a stress is concentrated at the narrowed portion during stretching and the narrowed portion is preferentially stretched, the entire fibrous texture cannot be uniformly stretched, making it impossible to increase the draw ratio.

In contrast, the present inventors have found that as long as it is a hollow fiber having a columnar texture with uniform thickness, the entire columnar texture can be uniformly stretched. Such uniform and high-ratio stretching has yielded success in stretching and orienting the molecular chain of the fluororesin-based polymer in the longitudinal direction of the porous hollow-fiber membrane and success in increasing the strength while maintaining high pure-water permeation performance.

(c) Stretching

Finally, in the present invention, the porous hollow fiber including a fluororesin-based polymer having a columnar texture, obtained by the method above, is stretched at a high ratio whereby the molecular chain of the polymer is oriented in the longitudinal direction of the hollow-fiber membrane. As a result, the Raman orientation parameter and the orientation degree in X-ray diffraction, each falling in the range above, are achieved.

The stretch ratio is preferably from 1.8 to 2.4 times, more preferably from 1.9 to 2.3 times. When the stretch ratio is 1.8 times or more, the molecular chain can be more sufficiently oriented by the stretching and therefore, the strength of the porous hollow-fiber membrane can be increased.

In the present invention, the stretching speed is preferably from 1%/sec to 150%/sec, more preferably from 3%/sec to 100%/sec, still more preferably from 5 to 50%/sec. When the stretching speed is 1%/sec or more, the membrane can be stretched without extremely increasing the size of the stretching treatment equipment. In addition, when the stretching speed is 150%/sec or less, the membrane can be homogeneously stretched stably.

The hollow fiber having a columnar texture is stretched at the above-described low speed, and homogeneous stretching of the entire hollow fiber can thereby be achieved, as a result, homogeneous orientation can proceed. This homogeneous stretching is considered to include homogeneous stretching of the entirety of one columnar texture and stretching of a plurality of different columnar textures to the same extent.

As described above, the columnar texture is formed by taking the polymer into the narrowed portion of a solid matter that has been previously formed. Since the growth rate differs between the previously formed solid matter and the portion formed thereafter, the microscopic structure (for example, the number of molecular chain entanglements per volume) is considered to differ.

The stretching speed is calculated as follows.

Stretching speed (%/sec)=(stretch ratio× 100−100)÷stretching time (sec)

Here, the stretch ratio is calculated by "length (m) after stretching÷length (m) before stretching". For the stretching time, the time (sec) substantially used for stretching is used. The draw ratio may also be calculated from the set speed of the stretching apparatus, but it is better to dye the porous hollow fiber membrane immediately before stretching to a length of 10 cm in its longitudinal direction, conduct stretching, and measure the length of the colored portion before and after the stretching. On this occasion, the time used for stretching can also be measured.

The stretching temperature is preferably from 60° C. to 140° C., more preferably from 70° C. to 120° C., still more preferably from 80° C. to 100° C., and if the membrane is stretched in a low-temperature atmosphere of less than 60° C., it is difficult to stably and homogeneously stretch the membrane. If the membrane is stretched at a temperature exceeding 140° C., since the temperature is close to the melting point of the fluororesin-based polymer, the structure texture may be melted to reduce the pure-water permeation performance.

Stretching in a liquid is preferred, because the temperature control is easy, but the stretching may be performed in a gas such as steam. As the liquid, water is simple and preferred, but in the case of stretching the membrane at about 90° C. or more, use of a low-molecular-weight polyethylene glycol, etc. may also be preferably employed.

(3) Flow-Regulating Member

The hollow-fiber membrane module may include, in the cylindrical case, a flow-regulating member for regulating the flow in the hollow-fiber membrane module. The flow-regulating member is, for example, a cylindrical member and is disposed in the vicinity of the upper end of the cylindrical case.

The hollow-fiber membrane may be fixed to the cylindrical case or the flow-regulating member by an adhesive, etc. In addition, the hollow-fiber membrane may be of a cartridge type as described above. In other words, the hollow-fiber membrane may be attachable/detachable to the cylindrical case or the flow-regulating member.

(4) Housing

The cylindrical case 3, the upper cap 6 and the lower cap 7 correspond to a housing.

The cylindrical case 3 is a cylindrical case open at upper and lower end parts and although the shape of the cylindrical case is not particularly limited, a case having a cylinder-shaped barrel is preferred. The shape of the barrel part may not be cylinder and can be varied taking into account ease of manufacture of the cylindrical case, minimization of dead space in the hollow-fiber membrane module, etc. The cylindrical case 3 has a concentrated liquid outlet 10 on the side thereof in the vicinity of the upper end in the height direction of the cylindrical shape.

The upper cap 6 is liquid-tightly and airtightly fixed to the upper end of the cylindrical case 3. The upper cap 6 has a permeated liquid outlet 9. The upper cap 6 is attachable/detachable relative to the upper end of the cylindrical case 3.

The lower cap 7 is liquid-tightly and airtightly fixed to the lower end of the cylindrical case 3. The upper cap 7 has a raw water inflow port 8. In this embodiment, the raw water inflow port 8 functions also as an air feed port.

With respect to the cylindrical case 3, upper cap 6 and lower cap 7, for example, as the material of these members, resins such as polysulfone, polycarbonate and polyphenylene sulfide are used individually or as a mixture. In addition, as the material other than a resin, for example, aluminum and stainless steel are preferred. Preferable materials further include a composite material such as resin-metal composite, glass fiber-reinforced resin and carbon fiber-reinforced resin.

(5) Potting Part

A member for bundling hollow-fiber membranes in the state of being left open like the first potting part 4 and a member for closing and bundling hollow-fiber membranes like the second potting part 5 are collectively referred to as a gathering/bundling member (potting part).

As the gathering/bundling member, an adhesive is preferably used.

The type of the adhesive is not particularly limited as long as the adhesion strength to an adhesion target member, heat resistance, etc. are satisfied, but a synthetic resin that is a general-purpose product, is inexpensive and has little effect on the water quality, such as epoxy resin and polyurethane resin, is preferably used.

(6) Filling Ratio of Separation Membrane

When the filling ratio of the hollow-fiber membrane in the cylindrical case is increased, a large membrane area can be ensured and in addition, the membrane surface linear velocity can be enhanced with a small cross-flow rate, making it possible to improve the membrane cleaning effect. However, if the filling ratio of the hollow-fiber membrane is increased, the hollow-fiber membranes closely contact each other to cause a problem that suspended solids present on the hollow-fiber membrane surface or between hollow-fiber membranes can be hardly washed and the accumulation is not eliminated.

The filling ratio of the hollow-fiber membrane as used herein indicates the proportion of the area occupied by a hollow-fiber membrane portion in a transverse cross-section (in FIG. 1, a plane parallel to the horizontal direction and perpendicular to the paper plane). Denoting S1 as the cross-section of a hollow-fiber membrane existing region and S2 as the total of cross-sections of only a hollow-fiber membrane portion, the filling ratio of the hollow-fiber membrane can be represented by the following formula (6):

Filling ratio [%] of hollow-fiber membrane=$S2/S1 \times 100$ (6)

Here, the hollow-fiber membrane existing region is a region surrounding a hollow-fiber membrane on the outermost side in the transverse cross-section of the hollow-fiber membrane module. However, the hollow-fiber membrane existing region at a root of the membrane bundle of the hollow-fiber membrane (that is, on the bottom surface of the first potting part 4 or on the top surface of the second potting part 5) is defined as follows.

Figure 2:
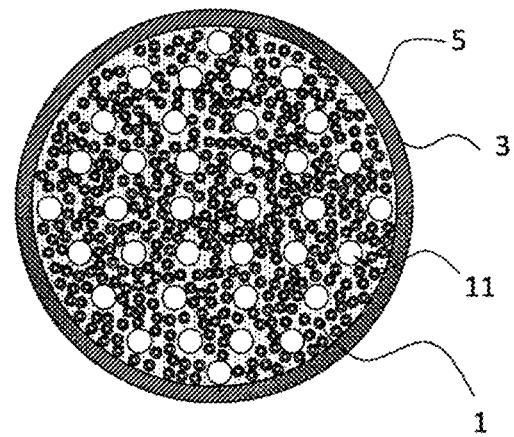
FIG. 2 is an A-A line cross-sectional view of the hollow-fiber membrane module according to the first embodiment of the present invention.

In the transverse cross-section of the hollow-fiber membrane module illustrated in FIG. 2, a through hole 11 is present in the second potting part 5, and since a hollow-fiber membrane is not present in the through hole portion, the through hole portion is excluded from the hollow fiber membrane existing region S1.

Figure 3:
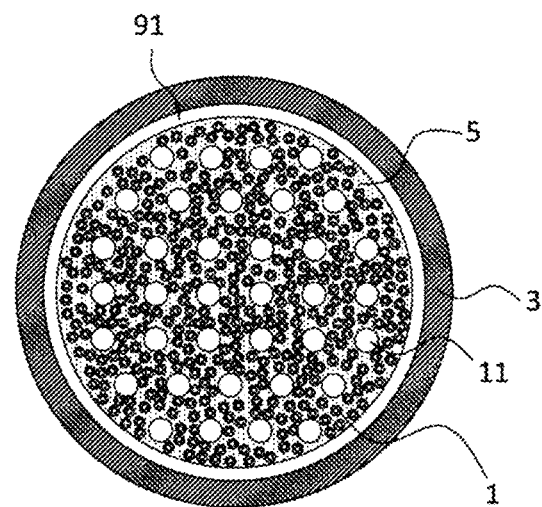
FIG. 3 is a cross-sectional view at the same position as the A-A line of FIG. 1 of the hollow-fiber membrane module according to another embodiment of the present invention.

In the transverse cross-section of the hollow-fiber membrane module illustrated in FIG. 3, a hollow-fiber membrane is not present in a through hole 11 portion of the second potting part 5 and in a gap 91 between the second potting part 5 and the cylindrical case 3, and therefore, such portion and gap are excluded from the hollow fiber membrane existing region S1.

Figure 4:
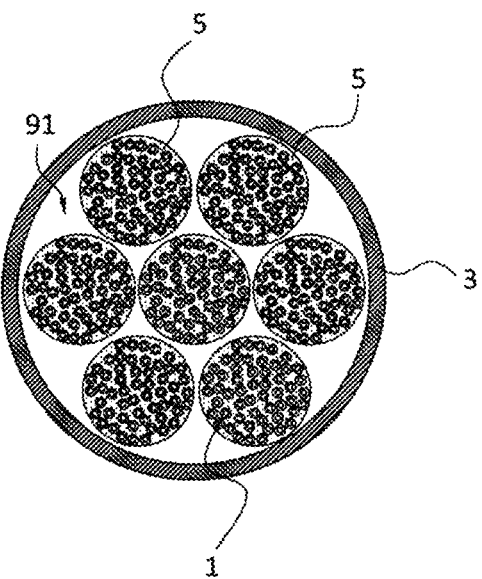
FIG. 4 is a cross-sectional view at the same position as the A-A line of FIG. 1 of the hollow-fiber membrane module according to still another embodiment of the present invention.

In the transverse cross-section of the hollow-fiber membrane module illustrated in FIG. 4, the total of the second potting parts 5 area is defined as the area of the hollow-fiber membrane existing region S1.

Now, the cross-sectional area S2 of only a hollow-fiber membrane portion alone can be represented by the following formula (7):

$$S2 = [\text{Circular constant}] \times [\text{outside diameter of hollow-fiber membrane}/2]^2 \times [\text{number of hollow-fiber membranes in the region}] \quad (7)$$

The present inventors have found that when the filling ratio of the hollow-fiber membrane in the cylindrical case is 38% or less, the hollow-fiber membranes are less likely to closely contact each other and the washing efficiency of suspended solids accumulated on a hollow-fiber membrane surface or between hollow-fiber membranes can be increased. In the present invention, the filling ratio of the hollow-fiber membrane in the cylindrical case is from 25% to 38%. When the filling ratio is in this range, the membrane module can ensure a membrane area not allowing for an excessive increase in the permeated liquid flow rate per unit membrane area. The filling ratio of the hollow-fiber membrane is more preferably from 30% to 38%.

In addition, the filling ratio of the hollow-fiber membrane preferably satisfies the above-described range throughout in the cylindrical case. Specifically, the filling ratio at the bottom surface of the first potting part 4, the filling ratio at the top surface of the second potting part 5, and the filling ratio in the center of the cylindrical case are preferably in the range above. The filling ratio in the central part of the cylindrical case is a filling ratio in a transverse cross-section bisecting the length of the cylindrical case (i.e., the height of the cylindrical shape).

At the bottom surface of the first potting part 4 and at the top surface of the second potting part 5, membranes are bundled and therefore, the filling ratio is likely to be high in these portions, compared with the filling ratio in the middle of the cylindrical case. In particular when the second potting part 5 has a through hole 11 and when the second potting part 5 is a small bundled and bonded part, the filling ratio of the membrane is likely to be high at the top surface of the second potting part 5 and therefore, the filling ratio of the membrane at the top surface of the second potting part 5 is preferably in the range above.

In the case where the membrane surface per one membrane module is the same, the filling ratio of the membrane module decreases as the hollow-fiber membrane having a small outside diameter is used. However, in this case, as the hollow-fiber membrane has a smaller outside diameter, the number of membranes packed increases. On the other hand, as for the space between adjacent hollow-fiber membranes, since if the outside diameter of the hollow-fiber membrane is too small, the number of membranes increases and if the outside diameter of the hollow-fiber membrane is too large, the filling ratio increases, the space between hollow-fiber membranes is narrowed.

Suspended solids deposit around a hollow-fiber membrane and therefore, when the number of hollow-fiber membranes is increased, the suspended solids accumulated within the module are spatially dispersed, increasing the contact efficiency of suspended solids with a fluid at the time of flushing, so that the cleaning efficiency of flushing can be increased (the cleaning step is described later in detail).

However, suspended solids are sometimes caught among a plurality of hollow-fiber membranes and it is preferred that the space between adjacent hollow-fiber membranes is wide, since suspended solids can be prevented from being caught. Accordingly, for the outside diameter of the hollow-fiber membrane, an outside diameter allowing for filling of as large number of hollow-fiber membranes as possible and enabling it to take a wide space between hollow-fiber membranes, must be selected.

In the case where the outside diameter of the hollow-fiber membrane is small, the membrane module of the present invention exhibits more effect even when the filling ratio of the membrane within the membrane module is the same. More specifically, when the outside diameter of the hollow-fiber membrane is small, the membrane area increases, and the amount of suspended substances accumulated per unit membrane area decreases, so that a rise in the liquid flow resistance in the filtration step can be prevented. Suspended solids accumulated on the membrane surface during filtration step are subject to compressive force corresponding to the liquid flow resistance of the permeated liquid and are more densified than original suspended solids. Such densification proceeds as the liquid flow resistance is higher or the amount of suspended solids per unit membrane area is larger.

The decrease in the amount of suspended solids accumulated per unit membrane area not only reduces the liquid flow resistance but also prevents densification of suspended solids, and therefore, washing of the deposits becomes easier in the cleaning step. In addition, when the outside diameter is small, even when the filling ratio is the same, the number of hollow-fiber membranes increases. When the number of hollow-fiber membranes is increased, the amount of suspended solids accumulated on one hollow-fiber membrane decreases, so that the tensile load applied to one membrane by suspended solids can be decreased and membrane breakage can be prevented. In addition, thinking that suspended solids are present around a hollow-fiber membrane, when the number of hollow-fiber membranes is increased, suspended solids are caused to be dispersedly present, leading to a rise in the contact efficiency of suspended solids with a fluid at the time of flushing, so that the cleaning effect of flushing can be enhanced.

2. Operation Method of Hollow-Fiber Membrane Module (1) Raw Water

The raw water to be separated contains suspended substances or dissolved substances. The suspended substances or dissolved substances include an organic matter. The main organic matters are a sugar such as polysaccharide and oligosaccharide, a protein, and an amino acid. The concentration of suspended substances in raw water is preferably 10 mg/L or more, more preferably from 100 to 10,000 mg/L.

The raw water may also contain a metal together with a sugar and/or a protein. The metal includes, for example, calcium, iron, zinc, aluminum, magnesium, manganese, and copper.

In the raw water, such a substance is sometimes present by forming an aggregate, an agglomerate or a floc and increasing the particle diameter. In addition, the raw water may be subjected to a coagulation treatment with a coagulant before being fed to the hollow-fiber membrane module of the present invention. As the coagulant, for example, polyaluminum chloride, polyaluminum sulfate, ferric chloride, polyferric sulfate, ferric sulfate, polysilica iron, and an organic polymer coagulant can be used.

(2) Membrane Separation Step

First, in the membrane separation step, raw eater containing suspended substances is fed to the hollow-fiber membrane module and separated into suspended substances and a liquid.

The filtration system of membrane separation performed in the hollow-fiber membrane module may be dead-end filtration, or cross-flow filtration may be performed. However, in the case of raw water containing a high concentration of solid substances, the amount of contamination attached to the membrane is large and in order to effectively remove the contamination, it is preferable to perform cross-flow filtration. Because, a contamination attached to the membrane can be removed by the shear force of circulating raw water.

In addition, as for the time of one step, the step is preferably continuously conducted for 5 to 120 minutes. The step is more preferably continued for 9 to 30 minutes, and the membrane can be cleaned before the amount of suspended solids accumulated within the module is excessively increased. If the filtration time is too short, the module operating efficiency drops, and the cost rises.

Membrane separation is conducted by passing a liquid from the raw water side to the permeated liquid side across a separation membrane, which is powered by a difference between the raw water-side pressure and the permeation-side pressure (transmembrane pressure difference). The transmembrane pressure difference is generally obtained, for example, by feeding raw water to a raw water inlet while applying a pressure by a pump or by suctioning the permeated water from the permeated liquid side by means of a pump or siphon. In the membrane module of the present invention, the transmembrane pressure difference with which filtration can be continued is preferably from 10 to 100 kPa, more preferably from 15 to 50 kPa. The membrane is preferably transferred to a cleaning step by completing the membrane separation step before exceeding this range.

Incidentally, the transmembrane pressure difference may be measured by a differential pressure gauge or from a difference between pressure gauges fixed to the raw water side and the permeated liquid side. As the method for controlling the membrane separation speed, the permeated liquid may be collected at a constant flow rate (constant flow rate filtration), or the permeated liquid may be collected by keeping the liquid sending pressure or suction pressure constant and setting the permeated liquid flow rate at a spontaneous flow rate (constant pressure filtration), but in view of ease in controlling the production speed of the permeated liquid or concentrated liquid, constant flow rate filtration is preferred.

(3) Cleaning Step

In the cleaning step, the membrane separation step is stopped, and suspended substances accumulated on the membrane surface or between membrane bundles of the hollow-fiber membrane are washed.

The cleaning step of the present invention is performed by combining the following two steps:

(A) a backwashing step of passing water from the permeation side of the hollow-fiber membrane to the raw water side of the hollow-fiber membrane, thereby pushing out substances caught on a membrane surface or in a membrane pore, and (B) a washing step of flowing the raw water or water having a lower suspended substance concentration at least than in the raw water to the raw water side of the hollow-fiber membrane at a flow rate corresponding to a membrane surface linear velocity of from 0.3 to 5.0 m/s, to perform flushing.

Respective washing steps are described in detail below.

The washing step (A) is a washing method of pushing out substances caught on a membrane surface or in a membrane pore by passing a liquid from the permeated liquid side to the raw water side across the hollow-fiber membrane (backwashing). According to the module of the first embodiment of the present invention, as illustrated in FIG. 1, the method is performed by sending washing water from a permeated liquid outlet 9 in the state where the channel communicating with the concentrated liquid outlet 10 on the raw water side and the raw water inflow port 8 is opened.

As the washing water in the washing step (A), permeated liquid or water can be used. In addition, although it causes a rise in the running cost and cannot therefore be used frequently, a chemical liquid may be sent. The chemical liquid that can be used is described later.

In the case of washing with a chemical liquid, when the washing steps (A) and (B) with water are performed before conducting the chemical washing, clogging of the membrane, which is, upon contact between the suspended substances and the chemical liquid, caused by proteins contained in the suspended substances being denatured to clog in a membrane pore, or excessive consumption of the chemical liquid due to the above, can be prevented. It may be better to do rinsing by conducting the washing step (A) with water after performing the washing step (A) by use of a chemical liquid and then conduct the next filtration step.

The washing step (B) is a washing method of feeding washing water to the raw water side from the lower part of the membrane module to do flushing. According to the module of the first embodiment of the present invention, the method is performed by feeding washing water from a raw water inflow port 8 in the state where the channel communicating with the concentrated liquid outlet 10 is opened. As the washing water in the washing step (B), raw water or water having a lower suspended solid concentration than in raw water can be used. In addition, a chemical liquid may also be used with low frequency.

In an operation period (operation cycle) including one filtration step, the cleaning step includes at least one of the above-described two washing steps, and the same step may be repeated, one washing step may be omitted, or both washing steps may be performed at the same time.

Figure 5:
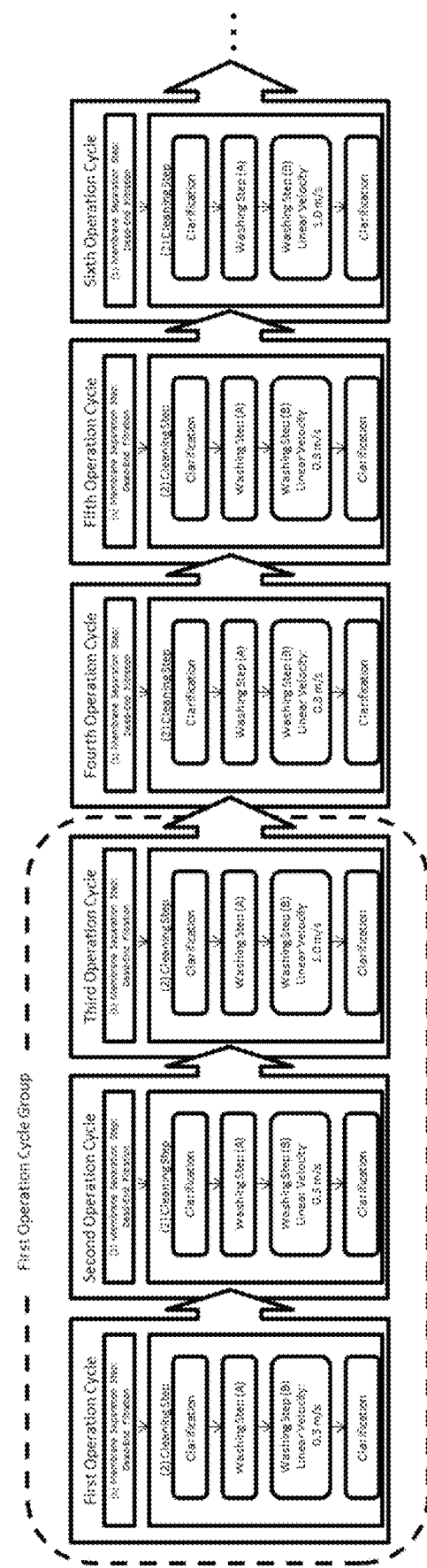
FIG. 5 is a flow diagram illustrating an embodiment of the operation method of the present invention.

FIG. 5 illustrates one example of the operation method of the hollow-fiber membrane module in the present invention.

As illustrated in FIG. 5, the cleaning step may include an operation other than the washing step (A) and the washing step (B), and, for example, a clarification operation of discharging suspended solid-containing raw water within the module through the raw water inflow port, or air cleaning of feeding air through the raw water inflow port of the module, shaking the membrane with air bubbles, and washing suspended solids deposited on the membrane (air washing) may be applied.

The air feed flow rate in the air cleaning varies depending on the area or module length in a transverse cross-section of the hollow-fiber membrane module or the outside diameter of the hollow-fiber membrane, but is preferably from 70 to 400 $m^3/m^2/hr$ per area in a transverse cross-section of the hollow-fiber membrane module.

In addition, as illustrated in FIG. 5, the membrane surface linear velocity of the washing step (B) may differ among respective operation cycles and may be variably set for each operation cycle. The operation of the module is generally automatically conducted by previously storing a program in a memory of PLC (program controller) incorporated into an operation apparatus, usually to take several numbers of operation cycles as one unit and repeat the unit, and the operation is generally started by setting the operation system before operating it. Denoting one operation group as several numbers of operation cycles defining one unit, the membrane linear velocity in 1 to 50% of washing steps (B) relative to the total number of washing steps (B) included in one group is preferably 1.0 m/s or more.

In FIG. 5, the total number of washing steps (B) is 3 in one operation cycle group and since the number of washing steps (B) in which the linear velocity is 1.0 m/s or more is 1, the proportion thereof is about 33% relative to the total number of washing steps. This is because when the washing step (B) is conducted at a high membrane linear velocity with larger frequency than 50%, the required washing water or the pump power for sending the washing water becomes larger than necessary, and when conducted at a high membrane linear velocity with smaller frequency than 1%, accumulation of deposits is not eliminated but proceeds.

Figure 6:
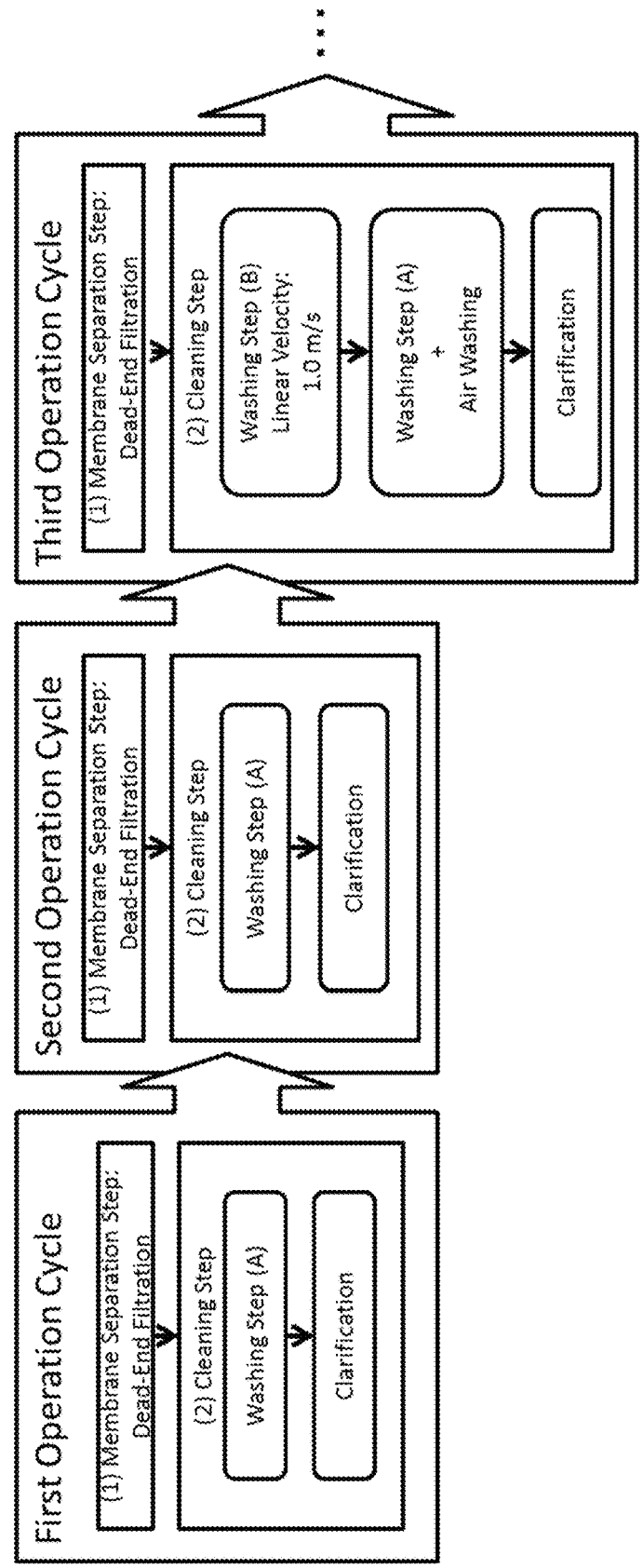
FIG. 6 is a flow diagram illustrating another embodiment of the operation method of the present invention.

In addition, with respect to the washing step, as illustrated in FIG. 6, both washing steps may not be included in one cleaning step, or either one of the washing step (A) and the washing step (B) may be operated first. When the washing step (A) is performed first, the deposits accumulated on the membrane surface are reduced in the power to attach to the membrane surface, and the cleaning efficiency of the washing step (B) can be increased. On the other hand, when the washing step (B) is performed first, large suspended solids on the membrane surface can be removed, and the liquid flow resistance of washing water at the time of backwashing can be decreased.

Figure 7:
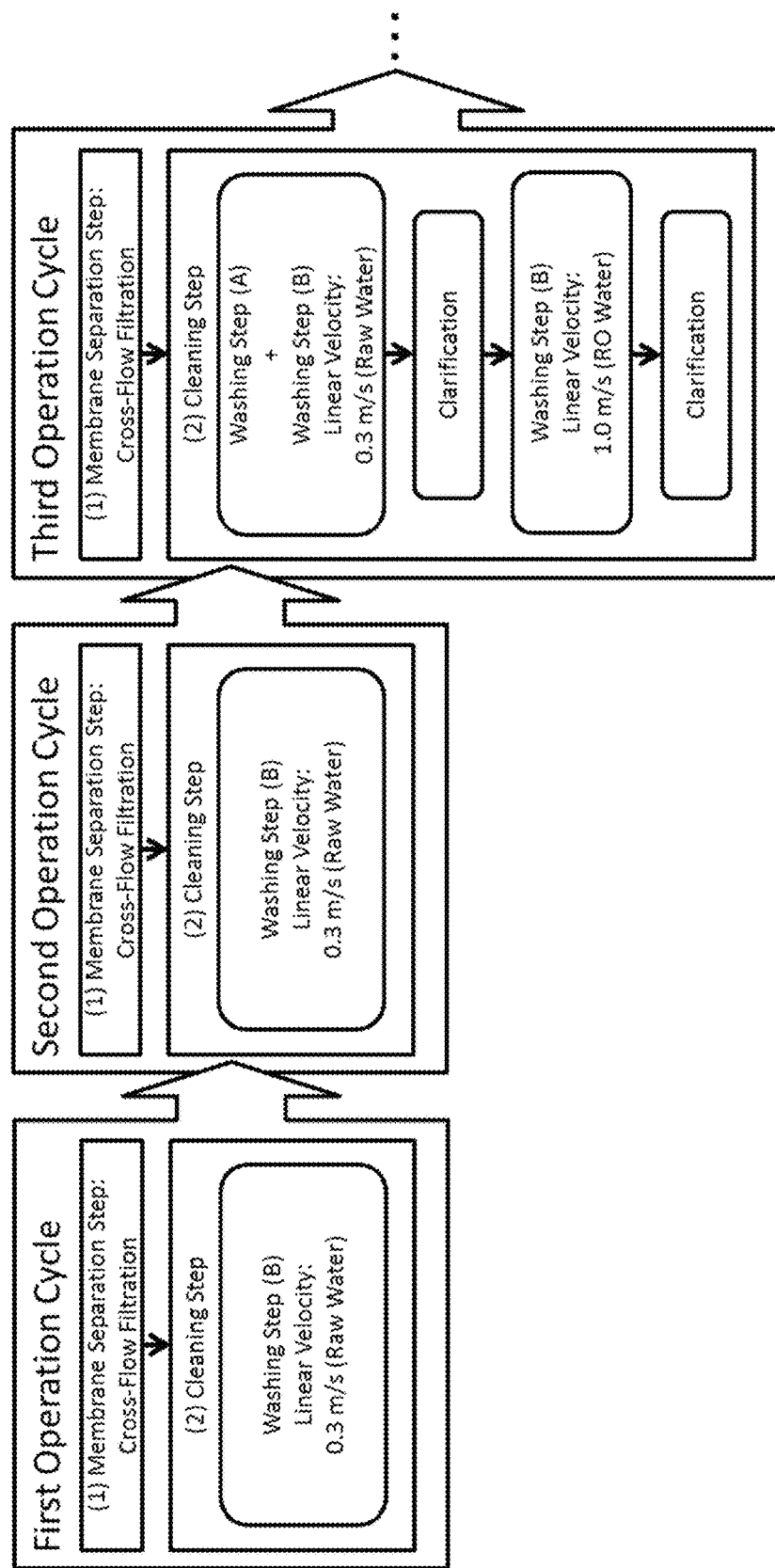
FIG. 7 is a flow diagram illustrating still another embodiment of the operation method of the present invention.

In the case of performing cross-flow filtration, as in the first operation cycle and second operation cycle of FIG. 7, intermittent filtration of applying the washing step (B) after the membrane separation step, stopping the filtration, and continuing the raw water circulation only to the raw water side is preferred. By this filtration, stable operation can be performed for a long time while preventing deposition of suspended solids on the membrane surface.

In addition, as in the third operation cycle of FIG. 7, when water inside of the module is once drained after simultaneously performing the washing step (A) and the washing step (B) and then the inside is cleaned using RO water at a high flow velocity, accumulation of suspended solids can be more successfully eliminated.

Figure 8:
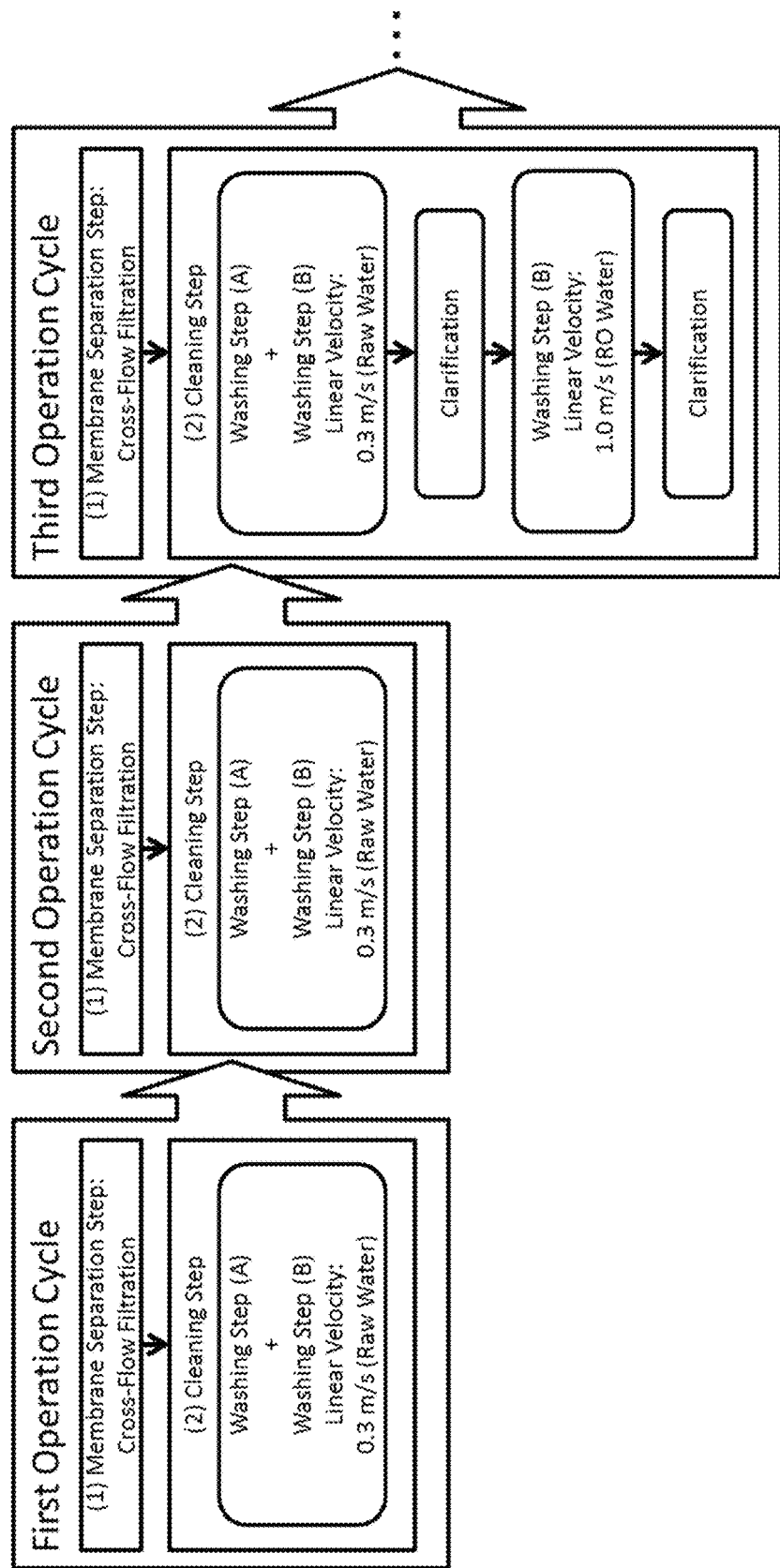
FIG. 8 is a flow diagram illustrating yet still another embodiment of the operation method of the present invention.

Furthermore, when the washing step (A) and the washing step (B) are applied after the membrane separation step as in the first and second cycles of FIG. 8 and by once stopping the filtration, intermittent backwash filtration of continuing the raw water circulation on the raw water side while performing backwashing is performed, accumulation of suspended solids can be more successfully eliminated. However, since washing water (backwashing water) of the washing step (A) flows into the raw water side, when RO water is used as the backwashing water, the concentrations of raw water and permeated liquid are reduced, and the concentrating speed of raw water slows down. When permeated liquid is used as the backwashing water, the collecting speed of permeated liquid slows down. Thus, this is determined taking into account the balance with the production speed.

(4) Chemical Liquid

The hollow-fiber membrane module of the present invention can be cleaned with a chemical liquid. As the chemical liquid, for example, an oxidizing agent such as sodium hypochlorite and hydrogen peroxide, acids such as hydrochloric acid, nitric acid, sulfuric acid, phosphoric acid, formic acid, acetic acid, citric acid, oxalic acid and lactic acid, alkalis such as sodium hydroxide and sodium carbonate, a chelating agent such as ethylenediaminetetraacetate (EDTA), various surfactants, and an aqueous solution thereof can be used.

The concentration of the chemical liquid is preferably from 10 mg/L to 200,000 mg/L. If the concentration is less than 10 mg/L, the cleaning effect is insufficient, and if it exceeds 200,000 mg/L, the chemical cost rises, which is unprofitable. The chemical may be one type of a chemical or a mixture of two or more types of chemicals.

EXAMPLES

The present invention is specifically described below by referring to Examples and Comparative Examples, but the present invention is not limited by these Examples.

The methods for evaluating the performances of the hollow-fiber membrane are as follows.

<1. Pure-Water Permeation Performance>

A compact module including 4 porous hollow-fiber membranes and having an effective length of 200 mm was manufactured. Distilled water was delivered to the module over 1 hour under the conditions of a temperature of 25° C. and a filtration pressure difference of 16 kPa, and the amount ($m^3$) of the obtained permeate was measured, converted into a numerical value per unit time (hr) and unit membrane area ($m^2$), further converted in terms of a pressure (50 kPa), and used as the pure-water permeation performance ($m^3/m^2/hr$). The unit membrane area was calculated from the average outside diameter and the effective length of the porous hollow-fiber membrane.

<2. Breaking Tenacity, Breaking Strength, Elongation at Break>

Using a tensile tester (TENSILON (registered trademark)/®-100, manufactured by Toyo Baldwin Co., Ltd.), a sample having a measurement length of 50 mm was tested at a tensile speed of 50 mm/min five or more times by changing the sample, and the breaking tenacity, breaking strength and elongation at break were calculated by determining respective average values.

<3. Orientation Degree $\pi$ of Molecular Chain in Longitudinal Direction of Porous Hollow-Fiber Membrane>

A porous hollow-fiber membrane was fixed to a fiber sample stage by arranging its longitudinal direction to run vertically and subjected to X-ray diffraction measurement ($2\theta/\theta$ scanning, $\beta$ scanning) by using an X-ray diffractometer (SmartLab for polymer, CuK$\alpha$ ray, manufactured by Rigaku Corporation). First, it was confirmed by $2\theta/\theta$ scanning that a peak top is present at $2\theta=20.4°$. Next, the intensity in the range from 0° up to 360° in the azimuth angle direction, relative to the diffraction peak at $2\theta=20.4°$, was measured by $\beta$ scanning to obtain an intensity distribution in the azimuth angle direction. Here, when the ratio between the intensity at an azimuth angle of 180° and the intensity at an azimuth angle of 90° was 0.80 or less or was 1.25 or more, it is regarded that a peak is present, the width at a position of half the peak height (half-width H) was determined from the intensity distribution in the azimuth angle direction, and the orientation degree $\pi$ was calculated according to the following formula (1). Since a minimum value of the intensity in $\beta$ scanning was observed at 0° and around 180°, a straight line passing these points was used as a baseline.

$$\text{Orientation degree } \pi = (180° - H)/180° \qquad (1)$$

<4. Raman Orientation Parameter ν>

The orientation parameter of the polyvinylidene fluoride homopolymer in the porous hollow-fiber membrane was determine by the following operation.

A cross-section in the longitudinal direction of the porous hollow-fiber membrane was sliced by cutting with a microtome. 10 columnar textures were selected per one porous hollow-fiber membrane, and for each columnar texture, the scattering intensity was measured by Raman spectroscopy at 1 μm intervals along the longitudinal direction while checking the columnar texture by an optical microscope. The number of measurement sites per one columnar texture was 20.

The orientation parameter of each texture was calculated according to formula (2), and the average value of respective orientation parameters was defined as the Raman parameter ν. In addition, for 20 measurement points in each of 10 columnar textures different from each other, respective average values of the largest orientation parameter and the smallest orientation parameter were determined, and denoting M as the maximum Raman orientation parameter and m as the minimum Raman orientation parameter, M/m was calculated.

$$\text{Raman orientation parameter}=(I1270/I840)\text{parallel}/(I1270/I840)\text{perpendicular} \qquad (2)$$

in which:

parallel condition: the longitudinal direction of the porous hollow-fiber membrane is parallel to the polarization direction, perpendicular condition: the longitudinal direction of the porous hollow-fiber membrane is orthogonal to the polarization direction, I1270 parallel: the intensity of Raman band at 1,270 cm$^{-1}$ under parallel condition, I1270 perpendicular: the intensity of Raman band at 1,270 cm$^{-1}$ under perpendicular condition, I840 parallel: the intensity of Raman band at 840 cm$^{-1}$ under parallel condition, and I840 perpendicular: the intensity of Raman band at 840 cm under perpendicular condition.

The laser Raman spectrometer and measurement conditions are as follows.

Apparatus: Jobin Yvon/Atago Bussan, T-64000
Conditions:
Measurement mode: macro-Raman
Object lens: ×100
Beam diameter: 1 μm
Light source: Ar+laser/514.5 nm
Laser power: 100 mW
Diffraction grating: Single 600 gr/mm
Slit: 100 μm
Detector: CCD/Jobin Yvon 1024×256

<5. Longitudinal Length and Short-Side Length of Columnar Texture>

A photograph of a cross-section along the longitudinal direction of the porous hollow-fiber membrane was taken at a magnification of 3,000 times by means of a scanning electron microscope, and each of the longitudinal length and short-side length was determined by averaging the lengths in 10 columnar textures. Here, the short-side length of each columnar texture was determined by measuring the length in the short-side direction at arbitrary 20 points within the texture and calculating an average value thereof.

<6. Thickness Uniformity>

First, the porous hollow-fiber membrane was resin-embedded in an epoxy resin and subjected to osmium dyeing treatment, and the void portion was thereby filled with an epoxy resin. Next, using a scanning electron microscope (SEM) equipped with a focused ion beam (FIB), a face parallel to the short-side direction of the porous hollow-fiber membrane was cut out using FIB, and FIB cutting and SEM observation were repeatedly conducted 200 times at 50 nm intervals toward the longitudinal direction of the porous hollow-fiber membrane to obtain information at a depth of 10 μm.

The thickness uniformity was determined by comparing a first cross-section and a second cross-section each running in parallel to the short-side direction of the porous hollow-fiber membrane, which were obtained in the above-described continuous cross-section observation using FIB. Here, 20 pairs of first cross-section and second cross-section were selected so that these cross-sections were parallel to each other and were spaced 5 μm apart. First, in each cross-section, a portion including resin and a void portion (epoxy portion) were distinguished, and the area of the resin portion and the area of the void portion were measured. Subsequently, the area of a portion where when the first cross-section is projected onto the second cross-section from a direction perpendicular to both cross-sections, the portion including resin in the first cross-section and the portion including resin in the second cross-section are overlapped, was determined and taken as the overlap area. The thickness uniformity was calculated as a value obtained by averaging thickness uniformities A and B determined according to the following formulae (3) and (4), and an average value of 20 pairs was employed. The membrane was determined to "have a columnar texture" when 16 pairs or more have a thickness uniformity of 0.60 or more, and determined to "have a fibrous texture" when 15 pairs or less have the thickness uniformity above.

$$\text{Thickness uniformity } A=(\text{overlap area})/(\text{area of resin portion of second cross-section}) \qquad (3)$$

$$\text{Thickness uniformity } B=(\text{overlap area})/(\text{area of resin portion of first cross-section}) \qquad (4)$$

<7. Porosity>

With respect to arbitrary 20 cross-sections selected from 20 pairs of first cross-section and second cross-section obtained in "6. Thickness Uniformity", i.e., a total of 40 cross-sections, the porosity was determined according to the following formula (5) by using the area of the resin portion and the area of the void portion, and an average value thereof was used.

$$\text{Porosity (\%)}=\{100\times(\text{area of void portion})\}/\{(\text{area of resin portion})+(\text{area of void portion})\} \qquad (5)$$

<8. Occupancy of Texture>

A photograph of a cross-section in the longitudinal direction of the porous hollow-fiber membrane was taken by means of a scanning electron microscope at a magnification of 3,000 times in arbitrary 20 places, and the following formula (6) is applied to determine the occupancy of the texture and an average value thereof was employed. Here, the area of the entire photograph and the area occupied by a texture were determined by printing the taken photograph on paper and converting respective areas into the weight of paper corresponding to the entire photograph and the weight of paper corresponding to a texture portion cut out therefrom.

$$\text{Occupancy (\%)}=\{(\text{area occupied by each texture})/(\text{area of entire photograph})\}\times 100 \qquad (6)$$

<9. Crystallization Temperature Tc of Fluororesin-Based Polymer Solution>

Using DSC-6200 manufactured by Seiko Instruments & Electronics Ltd., a mixture having the same composition as the membrane-forming polymer solution composition containing a fluororesin-based polymer, a solvent, etc. is sealed in a sealing type DSC container. A temperature of the mixture is raised to a melting temperature at a temperature rise rate of 10° C./min and kept for 30 minutes to melt the mixture uniformly. Then the temperature is lowered at a temperature drop rate of 10° C./min. The temperature at an onset of α crystallization peak observed in the temperature lowering process is determined as the crystallization temperature Tc.

The methods for evaluating the performances of the hollow-fiber membrane module and the method for determining the residual chlorine concentration in the raw water feed tank after the operation of the hollow-fiber membrane module are as follows.

<10. Measurement of Residual Chlorine Concentration>

As the method for measuring the residual chlorine concentration, a DPD method, an electric current method, an absorptiometric method, etc. are used. In the present Examples, the residual chlorine concentration was measured by the DPD method by using a pocket residual chlorine meter (HACH2470) manufactured by HACH Company. As a sample, 10 mL of a cleaning liquid was separated and reacted by adding a dedicated reagent, and the concentration was detected from the absorbancy at 528 nm. In the case of exceeding the measurement range of the chlorine meter, the sample was diluted with RO water and measured.

Reference Example 1

Production Method of Hollow-Fiber Membrane A:

36 wt % of a vinylene fluoride homopolymer (KF1300, produced by Kureha Corporation, weight average molecular weight: 417,000, number average molecular weight: 221,000) and 64 wt % of γ-butyrolactone were dissolved at 150° C. Tc of this vinylidene fluoride homopolymer solution was 48° C. By disposing two gear pumps, the solution was allowed to stay in a line between the two gear pumps for 20 seconds at 99 to 101° C. under a pressure of 2.0 MPa and then discharged from an outer tube of a dual tube-type spinneret, and an aqueous 85 wt % γ-butyrolactone solution was simultaneously discharged from an inner tube of the dual tube-type spinneret. The discharged solutions were allowed to stay in a cooling bath at a temperature of 25° C. containing an aqueous 85 wt % γ-butyrolactone solution for 20 seconds, thereby causing solidification. The obtained porous hollow fiber had a columnar texture having a thickness uniformity of 0.62, where the occupancy of columnar texture was 86% and the occupancy of spherical structure was 14%.

Subsequently, the porous hollow fiber obtained above was stretched to 2.5 times in water at 95° C. The porous hollow-fiber membrane after stretching had a columnar texture having a longitudinal length of 16 μm, a short-side length of 2.2 μm, a thickness uniformity of 0.61, and a porosity of 55%, where the orientation degree π of the molecular chain of the vinylidene fluoride homopolymer in the longitudinal direction of the porous hollow-fiber membrane was 0.61, the Raman orientation parameter ν was 3.12, and M/m was 3.1. The structure and performances of the porous hollow-fiber membrane after stretching are shown in Table 1.

Reference Example 2

Manufacture of Hollow-Fiber Membrane Module:

The method for manufacturing a hollow-fiber membrane module is described below.

The hollow fiber membrane was cut to a length of 1,800 mm, immersed in an aqueous 30 mass % glycerin solution for 1 hour, and then air-dried. This hollow fiber membrane was heat-treated with water vapor at 125° C. for 1 hour, air-dried, and cut to a length of 1,200 mm. A predetermined number of hollow fiber membranes thus obtained were bundled together, and the hollow-fiber membrane bundle was sealed with a silicone adhesive (produced by Dow Corning Toray Co., Ltd., SH850A/B, a mixture of two components mixed to afford a mass ratio of 50:50) at one end.

On the inner surface of a polysulfone-made cylindrical case 3 (inside diameter: 150 mm, outside diameter: 170 mm, length: 1,150 mm), the region to which the hollow-fiber membrane is bonded was preliminarily filed with sandpaper (#80) and degreased with ethanol.

Figure 9:
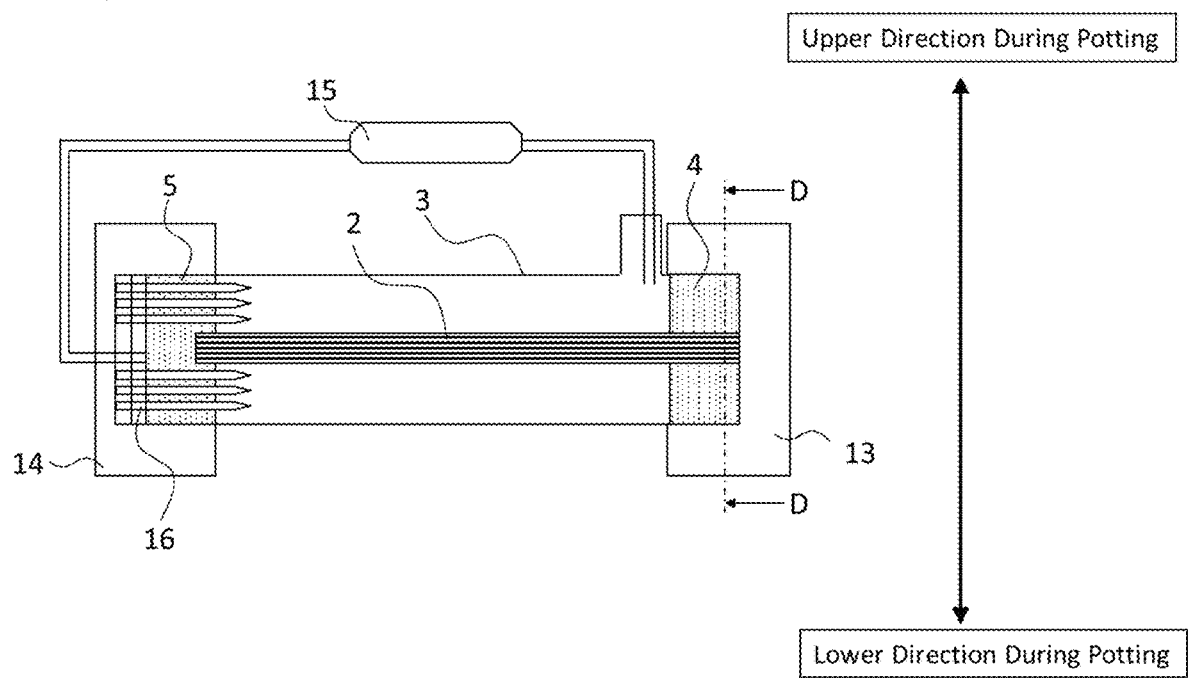
FIG. 9 is a schematic diagram for explaining the production method of a hollow-fiber membrane module in Examples of the present invention.

Thereafter, as illustrated in FIG. 9, the hollow-fiber membrane bundle 2 was packed inside of the cylindrical case 3. At this time, the hollow-fiber membrane bundle 2 was disposed such that the end part on the sealed side was located in a first end part (right-side end part of FIG. 9) of the cylindrical case 3, which is the upper part side of the membrane module, and a potting cap 14 (inside diameter: 150 mm) was further fixed. A potting cap 13 (inside diameter: 150 mm) having 36 holes in the bottom thereof was fixed to a second end part (left-side end part of FIG. 9), which is the lower part side of the module. Then, 36 pins 16 were inserted into the holes in the bottom of the potting cap 13 and secured. Each of the pins 16 had cylindrical shape with 10 mm in diameter and 200 mm in length. The positions of the pins 16 are the same as those of the through holes 11 of FIG. 2, and the pin was arranged such that the through hole was formed at a position lying in the lower part of the inclination, i.e., at a position on the upper side at the time of potting. The hollow-fiber membrane module having potting caps thus-fixed to both ends was installed in a centrifugal molding machine.

A polymeric MDI (produced Huntsman Japan Co., Ltd., Suprasec 5025), a polybutadiene-based polyol (produced by Cray Valley, Krasol LBH 3000), and 2-ethyl-1,3-hexanediol were mixed to afford a mass ratio of 57:100:26. The obtained mixture (i.e., polyurethane resin liquid) was put in an adhesive-charging fixture 15. The adhesive-charging fixture 15 is split in two directions, and by means of the adhesive-charging fixture 15, the polyurethane resin liquid was charged in an amount of 917 g into the module upper part side (first end part) and in an amount of 325 g into the module lower part side (second end part).

Subsequently, the centrifugal molding machine was rotated, and the potting cap at both ends was filled with the adhesive to form a first potting part 4 and a second potting part 5. The ambient temperature in the centrifugal molding machine was 35° C., the rotation speed was 350 rpm, and the centrifugation time was 4 hours.

After the centrifugation, the potting caps 13 and 14 and the pins 16 were removed, and the adhesive was cured by leaving it to stand still at room temperature for 24 hours. Thereafter, the outer adhesive portion (D-D plane depicted in FIG. 9) on the module upper part side (first end part side) of the polysulfone-made cylindrical case was cut with a chip saw-type rotary blade to open the end face of the hollow-fiber membrane. An upper cap 6 and a lower cap 7 were then fixed to both ends of the polysulfone-made cylindrical case to obtain the hollow-fiber membrane module 100 of the first embodiment.

Ethanol was then delivered to the hollow-fiber membrane module and filtered to fill the pores of the hollow fiber membrane with ethanol. Subsequently, RO water was delivered and filtered to replace ethanol with RO water.

TABLE 1

| | | Reference Example 1 | Reference Example 2 |
|---|---|---|---|
| Before stretching | Fluororesin-based polymer concentration | 36 | 38 |
| | Type of solvent | γ-butyrolactone | |
| | Crystallization temperature Tc (° C.) | 48 | 51 |
| | First cooling bath temperature (° C.) | 25 | 5 |
| | First cooling bath time (sec) | 20 | 10 |
| | Second cooling bath temperature (° C.) | — | 35 |
| | Second cooling bath time (sec) | — | 50 |
| | Thickness uniformity (—) | 0.62 | 0.66 |
| | Occupancy of spherical structure (%) | 14 | 9 |
| After stretching | Stretch ratio (times) | 2.5 | 3 |
| | Orientation degree π | 0.61 | 0.85 |
| | Raman orientation parameter ν | 3.12 | 4.37 |
| | M/m | 3.1 | 5 |
| | Thickness uniformity (—) | 0.61 | 0.66 |
| | Porosity (%) | 55 | 59 |
| Performance | Pure-water permeation performance ($m^3/m^2/hr$) | 2.1 | 2.2 |
| | Breaking strength (MPa) | 27 | 48 |
| | Elongation at break (%) | 165 | 101 |

Example 1

The production method of Reference Example 1 was used to obtain a porous hollow-fiber membrane having an outside diameter of 1.1 mm, an inside diameter of 0.6 mm, a breaking strength of 27 MPa, and a breaking tenacity of 1,840 g/fiber. Thereafter, according the manufacturing method of a porous hollow-fiber membrane module of Reference Example 2, a hollow-fiber membrane module having packed therein 6,880 hollow-fiber membranes above was manufactured. The membrane module thus produced had a membrane area of 26.2 $m^2$, and the filling ratio in the central part of the cylindrical case was 37%. This module was fixed to a separation membrane device as illustrated in FIG. 10, and filtration of a sugar solution was performed.

As the sugar solution, a solution obtained by adding α-amylase and glucoamylase to water and commercially available cornstarch and performing a hydrolysis reaction while stirring at 60° C. for 24 hours was subjected to the test. The average suspended solid concentration was 500 mg/L.

Figure 10:
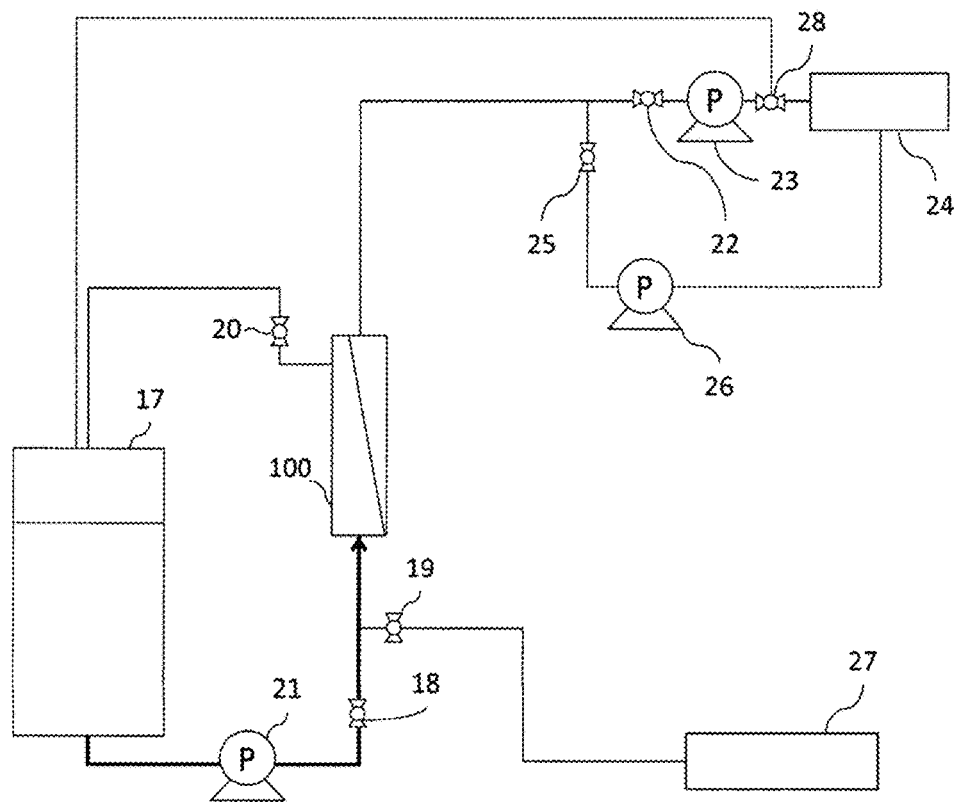
FIG. 10 is a flow diagram illustrating one example of the membrane separation device for use in the present invention.

The obtained sugar solution was put in the raw water feeding tank 17 of the separation membrane device of FIG. 10, and membrane separation was conducted. As for the filtration system, cross-flow filtration was employed.

First, as the membrane separation step, the valve 18 was opened; the valve 19 was set to open the line from the raw water feeding tank 17 to the hollow-fiber membrane module 100; the valve 20 was opened; the raw water feed pump 21 was driven to feed the sugar solution to the hollow-fiber membrane module 100 to afford a membrane surface linear velocity of 0.3 m/sec; and the concentrated liquid failing in passing through the hollow-fiber membrane was circulated to return to the raw water feeding tank 17 through the valve 20. Simultaneously, the valve 22 was opened; the valve 28 was set to open the line from the pump 23 to the permeated liquid reservoir 24; and the pump 23 was driven to collect the sugar solution passed through the hollow-fiber membrane, at a permeation flow rate of 26.2 $m^3$/day for 28 minutes.

Thereafter, backwashing of the washing step (A) was conducted by stopping the pump 23, closing the valve 22, opening the valve 25, and driving the pump 26 to feed the permeated liquid at a permeation flow rate of 39.3 $m^3$/day from the permeated liquid reservoir 24 to the hollow-fiber membrane module 100. Simultaneously, the washing step (B) was conducted by circulating the sugar solution fed to the membrane module 100 from the raw water feed pump 21 at a membrane surface linear velocity of 0.3 m/sec and the permeated liquid converged to the raw water side through the hollow-fiber membrane by the operation of the washing step (A), so as to entirely return to the raw water feeding tank 17 through the valve 20, and this was conducted for 2 minutes.

Furthermore, a second operation cycle was continuously operated by the same operation as the first operation cycle above by again opening the valve 22 at the same time, setting the valve 28 to open the line from the pump 23 to the permeated liquid reservoir 24, and driving the pump 23 to initiate the membrane separation step for the sugar solution passed through the hollow-fiber membrane at a permeation flow rate of 26.2 $m^3$/day, and this was repeated until a fifteenth operation cycle. In the subsequent sixteenth operation cycle, a membrane separation step for the sugar solution passed through the hollow-fiber membrane was operated for 28 minutes at a permeation flow rate of 26.2 $m^3$/day by again opening the valve 22 at the same time, setting the valve 28 to open the line from the pump 23 to the permeated liquid reservoir 24, and driving the pump 23. Thereafter, while conducting the washing step (A) by stopping the pump 23, closing the valve 22, opening the valve 25, and driving the pump 26 to feed the permeated liquid from the permeated liquid reservoir 24 to the hollow-fiber membrane module 100, the washing step (B) was simultaneously conducted for 2 minutes by circulating the sugar solution fed to the membrane module 100 from the raw water feed pump 21 at a membrane surface linear velocity of 0.3 m/sec and the permeated liquid converged to the raw water side through the hollow-fiber membrane by the operation of the washing step (A), so as to entirely return to the raw water feeding tank 17 through the valve 20.

Thereafter, the raw water feed pump 21 and the pump 26 were stopped, and the valve 25 was closed. Subsequently, the valve 19 was opened to discharge the sugar solution from the hollow-fiber membrane module 100 to the clarified liquid reservoir 27, and the raw water feed pump 21 was driven to pump out the concentrated sugar water also from the inside of the raw water feeding tank 17.

Subsequently, the second washing step (B) was conducted for 5 minutes by closing the valve 19, feeding RO water to the raw water feeding tank 17, and driving the raw water feed pump 21 such that RO water is fed to the hollow-fiber membrane module 100 to afford a membrane surface linear velocity of 5.0 m/sec and circulated to return to the raw water feeding tank 17 through the valve 20. Thereafter, the raw water feed pump 21 was stopped; the valve 19 was opened to discharge RO water from the hollow-fiber membrane module 100 to the clarified liquid reservoir 27; and the raw water feed pump 21 was driven to pump out RO water used as cleaning water also from the inside of the raw water feeding tank 17.

This operation cycle group was repeated nine times.

After that, chemical liquid cleaning was conducted by adding sodium hypochlorite as a cleaning liquid to the raw water feeding tank 17 to afford a concentration of 3,000 ppm, opening the valve 18, setting the valve 19 to open the line from the raw water feeding tank 17 to the hollow-fiber membrane module 100, opening the valve 20, driving the raw water feed pump 21 to feed the sugar solution to the separation membrane module 100 to afford a membrane surface linear velocity of 0.3 m/sec, and circulating the concentrated liquid failing in passing through the hollow-fiber membrane to return to the raw water feeding tank 17 through the valve 20, and simultaneously by opening the valve 22, setting the valve 28 to open the line from the pump 23 to the raw water feeding tank 17, and driving and setting the pump 23 to circulate the cleaning liquid passed through the hollow-fiber membrane to the raw water feeding tank 17 at a permeation flow rate of 2.6 m$^3$/day. After conducting the chemical liquid cleaning for 1 hour, the residual chlorine concentration of sodium hypochlorite within the raw water feeding tank 17 was measured. The free chlorine concentration was 2,700 ppm before chemical liquid cleaning, whereas it was 1,400 ppm after the cleaning. The recovery rate of water permeability of the module was 85%.

Example 2

The production method of Reference Example 1 was used to obtain a hollow-fiber membrane having an outside diameter of 1.2 mm, an inside diameter of 0.7 mm, a breaking strength of 27 MPa, and a breaking tenacity of 2,060 g/fiber. Thereafter, a module having packed therein 3,910 hollow-fiber membranes above was manufactured in the same manner as the porous hollow-fiber membrane module of Reference Example 2. The membrane module thus produced had a membrane area of 16.2 m$^2$, the filling ratio in the central part of the cylindrical case was 25%, and the membrane area per unit volume was 950 m$^2$/m$^3$. This module was fixed to a separation membrane device according to the flow sheet of FIG. 10 and after performing the same operation as in Example 1 and continuously conducting chemical liquid cleaning for 1 hour by preparing sodium hypochlorite at 3,000 ppm in the raw water feeding tank 17, the residual chlorine concentration of sodium hypochlorite within the raw water feeding tank 17 was measured. The free chlorine concentration was 2,700 ppm before chemical liquid cleaning, whereas it was 900 ppm after the cleaning. The recovery ratio of water permeability of the module was 82%.

Comparative Example 1

The production method of Reference Example 1 was used to obtain a hollow-fiber membrane having an outside diameter of 1.1 mm, an inside diameter of 0.6 mm, a breaking strength of 27 MPa, and a breaking tenacity of 1,840 g/fiber. Thereafter, according to the manufacturing method of a porous hollow-fiber membrane module of Reference Example 2, a hollow-fiber membrane module having packed therein 10,000 hollow-fiber membranes above was manufactured. The membrane module thus produced had a membrane area of 38.0 m$^2$, the filling ratio in the central part of the cylindrical case was 54%, and the membrane area per unit volume was 2,210 m$^2$/m$^3$.

This membrane module was fixed to a separation membrane device illustrated in FIG. 10, and the same operation as in Example 1 was performed.

As a result, the liquid sending pressure to the membrane module was gradually increased and when in the sixteenth operation cycle of the fifth operation cycle group, the second washing step (B) with RO water was initiated after performing the membrane separation step and subsequent washing steps (A) and (B) and then pumping out the sugar solution, the liquid sending pressure was increased, failing in maintaining the flow rate of 2.0 m/sec. The module was detached, and the inside was checked, as a result, deposition of many suspended solids was observed. It is considered that compared with Example 1, in Comparative Example 1, elimination of the accumulation of suspended solids was insufficient.

Comparative Example 2

A hollow-fiber membrane was produced according to the technique described in WO 2003/031038. The obtained hollow-fiber membrane had an outside diameter of 2.2 mm, an inside diameter of 1.0 mm, a pure-water permeation performance of 0.6 m$^3$/m$^2$/hr, a breaking tenacity of 1,850 g/fiber, a breaking strength of 6 MPa, and an elongation at break of 68%. According to the manufacturing method of a porous hollow-fiber membrane module of Reference Example 2, a hollow-fiber membrane module having packed therein 1,720 hollow-fiber membranes above was manufactured. The membrane module thus produced had a membrane area of 13.1 m$^2$, the filling ratio in the central part of the cylindrical case was 37%, and the membrane area per unit volume was 760 m$^2$/m$^3$.

This membrane module was fixed to a separation membrane device illustrated in FIG. 10, and the same operation as in Example 1 was performed.

As a result, the membrane filtration differential pressure in the membrane separation step was rapidly increased and when the membrane filtration differential pressure reached 100 kPa in the middle of the membrane separation step in the sixth operation cycle group, the operation was stopped. Subsequently, chemical liquid cleaning with sodium hypochlorite at 3,000 ppm was conducted by the method of Example 1. After conducting the chemical liquid cleaning for 1 hour, the residual chlorine concentration of sodium hypochlorite within the raw water feeding tank 17 was measured. The free chlorine concentration was 2,700 ppm before the cleaning, whereas it was 800 ppm after chemical liquid cleaning. The recovery ratio of water permeability of the module was 60%. Compared with Example 1, stable operation was difficult due to rapid membrane clogging, and the chemical liquid was further required for sufficient cleaning.

Comparative Example 3

A hollow-fiber membrane was produced according to the technique described in WO 2003/031038, and a hollow-fiber membrane having an outside diameter of 1.1 mm, an inside diameter of 0.6 mm, a pure-water permeation performance of 1.7 m$^3$/m$^2$/hr, a breaking tenacity of 540 g/fiber, a breaking strength of 8 MPa, and an elongation at break of 46% was obtained. According to the manufacturing method of a porous hollow-fiber membrane module of Reference Example 2, a hollow-fiber membrane module having packed therein 6,880 hollow-fiber membranes above was manufactured. The membrane module thus produced had a membrane area of 26.2 m$^2$, and the filling ratio in the central part of the cylindrical case was 37%.

This membrane module was fixed to a separation membrane device illustrated in FIG. 10, and the same operation as in Example 1 was performed.

As a result, when in the sixteenth operation cycle of the third operation cycle group, the second washing step (B) with RO water was initiated after performing the membrane separation step and subsequent washing steps (A) and (B)

and then pumping out the sugar solution, the hollow-fiber membrane was broken at the adhesive interface between the first potting part and the hollow-fiber membrane. It is considered that the membrane was broken due to the weight of suspended solids accumulated and the action of stress by the washing steps.

TABLE 2

|  | Example | | Comparative Example | | |
|---|---|---|---|---|---|
|  | 1 | 2 | 1 | 2 | 3 |
| Outside diameter (mm) | 1.1 | 1.2 | 1.1 | 2.2 | 1.1 |
| Inside diameter (mm) | 0.6 | 0.7 | 0.6 | 1.0 | 0.6 |
| Breaking strength (MPa) | 27 | 27 | 27 | 6 | 8 |
| Breaking tenacity (g/fiber) | 1,840 | 2,060 | 1,840 | 1,850 | 540 |
| Number of membranes packed (membranes) | 6,880 | 3,910 | 10,000 | 1,720 | 6,880 |
| Filling ratio (%) | 37 | 25 | 54 | 37 | 37 |
| Membrane area (m$^2$) | 26.2 | 16.2 | 38.0 | 13.1 | 26.2 |
| Membrane area per unit volume(m$^2$/m$^3$) | 1,530 | 950 | 2,210 | 760 | 1,530 |
| Recovery ratio of water permeability after chemical liquid cleaning (%) | 85 | 82 | — | 60 | — |

Reference Example 4

Production Method of Hollow-Fiber Membrane B:

35 wt % of a vinylene fluoride homopolymer having a weight average molecular weight of 417,000 (KF1300, produced by Kureha Corporation, weight average molecular weight: 417,000, number average molecular weight: 221,000) and 65 wt % of γ-butyrolactone were dissolved at 150° C. Tc of the thus-obtained vinylidene fluoride homopolymer solution (i.e., raw material solution) was 46° C.

For the pressurization and discharge of the raw material solution, an apparatus having a double tube-type spinneret, a piping connected to the spinneret, and two gear pumps disposed on the piping were used. In the piping between gear pumps, the raw material solution was retained at 99 to 101° C. for 15 seconds under a pressure of 2.5 MPa. Thereafter, while discharging an aqueous 85 wt % γ-butyrolactone solution from the inner tube of the double tube-type spinneret, the raw material solution was discharged from the outer tube. The raw material solution was allowed to stay in a cooling bath at a temperature of 20° C. containing an aqueous 85 wt % γ-butyrolactone solution for 20 seconds, thereby causing solidification.

The obtained porous hollow fiber had a columnar texture having a thickness uniformity of 0.55, where the occupancy of columnar texture was 85% and the occupancy of spherical structure was 15%.

Subsequently, the porous hollow fiber obtained above was stretched to 2.0 times at a stretching speed of 9%/sec in water at 95° C.

The porous hollow-fiber membrane after stretching was observed, and a columnar texture was recognized. Furthermore, in the porous hollow-fiber membrane, the columnar texture had a representative value of longitudinal length of 16 μm, a representative value of short-side length of 2.1 μm, and a thickness uniformity of 0.51, the porosity was 56%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 1.82, the maximum Raman orientation parameter M was 2.31, the minimum Raman orientation parameter m was 1.32, and M/m was 1.8. The structure and performances of the porous hollow-fiber membrane after stretching are shown in Table 3.

Reference Example 3

Manufacture of Hollow-Fiber Membrane Module:

The method for manufacturing a hollow-fiber membrane module is described below.

The hollow fiber membrane was cut to a length of 1,200 mm, immersed in an aqueous 30 mass % glycerin solution for 1 hour, and then air-dried. A predetermined number of hollow fiber membranes thus obtained were bundled together, and the hollow-fiber membrane bundle was sealed with a silicone adhesive (produced by Dow Corning Toray Co., Ltd., SH850A/B, a mixture of two components mixed to afford a mass ratio of 50:50) at one end.

On the inner surface of a polysulfone-made cylindrical case 3 (inside diameter: 150 mm, outside diameter: 170 mm, length: 1,150 mm), the region to which the hollow-fiber membrane is bonded was preliminarily filed with sandpaper (#80) and degreased with ethanol.

Thereafter, as illustrated in FIG. 9, the hollow-fiber membrane bundle 2 was packed inside of the cylindrical case 3. At this time, the hollow-fiber membrane bundle 2 was disposed such that the end part on the sealed side to be located in a first end part (right-side end part of FIG. 9) of the cylindrical case 3, which was the upper part side of the membrane module, and a potting cap 14 (inside diameter: 150 mm) was further fixed. A potting cap 13 (inside diameter: 150 mm) having 36 holes in the bottom thereof was fixed to a second end part (left-side end part of FIG. 9), which was the lower part side of the module. Then, 36 pins 16 were inserted into the holes in the bottom of the potting cap 13 and secured. Each of the pins 16 had a cylindrical shape with 10 mm in diameter and 200 mm in length. The positions of the pins 16 are the same as those of the through holes 11 of FIG. 2, and the pin was arranged such that the through hole was formed at a position lying on the upper side at the time of potting. The hollow-fiber membrane module having potting caps thus-fixed to both ends was installed in a centrifugal molding machine.

A polymeric MDI (produced Huntsman Japan Co., Ltd., Suprasec 5025), a polybutadiene-based polyol (produced by Cray Valley, Krasol LBH 3000), and 2-ethyl-1,3-hexanediol were mixed to afford a mass ratio of 57:100:26. The obtained mixture (i.e., polyurethane resin solution) was put in an adhesive-charging fixture 15. The adhesive-charging fixture 15 is split in two directions, and by means of the adhesive-charging fixture 15, the polyurethane resin solution was charged in an amount of 917 g into the module upper part side (first end part) and in an amount of 325 g into the module lower part side (second end part).

Subsequently, the centrifugal molding machine was rotated, and the potting caps at both ends were filled with the adhesive to form a first potting part 4 and a second potting part 5. The ambient temperature in the centrifugal molding machine was 35° C., the rotation speed was 350 rpm, and the centrifugation time was 4 hours.

After the centrifugation, the potting caps 13 and 14 and the pins 16 were removed, and the adhesive was cured by leaving it to stand still at room temperature for 24 hours. Thereafter, the outer adhesive portion (D-D plane depicted in FIG. 9) on the module upper part side (first end part side)

of the polysulfone-made cylindrical case was cut with a chip saw-type rotary blade to open the end face of the hollow-fiber membrane, and an upper cap 6 and a lower cap 7 were fixed to both ends of the polysulfone-made cylindrical case to obtain the hollow-fiber membrane module 100 of first embodiment.

Ethanol was then delivered to the hollow-fiber membrane module and filtered to fill the pores of the hollow fiber membrane with ethanol. Subsequently, RO water was delivered and filtered to replace ethanol with RO water.

Reference Example 5

Production Method of Hollow-Fiber Membrane B:

36 wt % of a vinylene fluoride homopolymer having a weight average molecular weight of 417,000 (KF1300, produced by Kureha Corporation, weight average molecular weight: 417,000, number average molecular weight: 221,000) and 64 wt % of γ-butyrolactone were dissolved at 150° C. Tc of this vinylidene fluoride homopolymer solution was 48° C. By disposing two gear pumps, the solution was allowed to stay in a line between the two gear pumps for 15 seconds at 99 to 101° C. under a pressure of 2.5 MPa and then discharged from an outer tube of a dual tube-type spinneret, and an aqueous 85 wt % γ-butyrolactone solution was simultaneously discharged from an inner tube of the dual tube-type spinneret. The discharged solutions were allowed to stay in a first cooling bath containing an aqueous 85 wt % γ-butyrolactone solution at a temperature of 10° C. for 10 seconds and then allowed to stay in a second cooling bath containing an aqueous 85 wt % γ-butyrolactone solution at a temperature of 20° C. for 20 seconds, thereby causing solidification. The obtained porous hollow fiber had a columnar texture having a thickness uniformity of 0.64, where the occupancy of columnar texture was 87% and the occupancy of spherical structure was 13%.

Subsequently, the porous hollow fiber obtained above was stretched to 2.4 times at a stretching speed of 44%/sec in water at 95° C. The porous hollow-fiber membrane after stretching had a columnar texture having a representative value of longitudinal length of 18 μm, a representative value of short-side length of 1.9 μm, and a thickness uniformity of 0.60, where the porosity was 55%, the orientation degree π of the molecular chain of vinylidene fluoride homopolymer in the longitudinal direction of the porous hollow-fiber membrane was 0.25, the Raman orientation parameter ν was 2.35, the maximum Raman orientation parameter M was 2.84, the minimum Raman orientation parameter m was 1.21, and M/m was 2.4. The structure and performances of the porous hollow-fiber membrane after stretching are shown in Table 3.

Reference Example 6

Production Method of Hollow-Fiber Membrane B:

39 wt % of a vinylene fluoride homopolymer having a weight average molecular weight of 417,000 (KF1300, produced by Kureha Corporation, weight average molecular weight: 417,000, number average molecular weight: 221,000) and 61 wt % of γ-butyrolactone were dissolved at 150° C. Tc of this vinylidene fluoride homopolymer solution was 52° C. By disposing two gear pumps, the solution was allowed to stay in a line between the two gear pumps for 20 seconds at 99 to 101° C. under a pressure of 2.5 MPa and then discharged from an outer tube of a dual tube-type spinneret, and an aqueous 85 wt % γ-butyrolactone solution was simultaneously discharged from an inner tube of the dual tube-type spinneret. The discharged solutions were allowed to stay in a first cooling bath containing an aqueous 85 wt % γ-butyrolactone solution at a temperature of 5° C. for 10 seconds and then allowed to stay in a second cooling bath containing an aqueous 85 wt % γ-butyrolactone solution at a temperature of 30° C. for 40 seconds, thereby causing solidification. The obtained porous hollow fiber had a columnar texture having a thickness uniformity of 0.69, where the occupancy of columnar texture was 91% and the occupancy of spherical structure was 9%.

Subsequently, the porous hollow fiber obtained above was stretched to 2.4 times at a stretching speed of 142%/sec in water at 95° C. The porous hollow-fiber membrane after stretching had a columnar texture having a representative value of longitudinal length of 22 μm, a representative value of short-side length of 1.8 μm, and a thickness uniformity of 0.62, where the porosity was 54%, the orientation degree π of the molecular chain of vinylidene fluoride homopolymer in the longitudinal direction of the porous hollow-fiber membrane was 0.31, the Raman orientation parameter ν was 2.53, the maximum Raman orientation parameter M was 3.08, the minimum Raman orientation parameter m was 1.14, and M/m was 2.7. The structure and performances of the porous hollow-fiber membrane after stretching are shown in Table 3.

Reference Example 7

Production Method of Hollow-Fiber Membrane B:

39 wt % of a vinylene fluoride homopolymer having a weight average molecular weight of 417,000 (KF1300, produced by Kureha Corporation, weight average molecular weight: 417,000, number average molecular weight: 221,000) and 61 wt % of γ-butyrolactone were dissolved at 150° C. Tc of this vinylidene fluoride homopolymer solution was 52° C. By disposing two gear pumps, the solution was allowed to stay in a line between the two gear pumps for 20 seconds at 99 to 101° C. under a pressure of 2.5 MPa and then discharged from an outer tube of a dual tube-type spinneret, and an aqueous 85 wt % γ-butyrolactone solution was simultaneously discharged from an inner tube of the dual tube-type spinneret. The discharged solutions were allowed to stay in a first cooling bath containing an aqueous 85 wt % γ-butyrolactone solution at a temperature of 5° C. for 10 seconds and then allowed to stay in a second cooling bath containing an aqueous 85 wt % γ-butyrolactone solution at a temperature of 35° C. for 50 seconds, thereby causing solidification. The obtained porous hollow fiber had a columnar texture having a thickness uniformity of 0.68, where the occupancy of columnar texture was 92% and the occupancy of spherical structure was 8%.

Subsequently, the porous hollow fiber obtained above was stretched to 1.8 times at a stretching speed of 2%/sec in water at 95° C. The porous hollow-fiber membrane after stretching had a columnar texture having a representative value of longitudinal length of 13 μM, a representative value of short-side length of 1.9 μm, and a thickness uniformity of 0.66, where the porosity was 53%, the orientation degree 7f of the molecular chain of vinylidene fluoride homopolymer in the longitudinal direction of the porous hollow-fiber membrane could not be calculated, that is, the molecular chain was non-oriented, the Raman orientation parameter ν was 2.13, the maximum Raman orientation parameter M was 2.69, the minimum Raman orientation parameter m was 1.65, and M/m was 1.6. The structure and performances of the porous hollow-fiber membrane after stretching are shown in Table 3.

Reference Example 8

Production Method of Hollow-Fiber Membrane B:

38 wt % of a vinylene fluoride homopolymer having a weight average molecular weight of 417,000 (KF1300, produced by Kureha Corporation, weight average molecular weight: 417,000, number average molecular weight: 221,000) and 62 wt % of dimethylsulfoxide were dissolved at 130° C. Tc of this vinylidene fluoride homopolymer solution was 29° C. By disposing two gear pumps, the solution was allowed to stay in a line between the two gear pumps for 20 seconds at 78 to 80° C. under a pressure of 2.5 MPa and then discharged from an outer tube of a dual tube-type spinneret, and an aqueous 90 wt % dimethylsulfoxide solution was simultaneously discharged from an inner tube of the dual tube-type spinneret. The discharged solutions were allowed to stay in a cooling bath containing an aqueous 85 wt % dimethylsulfoxide solution at a temperature of 20° C. for 20 seconds, thereby causing solidification. The obtained porous hollow fiber had a columnar texture having a thickness uniformity of 0.62, where the occupancy of columnar texture was 94% and the occupancy of spherical structure was 6%.

Subsequently, the porous hollow fiber obtained above was stretched to 2.0 times at a stretching speed of 19%/sec in water at 95° C. The porous hollow-fiber membrane after stretching had a columnar texture having a representative value of longitudinal length of 19 μm, a representative value of short-side length of 2.3 μm, and a thickness uniformity of 0.61, where the porosity was 57%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 2.32, the maximum Raman orientation parameter M was 2.61, the minimum Raman orientation parameter m was 1.42, and M/m was 1.8. The structure and performances of the porous hollow-fiber membrane after stretching are shown in Table 3.

Reference Example 9

Production Method of Hollow-Fiber Membrane B:

38 wt % of a vinylene fluoride homopolymer having a weight average molecular weight of 417,000 (KF1300, produced by Kureha Corporation, weight average molecular weight: 417,000, number average molecular weight: 221,000) and 62 wt % of dimethylsulfoxide were dissolved at 130° C. Tc of this vinylidene fluoride homopolymer solution was 29° C. By disposing two gear pumps, the solution was allowed to stay in a line between the two gear pumps for 20 seconds at 78 to 80° C. under a pressure of 2.5 MPa and then discharged from an outer tube of a dual tube-type spinneret, and an aqueous 90 wt % dimethylsulfoxide solution was simultaneously discharged from an inner tube of the dual tube-type spinneret. The discharged solutions were allowed to stay in a first cooling bath containing an aqueous 85 wt % dimethylsulfoxide solution at a temperature of –3° C. for 10 seconds and then allowed to stay in a second cooling bath containing an aqueous 85 wt % dimethylsulfoxide solution at a temperature of 20° C. for 30 seconds, thereby causing solidification. The obtained porous hollow fiber had a columnar texture having a thickness uniformity of 0.68, where the occupancy of columnar texture was 93% and the occupancy of spherical structure was 7%.

Subsequently, the porous hollow fiber obtained above was stretched to 1.8 times at a stretching speed of 146%/sec in water at 95° C. The porous hollow-fiber membrane after stretching had a columnar texture having a representative value of longitudinal length of 19 μm, a representative value of short-side length of 2.0 μm, and a thickness uniformity of 0.66, where the porosity was 56%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 2.18, the maximum Raman orientation parameter M was 2.56, the minimum Raman orientation parameter m was 1.29, and M/m was 2.0. The structure and performances of the porous hollow-fiber membrane after stretching are shown in Table 3.

Reference Example 10

Production Method of Hollow-Fiber Membrane B:

42 wt % of a vinylene fluoride homopolymer having a weight average molecular weight of 417,000 (KF1300, produced by Kureha Corporation, weight average molecular weight: 417,000, number average molecular weight: 221,000) and 58 wt % of dimethylsulfoxide were dissolved at 130° C. Tc of this vinylidene fluoride homopolymer solution was 35° C. By disposing two gear pumps, the solution was allowed to stay in a line between the two gear pumps for 20 seconds at 78 to 80° C. under a pressure of 2.5 MPa and then discharged from an outer tube of a dual tube-type spinneret, and an aqueous 90 wt % dimethylsulfoxide solution was simultaneously discharged from an inner tube of the dual tube-type spinneret. The discharged solutions were allowed to stay in a first cooling bath containing an aqueous 85 wt % dimethylsulfoxide solution at a temperature of –3° C. for 10 seconds and then allowed to stay in a second cooling bath containing an aqueous 85 wt % dimethylsulfoxide solution at a temperature of 20° C. for 50 seconds, thereby causing solidification. The obtained porous hollow fiber had a columnar texture having a thickness uniformity of 0.72, where the occupancy of columnar texture was 95% and the occupancy of spherical structure was 5%.

Subsequently, the porous hollow fiber obtained above was stretched to 2.4 times at a stretching speed of 125%/sec in water at 95° C. The porous hollow-fiber membrane after stretching had a columnar texture having a representative value of longitudinal length of 22 μm, a representative value of short-side length of 1.8 μm, and a thickness uniformity of 0.70, where the porosity was 56%, the orientation degree π of the molecular chain of vinylidene fluoride homopolymer in the longitudinal direction of the porous hollow-fiber membrane was 0.34, the Raman orientation parameter ν was 2.96, the maximum Raman orientation parameter M was 3.31, the minimum Raman orientation parameter m was 1.42, and M/m was 2.3. The structure and performances of the porous hollow-fiber membrane after stretching are shown in Table 3.

Reference Example 11

Production Method of Hollow-Fiber Membrane B:

42 wt % of a vinylene fluoride homopolymer having a weight average molecular weight of 417,000 (KF1300, produced by Kureha Corporation, weight average molecular weight: 417,000, number average molecular weight: 221, 000) and 58 wt % of dimethylsulfoxide were dissolved at 130° C. Tc of this vinylidene fluoride homopolymer solution was 35° C. By disposing two gear pumps, the solution was allowed to stay in a line between the two gear pumps for 20 seconds at 78 to 80° C. under a pressure of 2.5 MPa and then discharged from an outer tube of a dual tube-type spinneret, and an aqueous 90 wt % dimethylsulfoxide solution was simultaneously discharged from an inner tube of the dual tube-type spinneret. The discharged solutions were allowed to stay in a first cooling bath containing an aqueous 85 wt % dimethylsulfoxide solution at a temperature of −3° C. for 10 seconds and then allowed to stay in a second cooling bath containing an aqueous 85 wt % dimethylsulfoxide solution at a temperature of 20° C. for 50 seconds, thereby causing solidification. The obtained porous hollow fiber had a columnar texture having a thickness uniformity of 0.72, where the occupancy of columnar texture was 95% and the occupancy of spherical structure was 5%.

Subsequently, the porous hollow fiber obtained above was stretched to 2.4 times at a stretching speed of 16%/sec in water at 95° C. The porous hollow-fiber membrane after stretching had a columnar texture having a representative value of longitudinal length of 23 μm, a representative value of short-side length of 1.9 μm, and a thickness uniformity of 0.72, where the porosity was 55%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 2.48, the maximum Raman orientation parameter M was 2.75, the minimum Raman orientation parameter m was 1.33, and M/m was 2.1. The structure and performances of the porous hollow-fiber membrane after stretching are shown in Table 3.

Reference Example 12

35 wt % of a vinylene fluoride homopolymer having a weight average molecular weight of 417,000 (KF1300, produced by Kureha Corporation, weight average molecular weight: 417,000, number average molecular weight: 221,000) and 65 wt % of γ-butyrolactone were dissolved at 150° C. Tc of this vinylidene fluoride homopolymer solution was 46° C. By disposing two gear pumps, the solution was allowed to stay in a line between the two gear pumps for 20 seconds at 99 to 101° C. under a pressure of 2.5 MPa and then discharged from an outer tube of a dual tube-type spinneret, and an aqueous 85 wt % γ-butyrolactone solution was simultaneously discharged from an inner tube of the dual tube-type spinneret. The discharged solutions were allowed to stay in a cooling bath containing an aqueous 85 wt % γ-butyrolactone solution at a temperature of 5° C. for 20 seconds, thereby causing solidification. The obtained porous hollow fiber had a columnar texture having a thickness uniformity of 0.42, where the occupancy of columnar texture was 90% and the occupancy of spherical structure was 10%.

Subsequently, the porous hollow fiber obtained above was stretched to 1.5 times at a stretching speed of 44%/sec in water at 95° C. The porous hollow-fiber membrane after stretching had a columnar texture having a representative value of longitudinal length of 12 μm, a representative value of short-side length of 2.2 μm, and a thickness uniformity of 0.39, where the porosity was 56%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 1.01, the maximum Raman orientation parameter M was 1.03, the minimum Raman orientation parameter m was 1.00, and M/m was 1.0. The structure and performances of the porous hollow-fiber membrane after stretching are shown in Table 4.

Reference Example 13

36 wt % of a vinylene fluoride homopolymer having a weight average molecular weight of 417,000 (KF1300, produced by Kureha Corporation, weight average molecular weight: 417,000, number average molecular weight: 221,000) and 64 wt % of γ-butyrolactone were dissolved at 150° C. Tc of this vinylidene fluoride homopolymer solution was 48° C. By disposing two gear pumps, the solution was allowed to stay in a line between two gear pumps for 20 seconds at 99 to 101° C. under a pressure of 2.5 MPa and then discharged from an outer tube of a dual tube-type spinneret, and an aqueous 85 wt % γ-butyrolactone solution was simultaneously discharged from an inner tube of the dual tube-type spinneret. The discharged solutions were allowed to stay in a cooling bath containing an aqueous 85 wt % γ-butyrolactone solution at a temperature of 5° C. for 20 seconds and then allowed to stay in a second cooling bath containing an aqueous 85 wt % γ-butyrolactone solution at a temperature of 20° C. for 20 seconds, thereby causing solidification. The obtained porous hollow fiber had a columnar texture having a thickness uniformity of 0.66, where the occupancy of columnar texture was 91% and the occupancy of spherical structure was 9%.

Subsequently, the porous hollow fiber obtained above was stretched to 2.4 times at a stretching speed of 175%/sec in water at 95° C., but fiber breakage occurred and stretching could not be performed.

Reference Example 14

38 wt % of a vinylene fluoride homopolymer having a weight average molecular weight of 417,000 (KF1300, produced by Kureha Corporation, weight average molecular weight: 417,000, number average molecular weight: 221,000) and 62 wt % of dimethylsulfoxide were dissolved at 130° C. Tc of this vinylidene fluoride homopolymer solution was 29° C. By disposing two gear pumps, the solution was allowed to stay in a line between the two gear pumps for 20 seconds at 64 to 66° C. under a pressure of 0.2 MPa and then discharged from an outer tube of a dual tube-type spinneret, and an aqueous 90 wt % dimethylsulfoxide solution was simultaneously discharged from an inner tube of the dual tube-type spinneret. The discharged solutions were allowed to stay in a cooling bath containing an aqueous 85 wt % dimethylsulfoxide solution at a temperature of −3° C. for 20 seconds, thereby causing solidification. The obtained porous hollow fiber had a columnar texture having a thickness uniformity of 0.44, where the occupancy of columnar texture was 25% and the occupancy of spherical structure was 75%.

Subsequently, the porous hollow fiber obtained above was stretched to 1.5 times at a stretching speed of 16%/sec in water at 95° C. The porous hollow-fiber membrane after stretching had a columnar texture having a representative value of longitudinal length of 14 μm, a representative value of short-side length of 2.1 μm, and a thickness uniformity of 0.42, where the porosity was 59%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 1.03, the maximum Raman orientation parameter M was 1.08, the minimum Raman orientation parameter m was 1.01, and M/m was 1.1. The structure and performances of the porous hollow-fiber membrane after stretching are shown in Table 4.

Reference Example 15

38 wt % of a vinylene fluoride homopolymer having a weight average molecular weight of 417,000 (KF1300, produced by Kureha Corporation, weight average molecular weight: 417,000, number average molecular weight: 221, 000) and 62 wt % of dimethylsulfoxide were dissolved at 130° C. Tc of this vinylidene fluoride homopolymer solution was 29° C. By disposing two gear pumps, the solution was allowed to stay in a line between the two gear pumps for 20 seconds at 78 to 80° C. under a pressure of 2.5 MPa and then discharged from an outer tube of a dual tube-type spinneret, and an aqueous 90 wt % dimethylsulfoxide solution was simultaneously discharged from an inner tube of the dual tube-type spinneret. The discharged solutions were allowed to stay in a cooling bath containing an aqueous 85 wt % dimethylsulfoxide solution at a temperature of −3° C. for 10 seconds and then allowed to stay in a second cooling bath containing an aqueous 85 wt % dimethylsulfoxide solution at a temperature of 20° C. for 30 seconds, thereby causing solidification. The obtained porous hollow fiber had a columnar texture having a thickness uniformity of 0.68, where the occupancy of columnar texture was 93% and the occupancy of spherical structure was 7%.

Subsequently, the porous hollow fiber obtained above was stretched to 1.5 times at a stretching speed of 44%/sec in water at 95° C. The porous hollow-fiber membrane after stretching had a columnar texture having a representative value of longitudinal length of 17 μm, a representative value of short-side length of 2.0 μm, and a thickness uniformity of 0.68, where the porosity was 58%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 1.01, the maximum Raman orientation parameter M was 1.05, the minimum Raman orientation parameter m was 1.01, and M/m was 1.0. The structure and performances of the porous hollow-fiber membrane after stretching are shown in Table 4.

Example 3

The production method of Reference Example 4 was used to obtain a porous hollow-fiber membrane having an outside diameter of 1.1 mm, an inside diameter of 0.6 mm, a pure-water permeation performance of 1.0 m³/m²/hr, a breaking strength of 26 MPa, and a Young's modulus of 0.26 GPa. Thereafter, according the manufacturing method of a porous hollow-fiber membrane module of Reference Example 3, a hollow-fiber membrane module having packed therein 6,880 hollow-fiber membranes above was manufactured. The membrane module thus produced had a membrane area of 26.2 m², and the filling ratio in the central part of the cylindrical case was 37%. The membrane area per unit volume was 1,523 m²/m³. This module was fixed to a separation membrane device as illustrated in FIG. 10, and filtration of a sugar solution was performed. As the sugar solution, a solution obtained by adding α-amylase and glucoamylase to water and commercially available cornstarch and performing a hydrolysis reaction while stirring at 60° C. for 24 hours was subjected to the test. The average suspended solid concentration was 500 mg/L.

The obtained sugar solution was put in the raw water feeding tank 17 of the separation membrane device of FIG. 10, and membrane separation was conducted. As for the filtration system, cross-flow filtration was employed.

First, as the membrane separation step, the valve 18 was opened; the valve 19 was set to open the line from the raw water feeding tank 17 to the hollow-fiber membrane module 100; the valve 20 was opened; the raw water feed pump 21 was driven to feed the sugar solution to the hollow-fiber membrane module 100 to afford a membrane surface linear velocity of 0.3 m/sec; and the concentrated liquid failing in passing through the hollow-fiber membrane was circulated to return to the raw water feeding tank 17 through the valve 20. Simultaneously, the valve 22 was opened; the valve 28 was set to open the line from the pump 23 to the permeated liquid reservoir 24; and the pump 23 was driven to collect the sugar solution passed through the hollow-fiber membrane, at a permeation flow rate of 26.2 m³/day for 28 minutes.

Thereafter, backwashing of the washing step (A) was conducted by stopping the pump 23, closing the valve 22, opening the valve 25, and driving the pump 26 to feed the permeated liquid at a permeation flow rate of 39.3 m³/day from the permeated liquid reservoir 24 to the hollow-fiber membrane module 100. Simultaneously, the washing step (B) was conducted by circulating the sugar solution fed to the membrane module 100 from the raw water feed pump 21 at a membrane surface linear velocity of 0.3 m/sec and the permeated liquid converged to the raw water side through the hollow-fiber membrane by the operation of the washing step (A), so as to entirely return to the raw water feeding tank 17 through the valve 20, and this was conducted for 2 minutes.

Furthermore, a second operation cycle was continuously operated by the same operation as the first operation cycle above by again opening the valve 22 at the same time, setting the valve 28 to open the line from the pump 23 to the permeated liquid reservoir 24, and driving the pump 23 to initiate the membrane separation step at a permeation flow rate of 26.2 m³/day, and this was repeated until a fifteenth operation cycle. In the subsequent sixteenth operation cycle, a membrane separation step was operated for 28 minutes at a permeation flow rate of 26.2 m³/day by again opening the valve 22, setting the valve 28 to open the line from the pump 23 to the permeated liquid reservoir 24, and driving the pump 23. Thereafter, while conducting the washing step (A) by stopping the pump 23, closing the valve 22, opening the valve 25, and driving the pump 26 to feed the permeated liquid from the permeated liquid reservoir 24 to the hollow-fiber membrane module 100, the washing step (B) was simultaneously conducted for 2 minutes by circulating the sugar solution fed to the membrane module 100 from the raw water feed pump 21 at a membrane surface linear velocity of 0.3 m/sec and the permeated liquid converged to the raw water side through the hollow-fiber membrane by the operation of the washing step (A), so as to entirely return to the raw water feeding tank 17 through the valve 20.

Thereafter, the raw water feed pump 21 and the pump 26 were stopped, and the valve 25 was closed. Subsequently, the valve 19 was opened to discharge the sugar solution from the hollow-fiber membrane module 100 to the clarified liquid reservoir 27. Thereafter, the valve 18 was closed, and the raw water feed pump 21 was driven to pump out the concentrated sugar water also from the inside of the raw water feeding tank 17.

Subsequently, the second washing step (B) was conducted for 5 minutes by opening the valve 18, closing the valve 19, feeding RO water to the raw water feeding tank 17, and driving the raw water feed pump 21 such that RO water is fed to the hollow-fiber membrane module 100 to afford a membrane surface linear velocity of 5.0 m/sec and circulated to return to the raw water feeding tank 17 through the valve 20. Thereafter, the raw water feed pump 21 was stopped; the valve 19 was opened to discharge RO water from the hollow-fiber membrane module 100 to the clarified liquid reservoir; the valve 18 was closed; and the raw water feed pump 21 was driven to pump out RO water used as cleaning water also from the inside of the raw water feeding tank 17.

This operation cycle group including filtration of sugar solution and subsequent discharge of suspended solids by using RO water was repeated nine times.

After that, chemical liquid cleaning was conducted by adding sodium hypochlorite as a cleaning liquid to the raw water feeding tank 17 to afford a concentration of 3,000 ppm, opening the valve 18, setting the valve 19 to open the line from the raw water feeding tank 17 to the hollow-fiber membrane module 100, opening the valve 20, driving the raw water feed pump 21 to feed the sugar solution to the separation membrane module 100 to afford a membrane surface linear velocity of 0.3 m/sec, and circulating the concentrated liquid failing in passing through the hollow-fiber membrane to return to the raw water feeding tank 17 through the valve 20, and simultaneously by opening the valve 22, setting the valve 28 to open the line from the pump 23 to the raw water feeding tank 17, and driving and setting the pump 23 to circulate the cleaning liquid passed through the hollow-fiber membrane to the raw water feeding tank 17 at a permeation flow rate of 2.6 m$^3$/day. After conducting the chemical liquid cleaning for 1 hour, the residual chlorine concentration of sodium hypochlorite within the raw water feeding tank 17 was measured. The free chlorine concentration 2,700 ppm before the cleaning, whereas it was 1,400 ppm after chemical liquid cleaning. The recovery rate of water permeability of the module was 87%.

Example 4

The production method of Reference Example 5 was used to obtain a porous hollow-fiber membrane having an outside diameter of 1.1 mm, an inside diameter of 0.6 mm, a pure-water permeation performance of 2.0 m$^3$/m$^2$/hr, a breaking strength of 26 MPa, and a Young's modulus of 0.22 GPa. Thereafter, a module having packed therein 6,880 hollow-fiber membranes above was manufactured with the module of Reference Example 3. The membrane module thus produced had a membrane area of 26.2 m$^2$, and the filling ratio in the central part of the cylindrical case was 37%. The membrane area per unit volume was 1,523 m$^2$/m$^3$. This module was fixed to a separation membrane device according to the flow sheet of FIG. 10, and an operation cycle group including the same filtration operation of sugar solution as in Example 3 and clarification using RO water was performed nine times. Subsequently, chemical cleaning was conducted using sodium hypochlorite in the same manner as in Example 3. The free chlorine concentration was 2,710 ppm before the cleaning, whereas it was 1,400 ppm after chemical liquid cleaning. The recovery ratio of water permeability of the module was 80%.

Example 5

The production method of Reference Example 6 was used to obtain a porous hollow-fiber membrane having an outside diameter of 1.1 mm, an inside diameter of 0.6 mm, a pure-water permeation performance of 1.6 m$^3$/m$^2$/hr, a breaking strength of 35 MPa, and a Young's modulus of 0.24 GPa. Thereafter, a module having packed therein 6,880 hollow-fiber membranes above was manufactured with the module of Reference Example 3. The membrane module thus produced had a membrane area of 26.2 m$^2$, and the filling ratio in the central part of the cylindrical case was 37%. The membrane area per unit volume was 1,523 m$^2$/m$^3$. This module was fixed to a separation membrane device according to the flow sheet of FIG. 10, and an operation cycle group including the same filtration operation of sugar solution as in Example 3 and clarification using RO water was performed nine times. Subsequently, chemical cleaning was conducted using sodium hypochlorite in the same manner as in Example 3. The free chlorine concentration was 2,700 ppm before the cleaning, whereas it was 1,410 ppm after chemical liquid cleaning. The recovery ratio of water permeability of the module was 89%.

Example 6

The production method of Reference Example 7 was used to obtain a porous hollow-fiber membrane having an outside diameter of 1.1 mm, an inside diameter of 0.6 mm, a pure-water permeation performance of 0.7 m$^3$/m$^2$/hr, a breaking strength of 27 MPa, and a Young's modulus of 0.28 GPa. Thereafter, a module having packed therein 6,880 hollow-fiber membranes above was manufactured with the module of Reference Example 3. The membrane module thus produced had a membrane area of 26.2 m$^2$, and the filling ratio in the central part of the cylindrical case was 37%. The membrane area per unit volume was 1,523 m$^2$/m$^3$. This module was fixed to a separation membrane device according to the flow sheet of FIG. 10, and an operation cycle group including the same filtration operation of sugar solution as in Example 3 and clarification using RO water was performed nine times. Subsequently, chemical cleaning was conducted using sodium hypochlorite in the same manner as in Example 3. The free chlorine concentration was 2,730 ppm before the cleaning, whereas it was 1,500 ppm after chemical liquid cleaning. The recovery ratio of water permeability of the module was 88%.

Example 7

The production method of Reference Example 8 was used to obtain a porous hollow-fiber membrane having an outside diameter of 1.1 mm, an inside diameter of 0.6 mm, a pure-water permeation performance of 1.7 m$^3$/m$^2$/hr, a breaking strength of 28 MPa, and a Young's modulus of 0.30 GPa. Thereafter, a module having packed therein 6,880 hollow-fiber membranes above was manufactured with the module of Reference Example 3. The membrane module thus produced had a membrane area of 26.2 m$^2$, and the filling ratio in the central part of the cylindrical case was 37%. The membrane area per unit volume was 1,523 m$^2$/m$^3$. This module was fixed to a separation membrane device according to the flow sheet of FIG. 10, and an operation cycle group including the same filtration operation of sugar solution as in Example 3 and clarification using RO water was performed nine times. Subsequently, chemical cleaning was conducted using sodium hypochlorite in the same manner as in Example 3. The free chlorine concentration was 2,680 ppm before the cleaning, whereas it was 1,400 ppm after chemical liquid cleaning. The recovery ratio of water permeability of the module was 88%.

Example 8

The production method of Reference Example 9 was used to obtain a porous hollow-fiber membrane having an outside diameter of 1.1 mm, an inside diameter of 0.6 mm, a pure-water permeation performance of 0.8 $m^3/m^2/hr$, a breaking strength of 31 MPa, and a Young's modulus of 0.31 GPa. Thereafter, a module having packed therein 6,880 hollow-fiber membranes above was manufactured with the module of Reference Example 3. The membrane module thus produced had a membrane area of 26.2 $m^2$, and the filling ratio in the central part of the cylindrical case was 37%. The membrane area per unit volume was 1,523 $m^2/m^3$. This module was fixed to a separation membrane device according to the flow sheet of FIG. 10, and an operation cycle group including the same filtration operation of sugar solution as in Example 3 and clarification using RO water was performed nine times. Subsequently, chemical cleaning was conducted using sodium hypochlorite in the same manner as in Example 3. The free chlorine concentration was 2,700 ppm before the cleaning, whereas it was 1,400 ppm after chemical liquid cleaning. The recovery ratio of water permeability of the module was 87%.

Example 9

The production method of Reference Example 10 was used to obtain a porous hollow-fiber membrane having an outside diameter of 1.1 mm, an inside diameter of 0.6 mm, a pure-water permeation performance of 2.2 $m^3/m^2/hr$, a breaking strength of 29 MPa, and a Young's modulus of 0.35 GPa. Thereafter, a module having packed therein 6,880 hollow-fiber membranes above was manufactured with the module of Reference Example 3. The membrane module thus produced had a membrane area of 26.2 $m^2$, and the filling ratio in the central part of the cylindrical case was 37%. The membrane area per unit volume was 1,523 $m^2/m^3$. This module was fixed to a separation membrane device according to the flow sheet of FIG. 10, and an operation cycle group including the same filtration operation of sugar solution as in Example 3 and clarification using RO water was performed nine times. Subsequently, chemical cleaning was conducted using sodium hypochlorite in the same manner as in Example 3. The free chlorine concentration was 2,800 ppm before the cleaning, whereas, it was 1,500 ppm after chemical liquid cleaning. The recovery ratio of water permeability of the module was 87%.

Example 10

The production method of Reference Example 11 was used to obtain a porous hollow-fiber membrane having an outside diameter of 1.1 mm, an inside diameter of 0.6 mm, a pure-water permeation performance of 2.1 $m^3/m^2/hr$, a breaking strength of 33 MPa, and a Young's modulus of 0.32 GPa. Thereafter, a module having packed therein 6,880 hollow-fiber membranes above was manufactured with the module of Reference Example 3. The membrane module thus produced had a membrane area of 26.2 $m^2$, and the filling ratio in the central part of the cylindrical case was 37%. The membrane area per unit volume was 1,523 $m^2/m^3$. This module was fixed to a separation membrane device according to the flow sheet of FIG. 10, and an operation cycle group including the same filtration operation of sugar solution as in Example 3 and clarification using RO water was performed nine times. Subsequently, chemical cleaning was conducted using sodium hypochlorite in the same manner as in Example 3. The free chlorine concentration was 2,650 ppm before the cleaning, whereas it was 1,400 ppm after chemical liquid cleaning. The recovery ratio of water permeability of the module was 88%.

Example 11

The production method of Reference Example 4 was used to obtain a porous hollow-fiber membrane having an outside diameter of 1.2 mm, an inside diameter of 0.7 mm, a pure-water permeation performance of 1.0 $m^3/m^2/hr$, a breaking strength of 26 MPa, and a Young's modulus of 0.26 GPa. Thereafter, a module having packed therein 3,910 hollow-fiber membranes above was manufactured with the porous hollow-fiber membrane module of Reference Example 3. The membrane module thus produced had a membrane area of 16.2 $m^2$, and the filling ratio in the central part of the cylindrical case was 25%. The membrane area per unit volume was 945 $m^2/m^3$. This module was fixed to a separation membrane device according to the flow sheet of FIG. 10, and the same operation as in Example 3 was performed. Subsequently, 3,000 ppm sodium hypochlorite was prepared in the raw water feeding tank 17 and after conducting chemical liquid cleaning for 1 hour, the residual chlorine concentration of sodium hypochlorite within the raw water feeding tank 17 was measured, as a result, the free chlorine concentration was 2,700 ppm before the cleaning, whereas it was 900 ppm after chemical liquid cleaning. The recovery ratio of water permeability of the module was 82%.

Comparative Example 4

The production method of Reference Example 4 was used to obtain a porous hollow-fiber membrane having an outside diameter of 1.1 mm, an inside diameter of 0.6 mm, a pure-water permeation performance of 1.0 $m^3/m^2/hr$, a breaking strength of 26 MPa, and a Young's modulus of 0.26 GPa. Thereafter, a hollow-fiber membrane module having packed therein 10,000 hollow-fiber membranes above was manufactured according to the manufacturing method of a porous hollow-fiber membrane module of Reference Example 3. The membrane module thus produced had a membrane area of 38.0 $m^2$, and the filling ratio in the central part of the cylindrical case was 54%. The membrane area per unit volume was 2,214 $m^2/m^3$.

This membrane module was fixed to a separation membrane device illustrated in FIG. 10, and the same operation as in Example 3 was performed.

As a result, the liquid sending pressure to the membrane module was gradually increased and when in the sixteenth operation cycle of the fifth operation cycle group, the second washing step (B) with RO water was initiated after performing the membrane separation step and subsequent washing steps (A) and (B) and then pumping out the sugar solution, the liquid sending pressure was increased, failing in maintaining the flow rate of 2.0 m/sec. The module was detached, and the inside was checked, as a result, deposition of many suspended solids was observed in the cylindrical case. It is considered that compared with Example 3, in Comparative Example 4, elimination of the accumulation of suspended solids was insufficient.

Comparative Example 5

A hollow-fiber membrane was produced according to the technique described in Reference Example 12. The obtained hollow-fiber membrane had an outside diameter of 2.2 mm, an inside diameter of 1.0 mm, a pure-water permeation performance of 1.0 $m^3/m^2/hr$, and a breaking strength of 11 MPa. According to the manufacturing method of a porous hollow-fiber membrane module of Reference Example 3, a hollow-fiber membrane module having packed therein 1,720 hollow-fiber membranes above was manufactured. The membrane module thus produced had a membrane area of 13.1 $m^2$, the filling ratio in the central part of the cylindrical case was 37%, and the membrane area per unit volume was 762 $m^2/m^3$.

This membrane module was fixed to a separation membrane device illustrated in FIG. 10, and the same operation as in Example 3 was performed.

As a result, the membrane filtration differential pressure in the membrane separation step was rapidly increased and when the membrane filtration differential pressure reached 100 kPa in the middle of the membrane separation step in the sixth operation cycle group, the operation was stopped. Subsequently, chemical liquid cleaning with sodium hypochlorite at 3,000 ppm was performed by the method of Example 1. After conducting the chemical liquid cleaning for 1 hour, the residual chlorine concentration of sodium hypochlorite within the raw water feeding tank 17 was measured. The free chlorine concentration was 2,700 ppm before the cleaning, whereas it was 800 ppm after chemical liquid cleaning. The recovery ratio of water permeability of the module was 60%. Compared with Example 3, stable operation was difficult due to rapid membrane clogging, and the chemical liquid was further required for sufficient cleaning.

Comparative Example 6

A hollow-fiber membrane was produced according to the technique described in Reference Example 12, and a hollow-fiber membrane having an outside diameter of 1.1 mm, an inside diameter of 0.6 mm, a pure-water permeation performance of 1.0 $m^3/m^2/hr$, and a breaking strength of 11 MPa was obtained. According to the manufacturing method of a porous hollow-fiber membrane module of Reference Example 3, a hollow-fiber membrane module having packed therein 6,880 hollow-fiber membranes above was manufactured. The membrane module thus produced had a membrane area of 26.2 $m^2$, and the filling ratio in the central part of the cylindrical case was 37%. The membrane area per unit volume was 1,523 $m^2/m^3$.

This membrane module was fixed to a separation membrane device illustrated in FIG. 10, and the same operation as in Example 3 was performed.

As a result, when in the sixteenth operation cycle of the third operation cycle group, the second washing step (B) with RO water was initiated after performing the membrane separation step and subsequent washing steps (A) and (B) and then pumping out the sugar solution, the hollow-fiber membrane was broken at the adhesive interface between the first potting part and the hollow-fiber membrane. It is considered that the membrane was broken due to the weight of suspended solids accumulated and the action of stress by the washing steps.

Comparative Example 7

A hollow-fiber membrane was produced according to the technique described in Reference Example 14. The obtained hollow-fiber membrane had an outside diameter of 1.1 mm, an inside diameter of 0.6 mm, a pure-water permeation performance of 1.1 $m^3/m^2/hr$, and a breaking strength of 12 MPa. A module having packed therein 4,640 hollow-fiber membranes above was manufactured with the module of Reference Example 3. The membrane module thus produced had a membrane area of 21.5 $m^2$, and the filling ratio in the central part of the cylindrical case was 37%. The membrane area per unit volume was 1,027 $m^2/m^3$.

This module was fixed to a separation membrane device according to the flow sheet of FIG. 10, and the same filtration operation of sugar solution as in Example 3 was performed. As a result, when in the sixteenth operation cycle of the fourth operation cycle group, the second washing step (B) with RO water was initiated after performing the membrane separation step and subsequent washing steps (A) and (B) and then pumping out the sugar solution, the hollow-fiber membrane was broken at the adhesive interface between the first potting part and the hollow-fiber membrane, and when the membrane separation step of the fifth operation cycle group was initiated, leakage of the sugar solution to the filtered liquid was observed. It is considered that the membrane was broken due to the weight of suspended solids accumulated and the action of stress by the washing steps.

Comparative Example 8

A hollow-fiber membrane was produced according to the technique described in Reference Example 15. The obtained hollow-fiber membrane had an outside diameter of 1.1 mm, an inside diameter of 0.6 mm, a pure-water permeation performance of 0.7 $m^3/m^2/hr$, and a breaking strength of 20 MPa. A module having packed therein 4,640 hollow-fiber membranes above was manufactured with the module of Reference Example 3. The membrane module thus produced had a membrane area of 21.5 $m^2$, and the filling ratio in the central part of the cylindrical case was 37%. The membrane area per unit volume was 1,027 $m^2/m^3$.

This module was fixed to a separation membrane device according to the flow sheet of FIG. 10, and the same filtration operation of sugar solution as in Example 3 was performed. As a result, when in the sixteenth operation cycle of the eighth operation cycle group, the second washing step (B) with RO water was initiated after performing the membrane separation step and subsequent washing steps (A) and (B) and then pumping out the sugar solution, the hollow-fiber membrane was broken at the adhesive interface between the first potting part and the hollow-fiber membrane, and when the membrane separation step of the ninth operation cycle group was initiated, leakage of the sugar solution to the filtered liquid was observed. It is considered that the membrane was broken due to the weight of suspended solids accumulated and the action of stress by the washing steps.

Comparative Example 9

A hollow-fiber membrane was produced according to the technique described in Reference Example 4, and a hollow-fiber membrane having a breaking strength of 26 MPa, an outside diameter of 1.1 mm, an inside diameter of 0.6 mm, a pure-water permeation performance of 1.0 m³/m²·hr, and a breaking strength of 26 MPa was obtained. Thereafter, a module having packed therein 5,650 hollow-fiber membranes above was manufactured with the module of Reference Example 3. The membrane module thus produced had a membrane area of 26.2 m², the filling ratio in the central part of the cylindrical case was 45%, and the membrane area per unit volume was 1,251 m²/m³.

This module was fixed to a separation membrane device according to the flow sheet of FIG. 10, and the same filtration operation of sugar solution as in Example 3 was performed. As a result, the liquid sending pressure to the module was gradually increased and when in the sixteenth operation cycle of the seventh operation cycle group, the second washing step (B) with RO water was initiated after performing the membrane separation step and subsequent washing steps (A) and (B) and then pumping out the sugar solution, the liquid sending pressure was increased, failing in maintaining the flow rate of 2.0 m/sec. The module was detached, and the inside was checked, as a result, deposition of many suspended solids was observed in the cylindrical case. It is considered that compared with Example 3, in Comparative Example 6, elimination of the accumulation of suspended solids was insufficient.

TABLE 3

| | | Reference Example | | | | | | | |
|---|---|---|---|---|---|---|---|---|---|
| | | 4 | 5 | 6 | 7 | 8 | 9 | 10 | 11 |
| Before stretching | Fluororesin-based polymer concentration | 35 | 36 | 39 | 39 | 38 | 38 | 42 | 42 |
| | Type of Solvent | γ-butyrolactone | | | | Dimethylsulfoxide | | | |
| | Crystallization temperature Tc (° C.) | 46 | 48 | 52 | 52 | 29 | 29 | 35 | 35 |
| | First cooling bath temperature (° C.) | 20 | 10 | 5 | 5 | 20 | −3 | −3 | −3 |
| | First cooling bath time (sec) | 20 | 10 | 10 | 10 | 20 | 10 | 10 | 10 |
| | Second cooling bath temperature (° C.) | — | 20 | 30 | 35 | — | 20 | 20 | 20 |
| | Second cooling bath time (sec) | — | 20 | 40 | 50 | — | 30 | 50 | 50 |
| | Thickness uniformity (—) | 0.55 | 0.64 | 0.69 | 0.68 | 0.62 | 0.68 | 0.72 | 0.72 |
| | Occupancy of spherical structure(%) | 15 | 13 | 9 | 8 | 6 | 7 | 5 | 5 |
| After stretching | Stretch ratio (times) | 2.0 | 2.4 | 2.4 | 1.8 | 2.0 | 1.8 | 2.4 | 2.4 |
| | Stretching speed (%/sec) | 9 | 44 | 142 | 2 | 19 | 146 | 125 | 16 |
| | Orientation degree π | non-oriented | 0.25 | 0.31 | non-oriented | non-oriented | non-oriented | 0.34 | non-oriented |
| | Raman orientation parameter ν | 1.82 | 2.35 | 2.53 | 2.13 | 2.32 | 2.18 | 2.96 | 2.48 |
| | Maximum Raman orientation parameter M | 2.31 | 2.84 | 3.08 | 2.69 | 2.61 | 2.56 | 3.31 | 2.75 |
| | Minimum Raman orientation parameter m | 1.32 | 1.21 | 1.14 | 1.65 | 1.42 | 1.29 | 1.42 | 1.33 |
| | M/m | 1.8 | 2.4 | 2.7 | 1.6 | 1.8 | 2.0 | 2.3 | 2.1 |
| | Thickness uniformity (—) | 0.51 | 0.60 | 0.62 | 0.66 | 0.61 | 0.66 | 0.70 | 0.72 |
| | Porosity (%) | 56 | 55 | 54 | 53 | 57 | 56 | 56 | 55 |
| Performance | Pure-water permeation performance (m³/m²/hr) | 1.0 | 2.0 | 1.6 | 0.7 | 1.7 | 0.8 | 2.2 | 2.1 |
| | Breaking strength (MPa) | 26 | 26 | 35 | 27 | 28 | 31 | 29 | 33 |
| | Young's modulus (GPa) | 0.26 | 0.22 | 0.24 | 0.28 | 0.30 | 0.31 | 0.35 | 0.32 |
| | Elongation at break (%) | 245 | 113 | 101 | 262 | 157 | 208 | 125 | 194 |

TABLE 4

| | | Reference Example 12 | Reference Example 13 | Reference Example 14 | Reference Example 15 |
|---|---|---|---|---|---|
| Before stretching | Fluororesin-based polymer concentration | 35 | 36 | 38 | 38 |
| | Type of Solvent | γ-butyrolactone | | Dimethylsulfoxide | |
| | Crystallization temperature Tc (° C.) | 46 | 48 | 29 | 29 |
| | First cooling bath temperature (° C.) | 5 | 5 | −3 | −3 |
| | First cooling bath time (sec) | 20 | 20 | 20 | 10 |
| | Second cooling bath temperature (° C.) | — | 20 | — | 20 |
| | Second cooling bath time (sec) | — | 20 | — | 30 |
| | Thickness uniformity (—) | 0.42 | 0.66 | 0.44 | 0.68 |
| | Occupancy of spherical structure(%) | 10 | 9 | 75 | 7 |
| After stretching | Stretch ratio (times) | 1.5 | 2.4 | 1.5 | 1.5 |
| | Stretching speed (%/sec) | 44 | 175 | 16 | 44 |
| | Orientation degree π | non-oriented | fiber breakage | non-oriented | non-oriented |
| | Raman orientation parameter ν | 1.01 | | 1.03 | 1.01 |
| | Maximum Raman orientation parameter M | 0.03 | | 1.08 | 1.05 |
| | Minimum Raman orientation parameter m | 1.00 | | 1.01 | 1.01 |
| | M/m | 1.0 | | 1.1 | 1.0 |
| | Thickness uniformity (—) | 0.39 | | 0.42 | 0.68 |
| | Porosity (%) | 56 | | 59 | 58 |

TABLE 4-continued

|  |  | Reference Example 12 | Reference Example 13 | Reference Example 14 | Reference Example 15 |
|---|---|---|---|---|---|
| Performance | Pure-water permeation performance ($m^3/m^2/hr$) | 1.0 |  | 1.1 | 0.7 |
|  | Breaking strength (MPa) | 11 |  | 12 | 20 |
|  | Young's modulus (GPa) | 0.16 |  | 0.15 | 0.19 |
|  | Elongation at break (%) | 190 |  | 120 | 214 |

TABLE 5

|  | Example | | | | | | | | |
|---|---|---|---|---|---|---|---|---|---|
|  | 3 | 4 | 5 | 6 | 7 | 8 | 9 | 10 | 11 |
| Outside diameter (mm) | 1.1 | 1.1 | 1.1 | 1.1 | 1.1 | 1.1 | 1.1 | 1.1 | 1.2 |
| Inside diameter (mm) | 0.6 | 0.6 | 0.6 | 0.6 | 0.6 | 0.6 | 0.6 | 0.6 | 0.7 |
| Pure-water permeation performance ($m^3/m^2/hr$) | 1.0 | 2.0 | 1.6 | 0.7 | 1.7 | 0.8 | 2.2 | 2.1 | 1.0 |
| Breaking strength (MPa) | 26 | 26 | 35 | 27 | 28 | 31 | 29 | 33 | 26 |
| Young's modulus (GPa) | 0.26 | 0.22 | 0.24 | 0.28 | 0.30 | 0.31 | 0.35 | 0.32 | 0.26 |
| Number of membranes packed (membranes) | 6,880 | 6,880 | 6,880 | 6,880 | 6,880 | 6,880 | 6,880 | 6,880 | 3,910 |
| Filling ratio (%) | 37 | 37 | 37 | 37 | 37 | 37 | 37 | 37 | 25 |
| Membrane area ($m^2$) | 26.2 | 26.2 | 26.2 | 26.2 | 26.2 | 26.2 | 26.2 | 26.2 | 16.2 |
| Membrane area per unit volume ($m^2/m^3$) | 1523 | 1523 | 1523 | 1523 | 1523 | 1523 | 1523 | 1523 | 945 |
| Recovery ratio of water permeability after chemical liquid cleaning (%) | 87 | 80 | 89 | 88 | 88 | 87 | 87 | 88 | 82 |

TABLE 6

|  | Comparative Example | | | | | |
|---|---|---|---|---|---|---|
|  | 4 | 5 | 6 | 7 | 8 | 9 |
| Outside diameter (mm) | 1.1 | 2.2 | 1.1 | 1.1 | 1.1 | 1.1 |
| Inside diameter (mm) | 0.6 | 1.0 | 0.6 | 0.6 | 0.6 | 0.6 |
| Pure-water permeation performance ($m^3/m^2/hr$) | 1.0 | 1.0 | 1.0 | 1.1 | 0.7 | 1.0 |
| Breaking strength (MPa) | 26 | 11 | 11 | 12 | 20 | 26 |
| Young's modulus (GPa) | 0.26 | 0.16 | 0.16 | 0.15 | 0.19 | 0.26 |
| Number of membranes packed (membranes) | 10,000 | 1,720 | 6,880 | 4,640 | 4,640 | 5,650 |
| Filling ratio (%) | 54 | 37 | 37 | 37 | 37 | 45 |
| Membrane area ($m^2$) | 38 | 13.1 | 26.2 | 21.5 | 21.5 | 26.2 |
| Membrane area per unit volume ($m^2/m^3$) | 2214 | 762 | 1523 | 1027 | 1027 | 1251 |
| Recovery ratio of water permeability after chemical liquid cleaning (%) | — | 60 | — | — | — | — |
| Reason for stopping operation | rise of liquid flow resistance, deposition of suspended solids | rise of transmembrane pressure difference | leakage, membrane breakage | leakage, membrane breakage | leakage, membrane breakage | rise of liquid flow resistance, deposition of suspended solids |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2015-257122) filed on Dec. 28, 2015 and Japanese Patent Application (Patent Application No. 2016-108320) filed on May 31, 2016, the entirety of which is incorporated herein by way of reference.

INDUSTRIAL APPLICABILITY

According to the present invention, in the membrane separation operation of raw water containing suspended substances, the performance of discharging suspended solids in a module can be enhanced without decreasing the membrane separation treatment speed, and a running cost can be reduced, so that wide utilization in the fields of food, biology, medicine, water production and effluent treatment can be found and enhancement of the processing efficiency of the entire process and cost reduction can be realized.

DESCRIPTION OF REFERENCE NUMERALS AND SIGNS

1 Hollow-fiber membrane
2 Hollow-fiber membrane bundle
3 Cylindrical case
4 First potting part
5 Second potting part
6 Upper cap
7 Lower cap
8 Raw water inflow port
9 Permeated liquid outlet
10 Concentrated liquid outlet 11 Through hole (raw water inflow channel)
12 Small bundled and bonded part
13, 14 Potting cap
15 Adhesive-charging fixture
16 Pin
17 Raw water feeding tank
18 to 20, 22, 25, 28 Valve
21 Raw water feed pump
23, 26 Pump
24 Permeated liquid reservoir
27 Clarified liquid reservoir
91 Gap
100 Hollow-fiber membrane module

The invention claimed is:

1. A hollow-fiber membrane module comprising:
a cylindrical case having a first end and a second end in a height direction,
a plurality of hollow-fiber membranes housed in the cylindrical case, and
a first potting part which bonds end parts of the plurality of hollow-fiber membranes located at the first end of the cylindrical case, while the end parts of the plurality of hollow-fiber membranes are open, wherein
the hollow-fiber membrane is a porous hollow-fiber membrane and has a breaking strength of 23 MPa or more,
a membrane area per unit volume of the hollow-fiber membrane module is from 800 to 3,700 m$^2$/m$^3$,
in a cross-section which perpendicularly intersects the height direction of the cylindrical case, a filling ratio of the hollow-fiber membranes is from 25% to 38%,
the hollow-fiber membrane contains a solid matter containing a fluororesin-based polymer,
at least a part of the solid matter constitutes a columnar texture,
the columnar texture is oriented in a longitudinal direction of the hollow-fiber membrane,
the columnar texture has a short-side length of from 0.5 μm to 3 μm, and
an aspect ratio of the columnar texture is 3 or more.

2. The hollow-fiber membrane module according to claim 1, wherein
a molecular chain in the columnar texture is oriented in the longitudinal direction of the porous hollow-fiber membrane, and
in the hollow-fiber membrane, an orientation degree π of the molecular chain of the fluororesin-based polymer in the longitudinal direction of the porous hollow-fiber membrane, calculated based on the following formula (1), is 0.4 or more and less than 1.0:

$$\text{Orientation degree } \pi = (180° - H)/180° \qquad (1)$$

wherein H is a half-width (°) of a diffraction intensity distribution in a circumferential direction of a wide-angle X-ray diffraction image.

3. The hollow-fiber membrane module according to claim 1, wherein
the fluororesin-based polymer is polyvinylidene fluoride, and
an average value ν of Raman orientation parameters of the molecular chain of the polyvinylidene fluoride, calculated based on the following formula (2), is 3.0 or more:

$$\text{Raman orientation parameter} = (I1270/I840)\text{parallel}/(I1270/I840)\text{perpendicular} \qquad (2)$$

wherein:
parallel condition: the longitudinal direction of the porous hollow-fiber membrane is parallel to a polarization direction; perpendicular condition: the longitudinal direction of the porous hollow-fiber membrane is orthogonal to the polarization direction; I1270 parallel: the intensity of Raman band at 1,270 cm$^{-1}$ under parallel condition; I1270 perpendicular: the intensity of Raman band at 1,270 cm$^{-1}$ under perpendicular condition; I840 parallel: the intensity of Raman band at 840 cm$^{-1}$ under parallel condition; and I840 perpendicular: the intensity of Raman band at 840 cm$^{-1}$ under perpendicular condition.

4. The hollow-fiber membrane module according to claim 1, wherein
the molecular chain in the columnar texture is oriented in the longitudinal direction of the porous hollow-fiber membrane,
the average value ν of Raman orientation parameters of the molecular chain, calculated based on the following formula (2), is from 1.5 to 4.0, and
in the hollow-fiber membrane, the orientation degree π of the molecular chain of the fluororesin-based polymer in the longitudinal direction of the porous hollow-fiber membrane, calculated based on the following formula (1), is less than 0.4, or
the molecular chain of the fluororesin-based polymer is non-oriented:

$$\text{Raman orientation parameter} = (I1270/I840)\text{parallel}/(I1270/I840)\text{perpendicular} \qquad (2)$$

wherein
parallel condition: the longitudinal direction of the porous hollow-fiber membrane is parallel to the polarization direction; perpendicular condition: the longitudinal direction of the porous hollow-fiber membrane is orthogonal to the polarization direction; I1270 parallel: the intensity of Raman band at 1,270 cm$^{-1}$ under parallel condition; I1270 perpendicular: the intensity of Raman band at 1,270 cm$^{-1}$ under perpendicular condition; I840 parallel: the intensity of Raman band at 840 cm$^{-1}$ under parallel condition; and I840 perpendicular: the intensity of Raman band at 840 cm$^{-1}$ under perpendicular condition) condition, and $$\text{Orientation degree } \pi = (180° - H)/180° \qquad (1)$$

wherein H is a half-width (°) of a diffraction intensity distribution in the circumferential direction of a wide-angle X-ray diffraction image.

5. The hollow-fiber membrane module according to claim 1, wherein a thickness uniformity of the columnar texture is 0.50 or more.

6. The hollow-fiber membrane module according to claim 2, wherein
the half-width H in formula (1) is a half-width of an intensity distribution obtained by circumferentially scanning a crystal peak (2θ=20.4°) derived from a (110) plane of polyvinylidene fluoride in the wide-angle X-ray diffraction measurement.

7. A method for operating the hollow-fiber membrane module according to claim 1, comprising:
(1) a membrane separation step of feeding raw water containing suspended substances to the hollow-fiber membrane module to separate suspended substances from a liquid, and
(2) a cleaning step of cleaning suspended substances accumulated on a membrane surface of the hollow-fiber membrane or between membrane bundles while stopping the step (1), wherein in the cleaning step (2),
- (A) a backwashing step of passing water from a permeation side of the hollow-fiber membrane to a raw water side of the hollow-fiber membrane, and
- (B) a washing step of flowing the raw water or water having at least a lower suspended substance concentration than in the raw water to the raw water side of the hollow-fiber membrane at a flow rate corresponding to a membrane surface linear velocity of from 0.3 to 5.0 m/s, are combined.

8. The method for operating a hollow-fiber membrane module according to claim 7, wherein an operation cycle including one step for each of the step (1) and the step (2) is repeated, in an operation cycle group composed by repeating the operation cycle, the membrane surface linear velocity of the washing step (B) is variably set for each operation cycle, and the membrane surface linear velocity of 1 to 50% of the washing step (B) relative to the total number of washing steps (B) included in the operation cycle group is 1.0 m/s or more.

9. The method for operating a hollow-fiber membrane module according to claim 8, wherein in the operation cycle group, the step (1) in at least some operation cycles are operated while conducting a crossflow on the raw water side of the hollow-fiber membrane at a flow rate corresponding to a membrane surface linear velocity of from 0.3 to 5.0 m/s.

10. The method for operating a hollow-fiber membrane module according to claim 8, wherein in the operation cycle group, the step (2) in at least some operation cycles do not include the washing step (B).

11. The method for operating a hollow-fiber membrane module according to claim 9, wherein in the operation cycle group, the step (2) in at least some operation cycles do not include the washing step (B).

12. The hollow-fiber membrane module according to claim 1, wherein an outside diameter of the hollow-fiber membrane is from 0.5 to 1.2 mm.

* * * * *